United States Patent [19]

Erdman

[11] 4,449,079
[45] May 15, 1984

[54] CONTROL SYSTEM FOR AN ELECTRONICALLY COMMUTATED MOTOR

[75] Inventor: David M. Erdman, Fort Wayne, Ind.

[73] Assignee: General Electric Company, Fort Wayne, Ind.

[21] Appl. No.: 412,421

[22] Filed: Aug. 27, 1982

Related U.S. Application Data

[63] Continuation of Ser. No. 141,267, Apr. 17, 1980, which is a continuation-in-part of Ser. No. 77,656, Sep. 21, 1979, abandoned, which is a continuation-in-part of Ser. No. 802,484, Jun. 1, 1977, Pat. No. 4,169,990, said Ser. No. 802,484, is a continuation-in-part of Ser. No. 729,761, Oct. 5, 1976, abandoned, said Ser. No. 729,761, is a continuation-in-part of Ser. No. 482,409, Jun. 24, 1974, Pat. No. 4,005,347.

[51] Int. Cl.³ ............................................. H02P 1/02
[52] U.S. Cl. .................................. 318/138; 318/254; 318/331
[58] Field of Search ............... 318/138, 254, 331, 439, 318/434, 311, 317

[56] References Cited

U.S. PATENT DOCUMENTS

| | | | |
|---|---|---|---|
| 3,369,381 | 2/1968 | Crane et al. | 68/12 |
| 3,875,463 | 4/1975 | Reuter et al. | |
| 4,005,347 | 1/1977 | Erdman | 318/138 X |
| 4,015,182 | 3/1977 | Erdman | 318/334 |
| 4,169,990 | 10/1979 | Lerdman | 318/138 |
| 4,232,536 | 11/1980 | Koseki et al. | 68/12 R |
| 4,327,302 | 4/1982 | Hershberger | 310/156 |
| 4,390,826 | 6/1983 | Erdman et al. | 318/439 |

Primary Examiner—G. Z. Rubinson
Assistant Examiner—Richard M. Moose
Attorney, Agent, or Firm—Joseph E. Papin

[57] ABSTRACT

A circuit for controlling the energization of an electrical load from an AC source. The circuit has a pair of DC lines, and means is provided for rectifying the AC output of the source to apply a DC voltage across the DC lines in the form of a full wave rectified sinusoidal signal. Signal switching means for connection between the DC lines and the load establishes a conductive path therebetween during a variable time interval when the voltage applied by the full wave rectified sinusoidal signal exceeds the voltage across the load, and means including the switching means is provided for chopping the full wave rectified sinusoidal signal to apply pulses to the load during the variable time interval at a frequency which is high with respect to the frequency of the signal. Means connected to the chopping means for modulating the width of the pulses is responsive to an externally derived signal representative of the desired operation of the load, and means is responsive to the load current for modifying the externally derived signal to maintain the amplitude of the load current below a predetermined level whereby a high power factor is presented to the AC source during a predetermined range of operation of the load.

A laundering apparatus, a method of operating a laundry machine, a control system for an electronically commutated motor, and a method of operating an electronically commutated motor are also disclosed.

10 Claims, 56 Drawing Figures

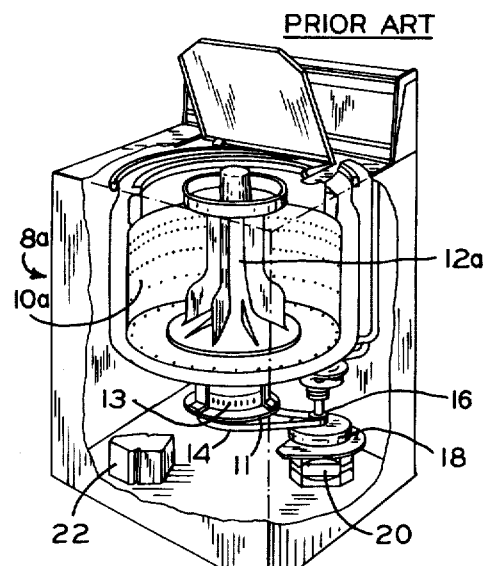
F I G. 1  PRIOR ART
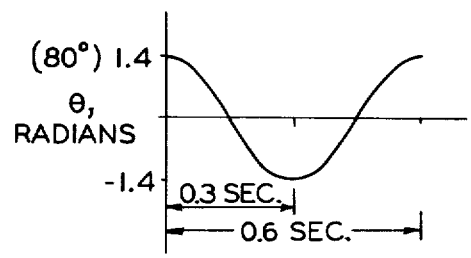
PRIOR ART F I G. 2A
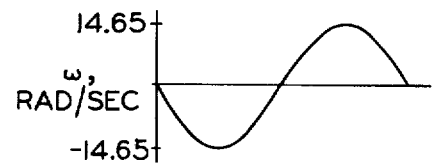
PRIOR ART F I G. 2B
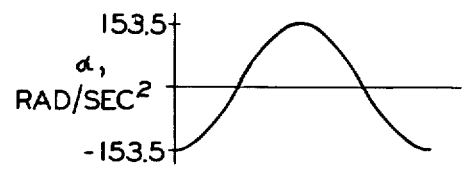
PRIOR ART F I G. 2C
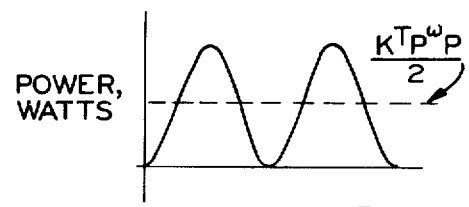
PRIOR ART F I G. 2D
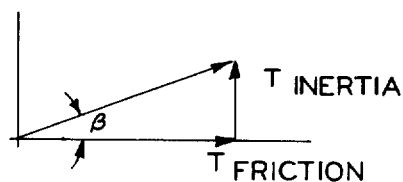
F I G. 2F
PRIOR ART
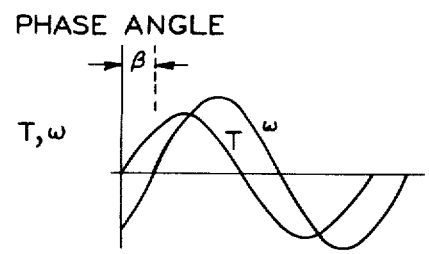
PRIOR ART F I G. 2E

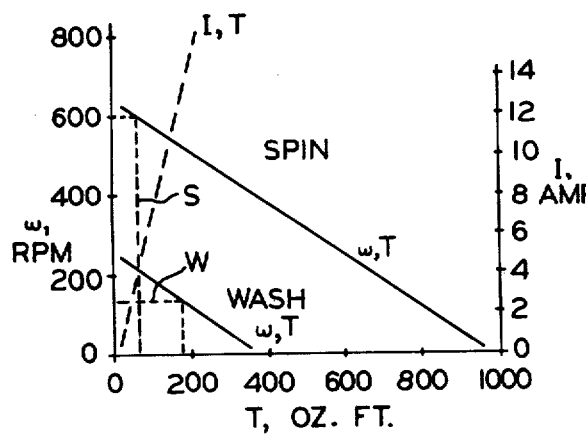
FIG. 12
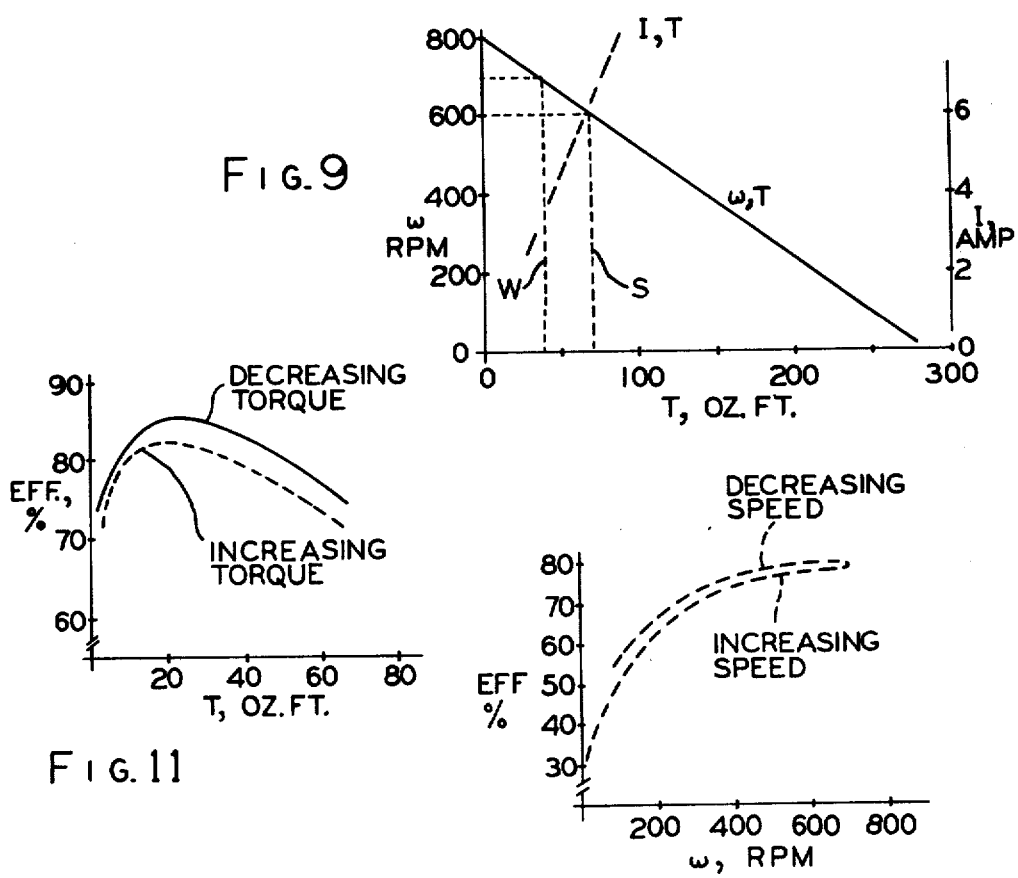
FIG. 9
FIG. 11
FIG. 10

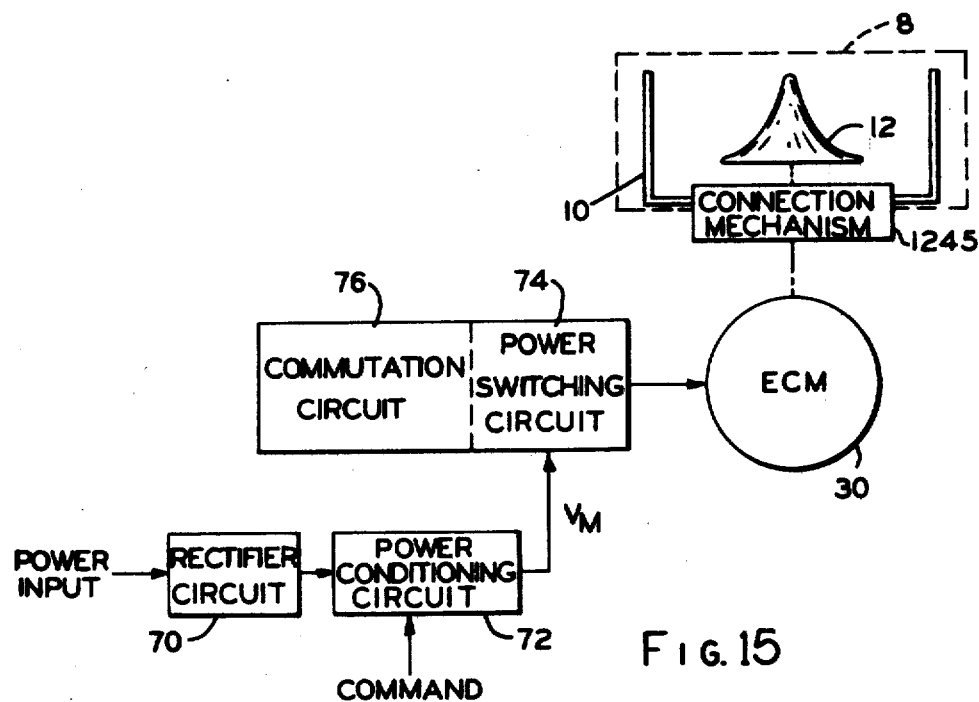
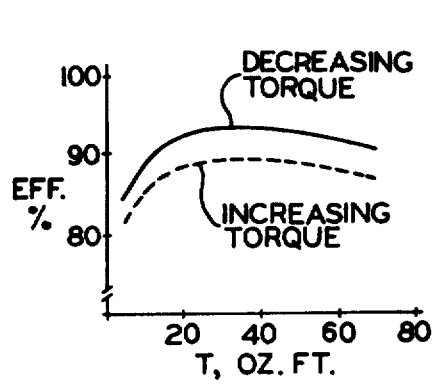
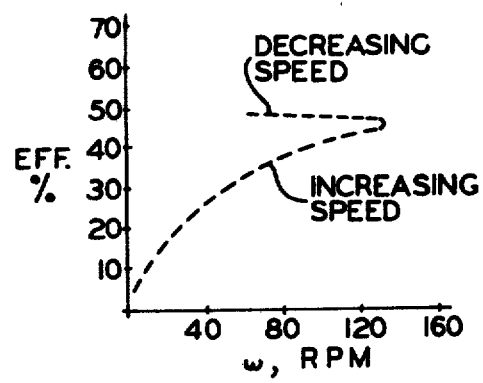
FIG. 15
FIG. 14
FIG. 13

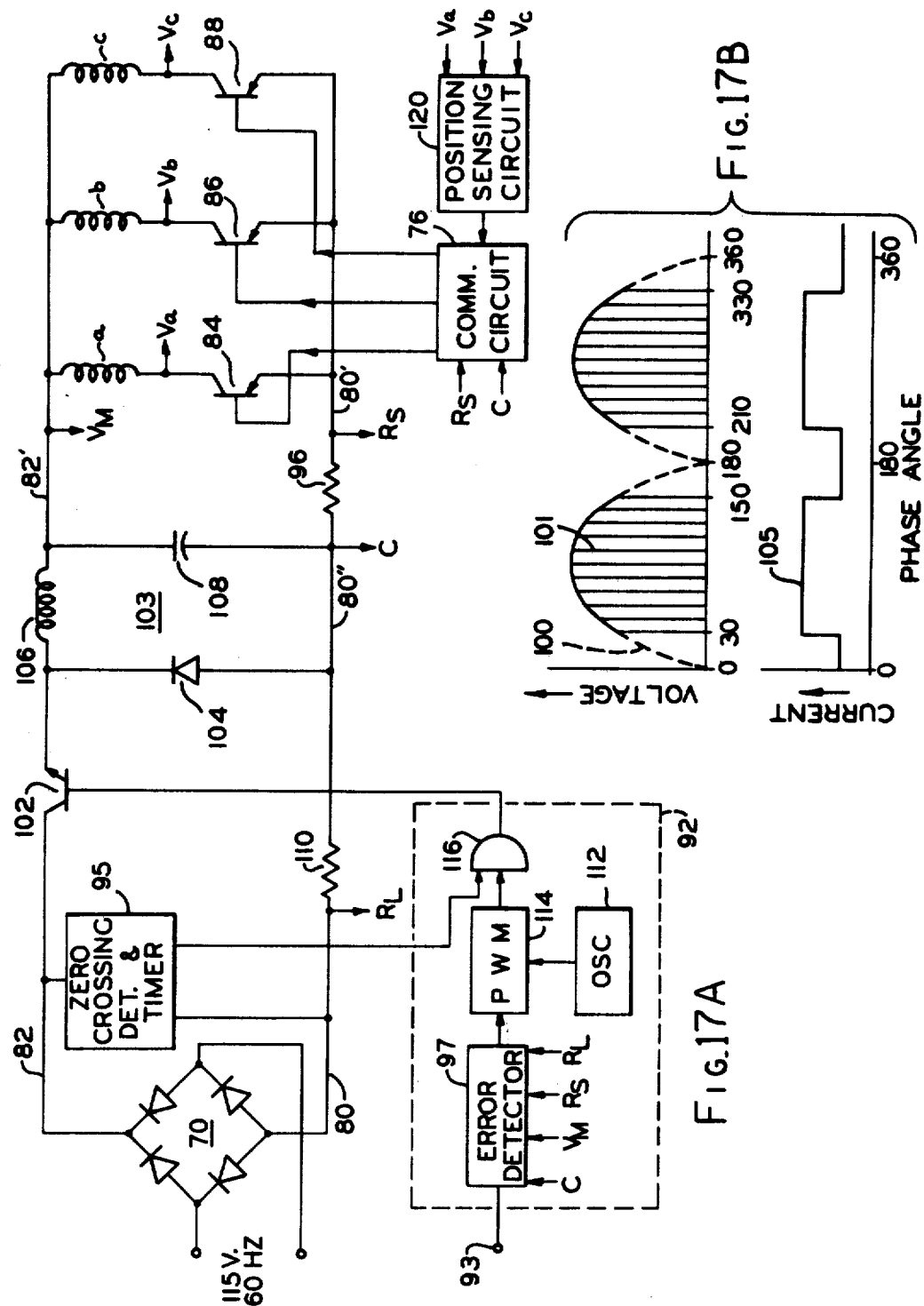

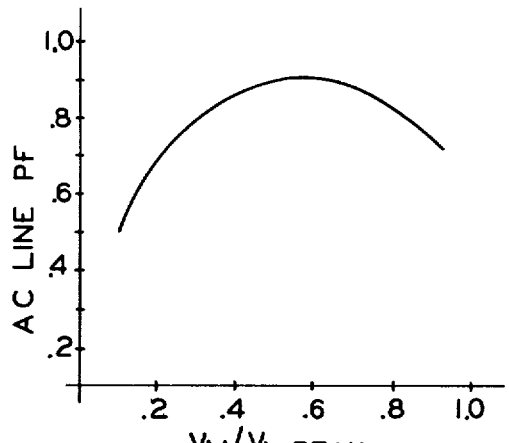
FIG. 19B
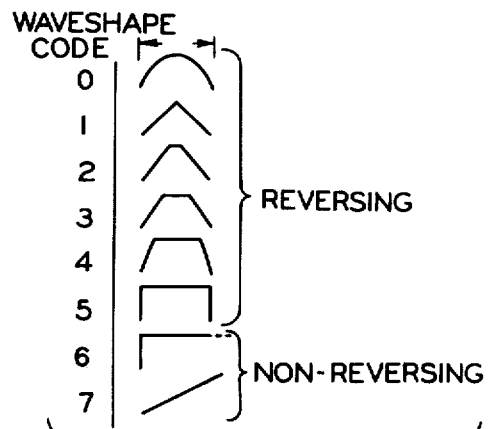
FIG. 22A
FIG. 22B
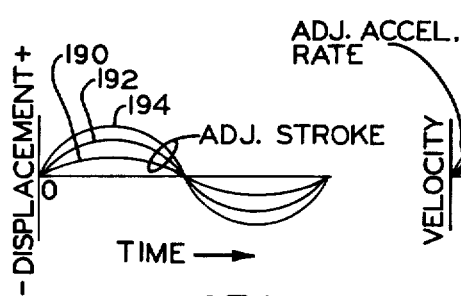
FIG. 23A
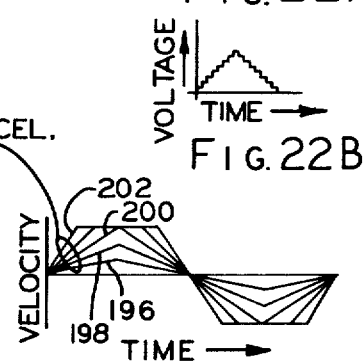
FIG. 23B
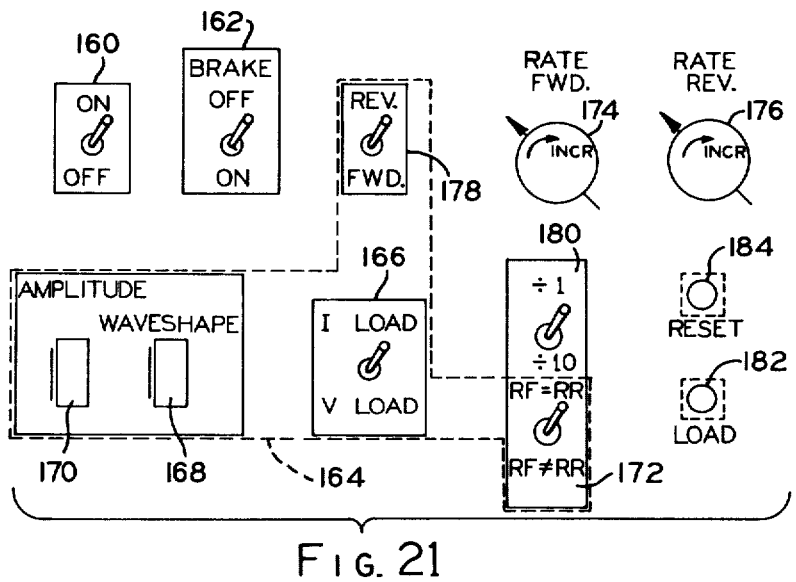
FIG. 21

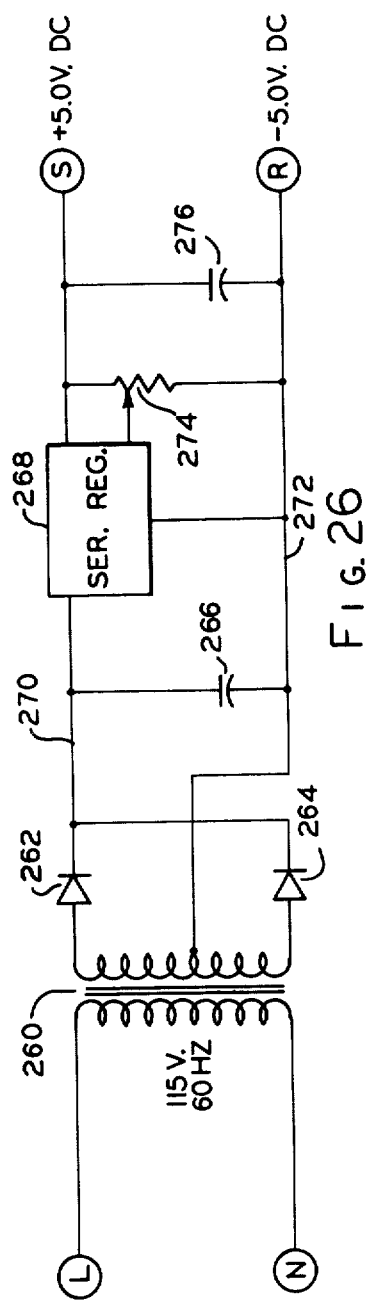
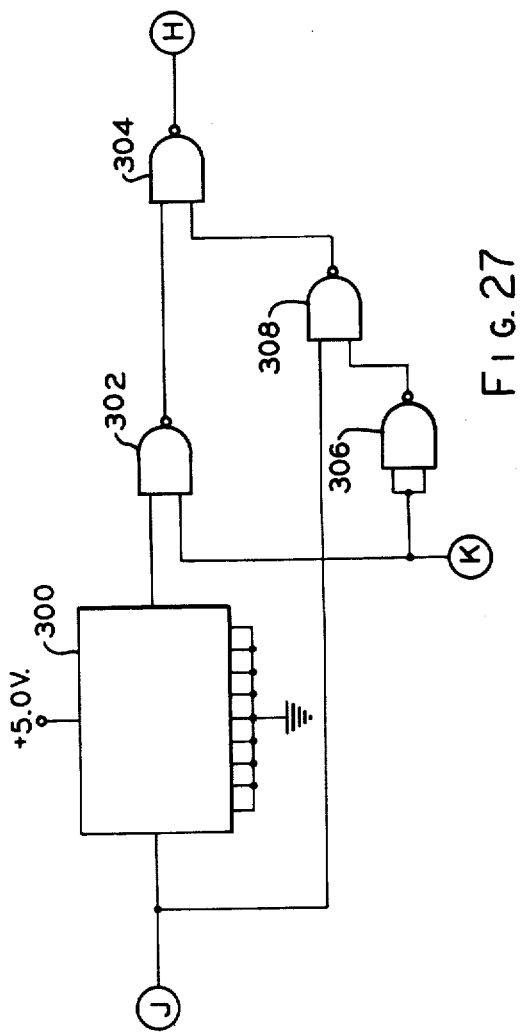
FIG. 26
FIG. 27

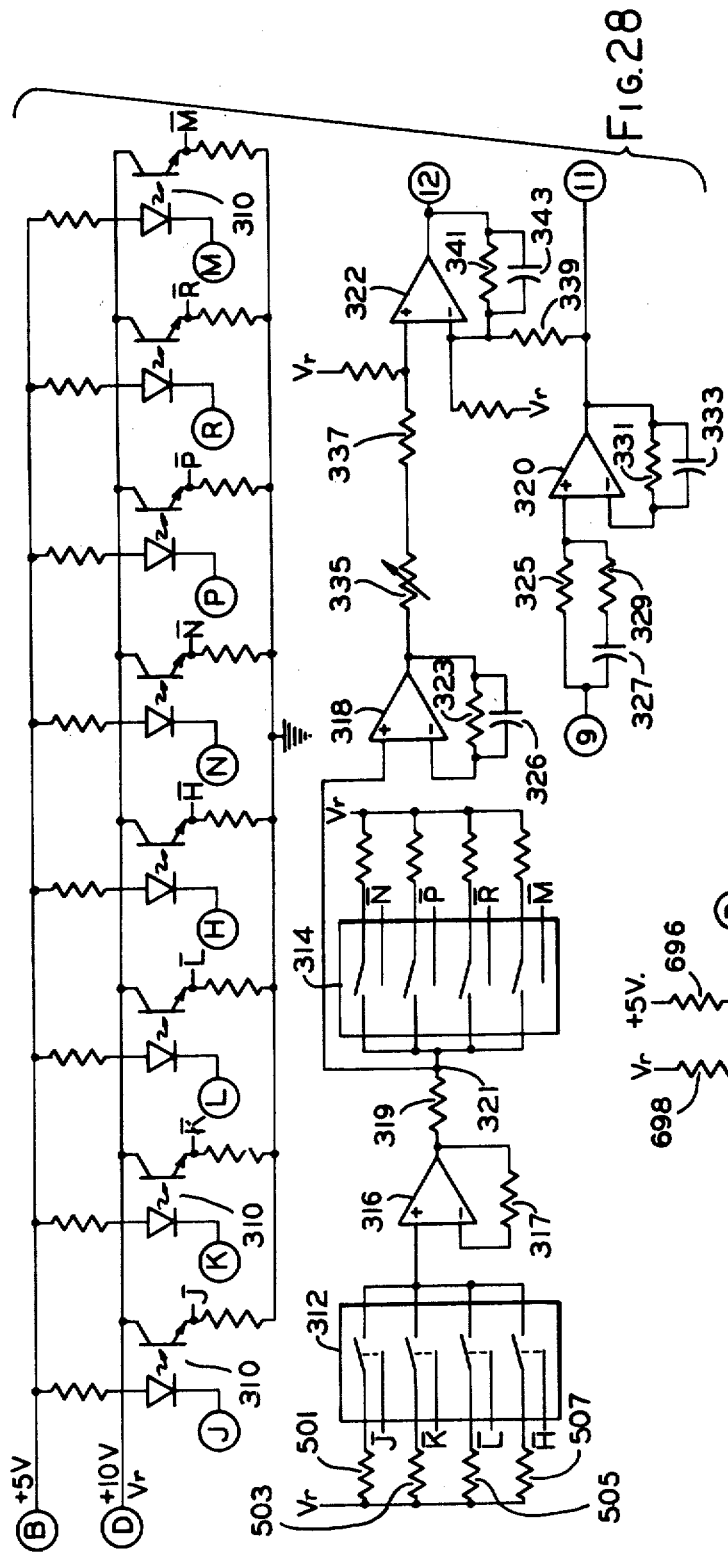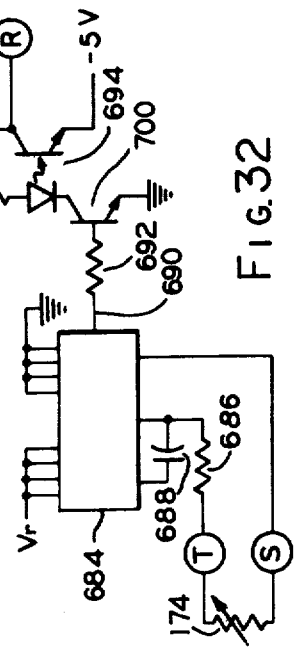
FIG.28
FIG.32

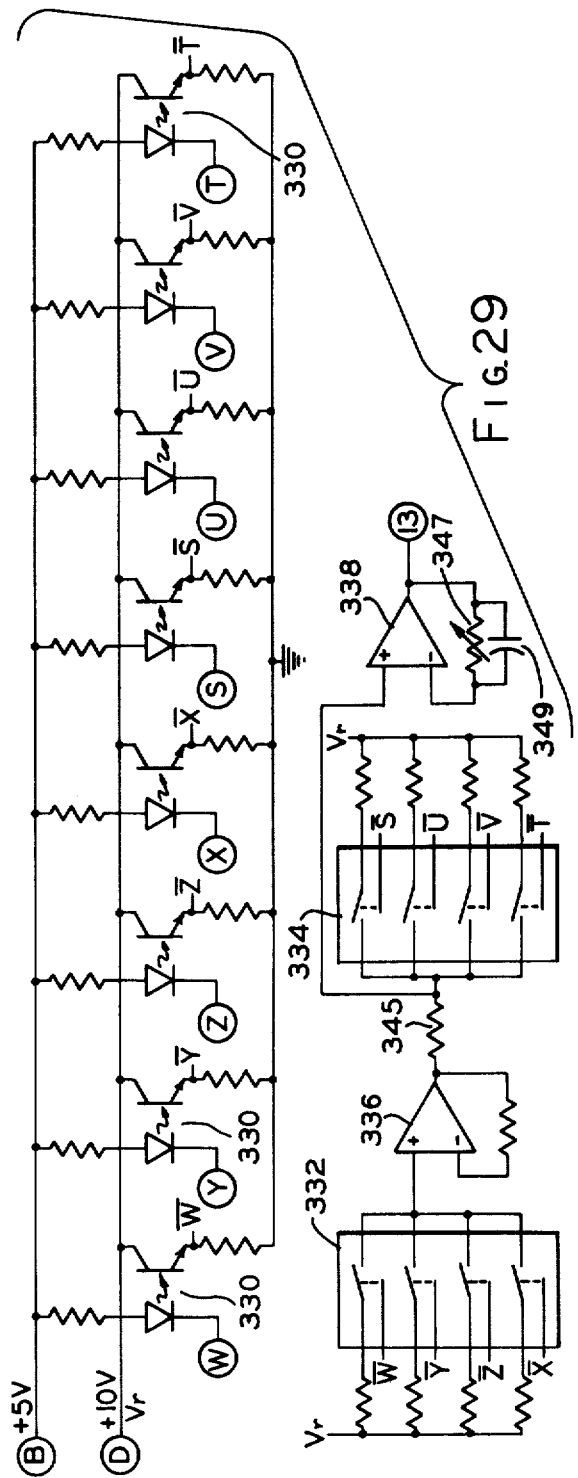
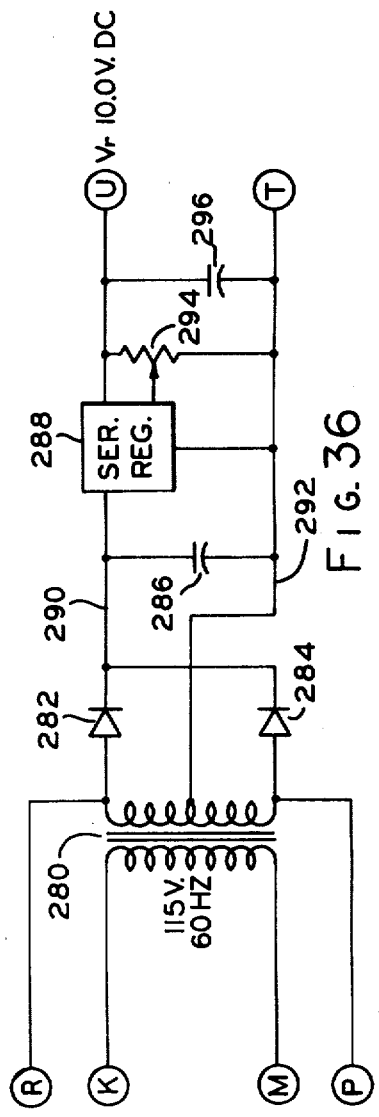

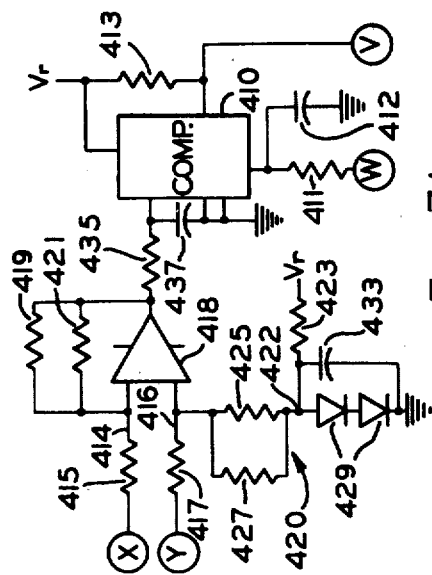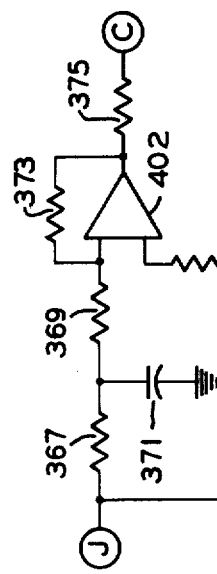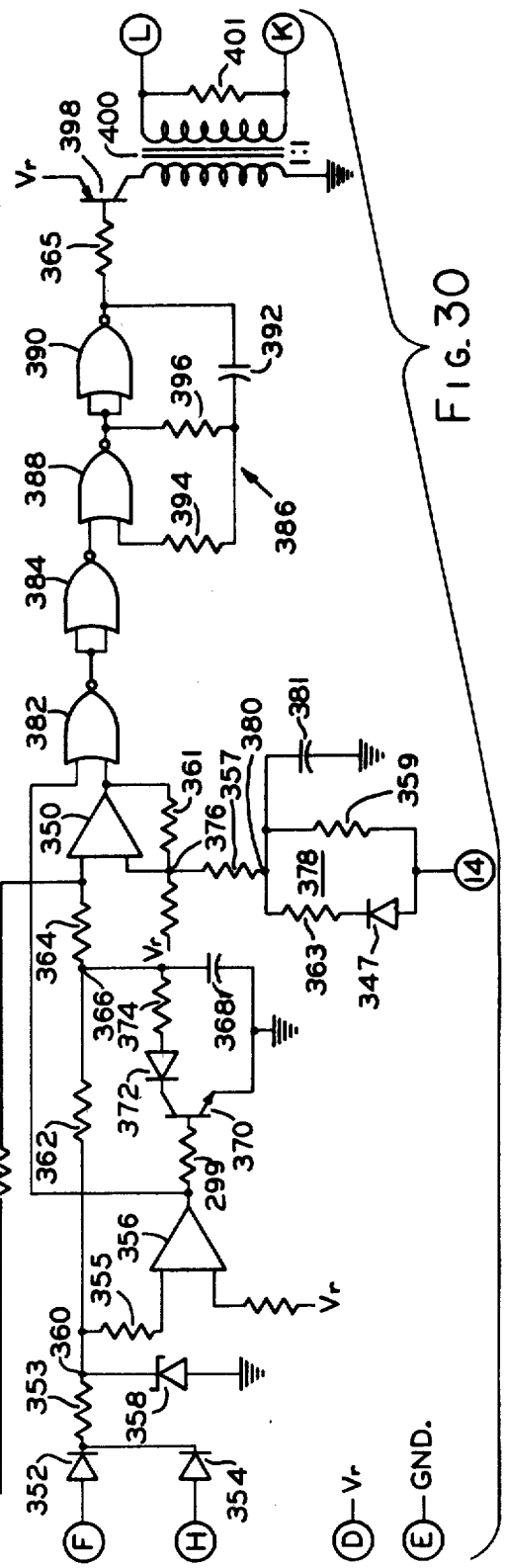

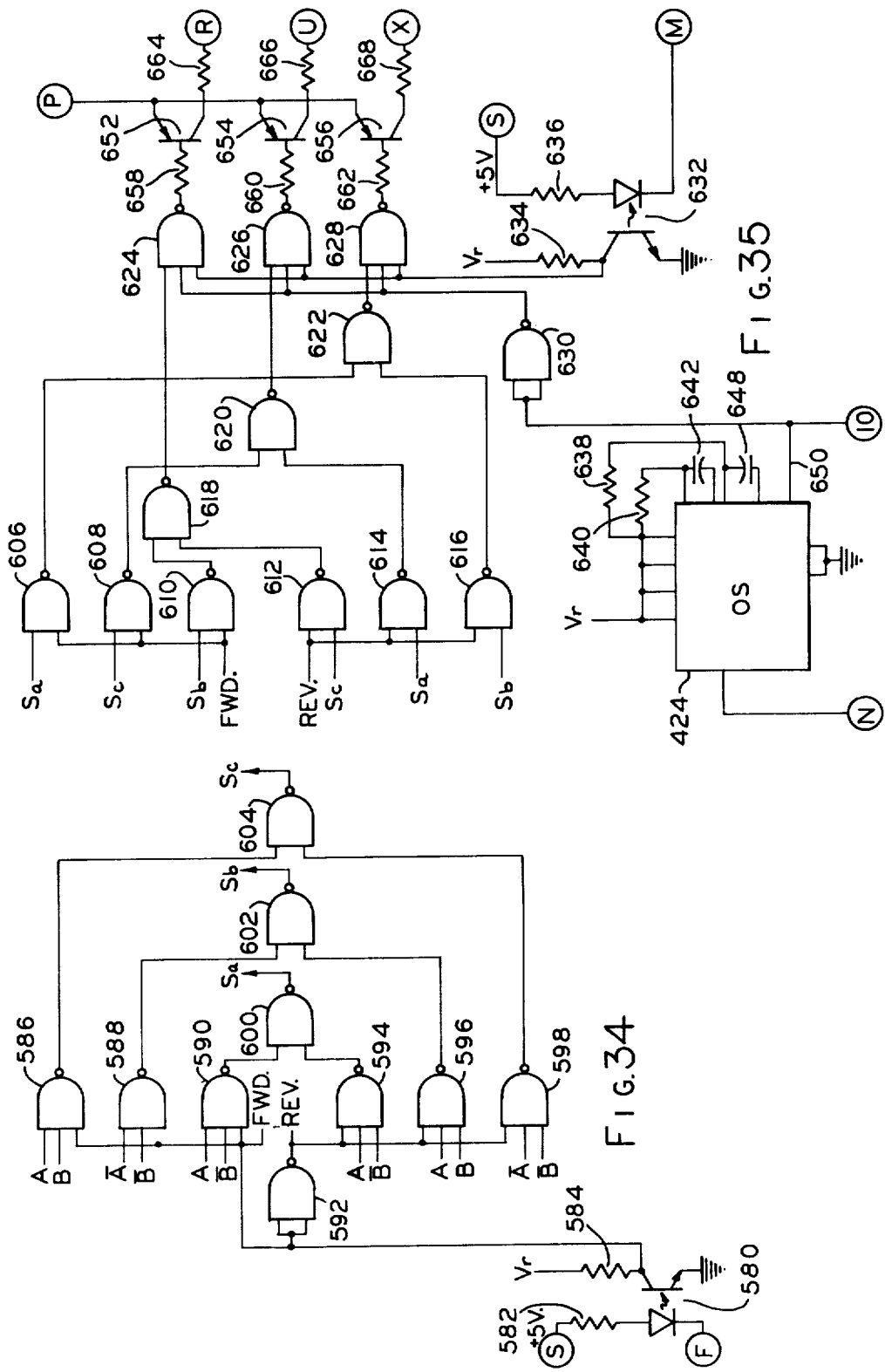

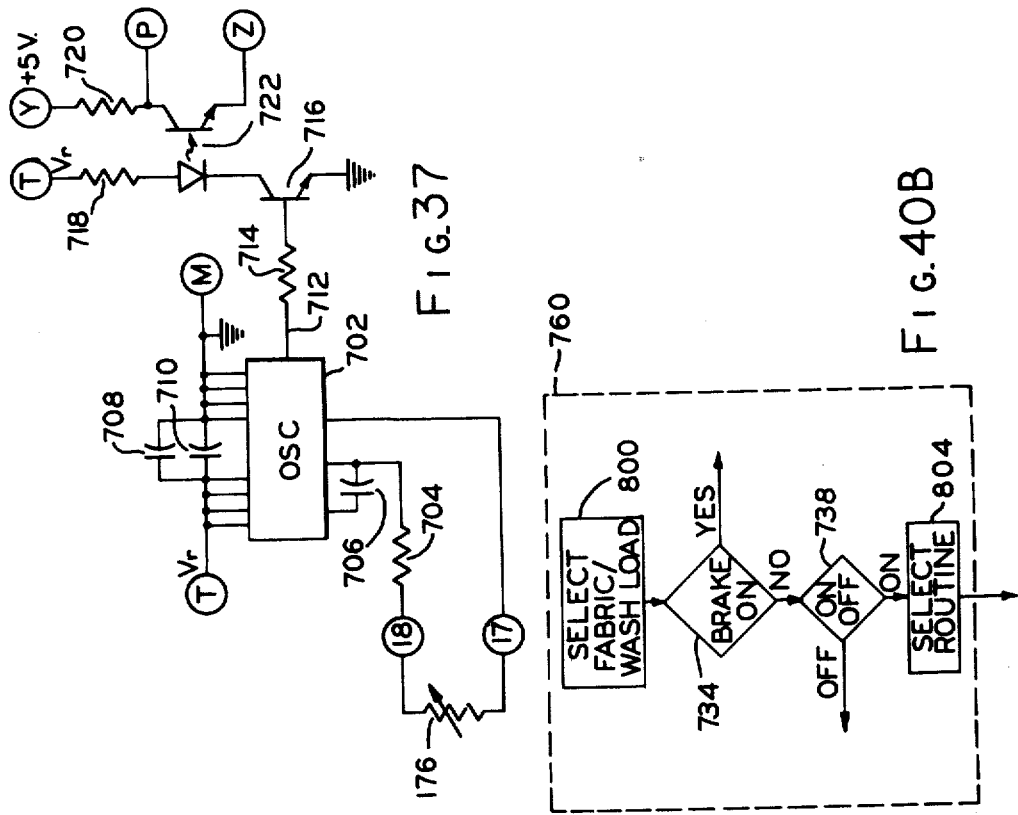
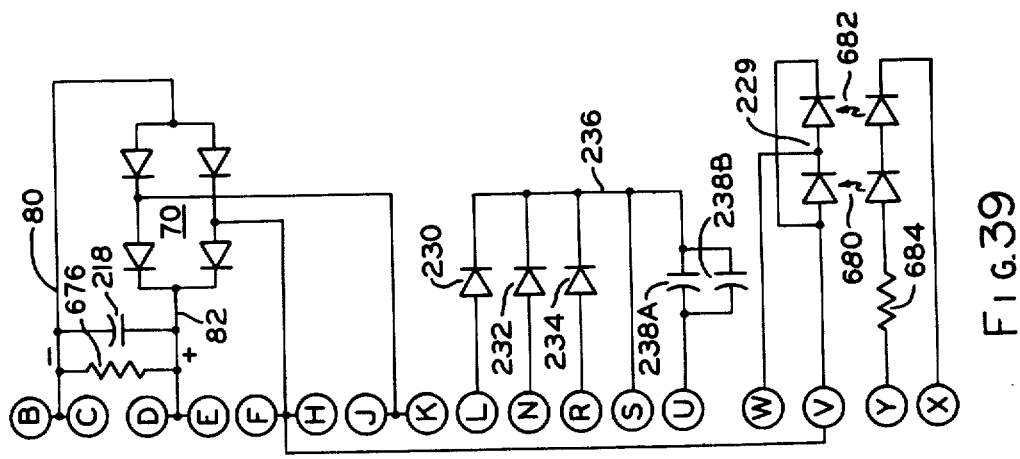

CONTROL SYSTEM FOR AN ELECTRONICALLY COMMUTATED MOTOR

CROSS-REFERENCE TO RELATED APPLICATIONS

This application is a continuation of copending application Ser. No. 141,267 filed Apr. 17, 1980 which is a continuation-in-part of copending application Ser. No. 77,656 filed Sept. 21, 1979 (now abandoned) which was in turn a continuation-in-part of the then copending Ser. No. 802,484 filed June 1, 1977 (now U.S. Pat. No. 4,169,990 issued Oct. 2, 1979). In turn, application Ser. No. 802,484 was a continuation-in-part of the then copending application Ser. No. 729,761 filed Oct. 5, 1976 (now abandoned), and such abandoned application was a continuation-in-part of the then copending application Ser. No. 482,409 filed June 24, 1974 (now U.S. Pat. No. 4,005,347). All of the aforementioned applications which are commonly assigned are respectively incorporated by reference herein. The following commonly assigned applications are also respectively incorporated by reference herein: David M. Erdman and Harold B. Harms, Ser. No. 141,268 filed Apr. 17, 1980; and Doran D. Hershberger, Ser. No. 77,784 filed Sept. 21, 1979 (now U.S. Pat. No. 4,327,302 issued Apr. 27, 1982).

FIELD OF THE INVENTION

The present invention relates in general to a laundering system, including apparatus and method for operating a laundry machine by means of an electronically commutated motor which provides the basic motion of the rotatable laundry machine components.

BACKGROUND OF THE INVENTION

Many conventional laundry machines used a complex mechanism which adapted a constant speed motor, e.g., one which runs at 1800 RPM, to the comparatively slow back-and-forth motion of an agitator during a wash cycle. The same mechanism adapted the motor to a unidirectional spin cycle during which a tub rotated, alone or together with the agitator, at a speed which may have been on the order of 600 RPM. In general, the physical dimensions of the motor required for such machines, as well as the dimensions of a transmission for coupling the motor to the machine, may be large and may necessitate that the motor be positioned a considerable distance out of line with the axis of the drive shaft of the laundry machine. This distance was sufficiently large to accommodate an intermediate belt transmission, as well as whatever gearing was required to step down the speed of the motor. Further, a transmission clutch was provided to uncouple the machine from the motor whenever the agitator reverses direction during the back-and-forth motion of the latter.

The above-outlined mechanical arrangement may be unbalanced so that special measures may be necessary to restore the balance of the machine. Further, because of severe demands made on such machine, particularly on the transmission during a reversal of direction, at least some of such machines may have had a relatively short life. It is believed that the above discussed factors might find expression in high initial cost of such machines, as well as in high maintenance costs and the necessity for frequent replacement of component parts of such machines.

The transmission for the unidirectional motor required to meet the demands of such a laundry machine consequently may have a relatively large moment of inertia. Additionally, the gear transmission ratios required by the relatively high torque requirements, particularly during agitator reversal, may have further aggravated this condition. Also, the requirement for dissipating energy whenever the agitator reversed directions during the wash cycle may have produced inefficiencies. It is believed that the greater the inertia of the system, the lower is the efficiency of system operation. Thus, the initial cost of a motor of the size required for a conventional laundry machine, as well as the cost of operation of such a motor, may be high.

Finally, the range of operations of conventional laundry machines is believed to be, by necessity, limited. To provide such machines with the capability of handling a larger number of different laundry conditions, such as may be presented by a variety of present day fabrics and wash loads, is believed to materially increase the complexity of the transmission as well as the overall cost of the machine. Thus, the capability of such conventional laundry machines may represent a compromise between different expected laundry conditions, modified by cost and mechanical considerations. It is believed that this capability, selected at the manufacturing site and once determined, may be changed only with difficulty and at great expense. For practical purposes, it is believed that no changes were possible once the machine leaves the factory.

SUMMARY OF THE INVENTION

Among the several objects of the present invention may be noted the provision of an improved system for controlling an electronically commutated motor which overcomes at least some of the above discussed disadvantageous or undesirable features of the prior art; the provision of such improved system in which a plurality of different control functions may be imposed on such motor so as to control the operation thereof to provide the basic motion of such and motor as well as apparatus driven thereby; the provision of such improved system which achieves improved energy efficiency and corresponding cost savings; the provision of such improved system which may be adapted to a large number of different laundry modes or conditions; the provision of such improved system which adapts automatically to existing load conditions; and the provision of such improved system having components which are simple in design, economically manufactured and easily assembled. These as well as other objects and advantageous features will be in part pointed out and in part apparent hereinafter.

In general, a system is provided in one form of the invention for controlling the energization of an electronically commutated DC motor including a stationary assembly having a plurality of winding stages, and a rotatable assembly arranged generally in magnetic coupling relation with the stationary assembly upon the energization of the motor and adapted to be coupled to a load. The system has means for providing a voltage representative of a preselected angular velocity for the rotatable assembly and means for providing a voltage representative of the actual angular velocity of the rotatable assembly. Regulation means includes means for comparing the voltages respectively representative of the preselected and actual angular velocities to provide a first error signal, and means is responsive to at least the first error signal for providing a regulation signal.

Signal switching means includes a first input, an output, and a control input, and means is provided for applying a full wave rectified sinusoidal signal to the first input. Means is also provided for applying the regulation signal to the control input so as to control the duration of the full wave rectified sinusoidal signal at the output of the signal switching devices, and filter means for connection between the output and the signal switching means and the winding stages provides an effective voltage to the winding stages having an amplitude which varies with the controlled duration of the full wave rectified sinusoidal signal at the output of the signal switching means. Means is responsive to the angular position of the rotatable assembly for providing a position signal, and commutation means is responsive to the position signal for applying the effective voltage in sequence to respective ones of the winding stages thereby to effect rotation of the rotatable assembly generally at the preselected angular velocity therefor.

Also in general and in one form of the invention, a circuit is provided for controlling the energization of an electrical load from an AC source. The circuit has a pair of DC lines, and means is provided for rectifying the AC output of the source to apply a DC voltage across the DC lines in the form of a full wave rectified sinusoidal signal. Signal switching means for connection between the DC lines and the load establishes a conductive path therebetween during a variable time interval when the voltage applied by the full wave rectified sinusoidal signal exceeds a voltage across the load, and means including said switching means is provided for chopping the full wave rectified sinusoidal signal to apply pulses to the load during the variable time interval at a frequency which is high with respect to the frequency of the signal. Means connected to the chopping means for modulating the width of the pulses is responsive to an externally derived signal representative of the desired operation of the load, and means is responsive to load current for modifying the externally derived signal to maintain the amplitude of the load current below a predetermined level whereby a high power factor is presented to the AC source during a predetermined range of operation of the load.

Further in general, a method in one form of the invention is provided for operating a DC motor energized from an AC source. In this method, the output of the AC source is rectified to provide a full wave rectified sinusoidal signal, and the full wave rectified sinusoidal signal is converted into voltage pulses having a high frequency with respect to the frequency of the signal to provide an effective voltage to said motor. The voltage pulses are limited to a variable time interval in each half cycle of the full wave rectified sinusoidal signal during which the amplitude of the signal exceeds the effective voltage, and the winding stages are commutated by applying the effective voltage thereto in sequence.

Still further in general and in one form of the invention, a method is provided for operating a laundry machine driven by an electronically commutated DC motor with the motor being energized by a DC voltage provided across a pair of DC lines as a full wave rectified sinusoidal signal derived from an AC source. The laundry machine has a pair of rotatable components, and the motor has a stationary assembly with a plurality of winding stages and a rotatable assembly adapted to be selectively coupled to at least one of the rotatable components. In this method, the full wave rectified sinusoidal signal is converted into voltage pulses having a frequency which is high with respect to the frequency of the signal. A first control function is imposed on the operation of the laundry machine by modulating the width of the voltage pulses in accordance with a selected one of a plurality of first waveshapes to provide a resultant effective voltage to the motor, and a second control function is imposed on the operation of the laundry machine through the pulse width modulation to selectively set the maximum amplitude of the effective voltage. The voltage pulses are limited to a variable time interval in each half cycle of the full wave rectified sinusoidal signal during which the amplitude of the last recited signal exceeds the amplitude of the effective voltage, and the winding stages are commutated by applying the effective voltage thereto in sequence whereby the first and second control functions jointly determine the angular velocity of the at least one rotatable component.

Also in general, a laundering apparatus in one form of the invention includes a laundry machine having a pair of rotatable components; and an electronically commutated DC motor having a rotatable assembly and a stationary assembly with a pluralty of winding stages. Means is provided for selectively coupling the rotatable assembly to at least one of the rotatable components, and a control system is connected to the motor. Means is provided for applying a DC voltage to the control system, and the control system has first control means including means for providing a plurality of first waveshapes, means for selecting one of the first waveshapes, and means for controlling the application of the DC voltage in accordance with the selected first waveshape adapted to provide a resultant effective voltage to the winding stages, second control means has means for selectively setting the maximum amplitude of the effective voltage through the first control means, and the first and second control means are adapted to jointly determine the angular velocity of the rotatable assembly and of the rotatable components selectively coupled thereto. Means for commutating the winding stages by applying the effective voltage thereto in sequence includes a commutation circuit responsive to the angular position of the rotatable assembly to provide commutation signals, and a plurality of commutation switching means are each adapted to be connected in series with a separate one of the winding stages. Means is provided for applying the commutation signals in sequence to the commutation switching means to control its conductivity, and a first common point is connected to one terminal of each of the winding stages. First diode means is separately connected between the other terminal of each of the winding stages and a second common point, and the commutation switching means are adapted to be connected between a third common point and the other terminal of each of said winding stages. Means for electrically braking the rotation of the rotatable assembly is adapted to apply a negative torque to the assembly and to the rotatable components coupled thereto, and the braking means include an energy return circuit to connect a variable low impedance across the winding stages with the energy return circuit comprising capacitor means connected between the first and second common points. First impedance means, first transistor means and second diode means are connected to series combination between the first and second common points, and voltage divider means and second transistor means are connected in series combination substantially between the second and third common points with the voltage divider means including second and third impedance means connected at a fourth common point. Means is responsive to the voltage at the fourth common point to control the conductivity of the first transistor means, and means is provided for deriving a control signal representative of the actual angular velocity of the rotatable assembly. Means is provided for applying the control signal to the second transistor means to decrease the conductivity thereof whenever the actual angular velocity exceeds the angular velocity determined by the control means, and the decreased conductivity of the second transistor means is effective to increase the conductivity of the first transistor means. Energy generated upon the commutation of the winding stages is stored in the capacitor means for subsequent dissipation, and the negative torque is variably applied to the rotatable assembly in proportion to the amount by which the actual angular velocity exceeds the angular velocity determined by the control means.

BRIEF DESCRIPTION OF THE DRAWINGS

FIG. 1 illustrates a laundry machine representative of the existing state of the art;

FIGS. 2A–2F shows various performance characteristics illustrative of the wash cycle of a typical laundry machine;

FIG. 9 illustrates the angular velocity/torque and current/torque performance, respectively, of the ECM of FIG. 7;

FIG. 10 illustrates the efficiency/angular velocity characteristic of the ECM of FIG. 7;

FIG. 11 illustrates the efficiency/torque characteristic of the ECM of FIG. 7;

FIG. 12 illustrates the angular velocity/torque and current/torque performance, respectively, of the ECM of FIG. 8;

FIG. 13 illustrates the efficiency/angular velocity characteristic of the ECM of FIG. 8;

FIG. 14 illustrates the efficiency/torque characteristic of the ECM of FIG. 8;

FIG. 15 is a schematic illustration of a laundering system in accordance with the present invention;

FIG. 17A shows the essential elements of a control system which uses time ratio control in accordance with the present invention;

FIG. 17B illustrates the operation of the control system of FIG. 17A;

FIG. 19B illustrates the power factor obtained with the control system of FIG. 19A for a range of operating conditions;

FIG. 21 shows a preferred panel switch arrangement for imposing pertinent control functions on the operation of an ECM-driven laundry machine in accordance with the present invention;

FIG. 22A shows exemplary waveshapes for selectively controlling the applied voltage and the current of an ECM in accordance with the present invention;

FIG. 22B illustrates a method used for step-sampling a selected one of the waveshapes of FIG. 22A, at a chosen rate;

FIG. 23A illustrates a further control capability of the present invention for varying the amplitude of the excursions upon oscillation of the rotatable motor assembly;

FIG. 23B illustrates still another control capability of the present invention for varying the acceleration of the rotatable motor assembly;

FIG. 26 shows a low voltage power supply for use in the preferred control system;

FIG. 27 shows a rate scaling circuit for use in the preferred control system;

FIG. 28 illustrates a D/A signal converter and error amplifier for controlling the voltage applied to the ECM;

FIG. 29 illustrates a D/A signal converter for controlling the ECM current;

FIG. 30 illustrates a phase control circuit using a ramp and pedestal technique for controlling the effective motor voltage;

FIG. 31 shows an error amplifier for use in the preferred control system;

FIG. 32 illustrates a circuit for sampling a selected waveshape, e.g., a voltage waveshape, at a variable rate;

FIG. 34 illustrates a decoding circuit for providing rotor position control signals;

FIG. 35 illustrates a decoding circuit for providing commutation signals;

FIG. 36 shows another low voltage power supply for providing a regulated reference voltage in accordance with the present invention;

FIG. 37 illustrates another circuit for sampling a selected waveshape, e.g., a current waveshape, at a variable rate;

FIG. 39 illustrates further circuitry and various terminal connections of the control system shown in FIGS. 26–38;

FIG. 40B illustrates a modification of the operation shown by the flow chart of FIG. 40A.

DESCRIPTION OF THE INVENTION

Figure 3:
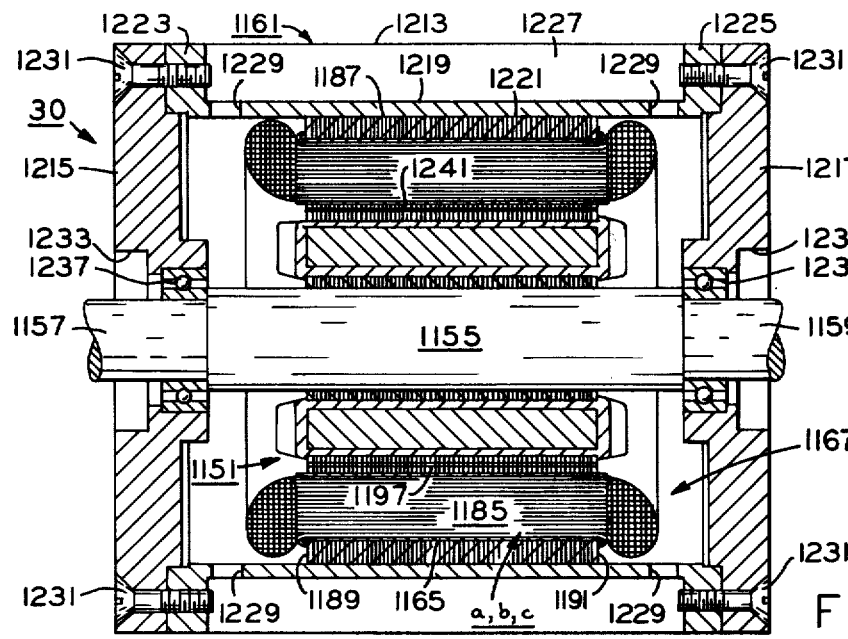
FIG. 3 is a sectional view of an electrically commutated motor that may be used to implement the present invention.

The significance of the present invention in relation to the existing state of the art will be best understood from a review of the structure and operation of a typical household laundry machine of the type in common use today, as illustrated in FIG. 1 and designated with the reference numeral 8a. Machine 8a contains, among other components, a perforated tub 10a and a finned agitator 12a, the latter being coaxially positioned in the tub. Both components are capable of coupling onto a common drive shaft, not shown, either for independent movement or for joint movement therewith. A drive wheel 11 is coupled to the drive shaft through gearing 13 and is powered by a drive belt 14. The latter transmits power from a pulley wheel 16 which is fast with a clutch 18, adapted to selectively engage a constant speed, unidirectional motor 20, e.g. an 1800 RPM induction motor.

The size of motor 20 is determined to a large extent by the torque requirements placed on it. These requirements are believed to be severe since the motor, although unidirectional, must drive the agitator in a back-and-forth motion. The resultant size of motor 20 and of the transmission required do not permit placing the motor in line with the drive shaft of the laundry machine without unduly raising the height of the machine. Thus, the motor is placed to one side of the drive shaft and is coupled to the latter through clutch 18, intermediate belt and pulley coupling 16, 17, 11 and gears 13. It is believed that the off-center placement of the motor not only produces a loss of efficiency but also unbalances the laundry machine and necessitates that a counterweight 22 be placed diagonally opposite the motor to restore the balance of the machine.

The operation of the above-described home laundry machine typically has a wash cycle during which the agitator is moved back and forth through a predetermined displacement angle. The operation further includes a spin cycle during which the tub is unidirectionally rotated at a predetermined speed. The wash cycle of such a machine is illustrated in FIGS. 2A–2F. FIG. 2A illustrates the displacement of the agitator in the example under consideration, from which it can be seen that the agitator undergoes essentially harmonic motion during the wash cycle. The equation which describes the displacement of the agitator is as follows:

$$\theta = \theta_0 \cos \omega t$$
$$= 1.4 \cos \omega t$$

where
$\theta$ = Displacement angle in radians
$\omega$ = Angular velocity in radians/sec.

As shown in FIG. 2A, in the example under consideration the maximum displacement is 1.4 radians. The period of the agitator is 1.2 seconds and the midpoint of the stroke occurs at 0.6 seconds.

The velocity of the agitator during the wash cycle is given by the following equation:

$$\Omega = -\omega \theta_0 \sin \omega t$$
$$= -\frac{2\pi \theta_0}{T} \sin \omega t$$
$$= 14.65 \sin \omega t$$

FIG. 2B illustrates the velocity characteristic which is seen to reach a peak of 14.65 radians per second at the 90° and 270° points, respectively, of the agitator travel.

The equation for agitator acceleration is given below:

$$a = \omega^2 \theta_0 \cos \omega t$$
$$= -153.5 \cos \omega t$$

The acceleration of the agitator is illustrated in FIG. 2C and is seen to reach a peak of 153.5 rad/sec$^2$ at the extremes of the agitator travel. Zero acceleration occurs at the 90° and 270° points, i.e. at the points of maximum velocity.

Since the period of agitator oscillation is 0.6 seconds, the agitator oscillates at a frequency 1.67 cycles/second. The power required to produce this motion has a double frequency component, as shown in FIG. 2D, reaching maximum values at 90° intervals. The equation for deriving the required power is given below:

$$P = K \left[ \frac{T_p \omega_p}{2} - \frac{T_p \omega_p}{2} \cos 2\omega t \right]$$

where
$T_p$ = Peak torque
$\omega_p$ = Peak angular velocity;
$K$ = Constant.

Average power may be approximated by the relationship:

$$P = \frac{K T_p \omega_p}{2}$$

For the example under consideration, the average power required assumed to be generally about is 100 watts.

FIG. 2E illustrates the relationship between torque T and angular velocity $\omega$. As shown, the angular velocity lags the applied torque by the phase angle $\beta$. The derivation of the phase angle is further illustrated in FIG. 2F and is seen to be a function of the inertia torque, i.e. the moment of inertia, and the friction torque, i.e. the friction factor. The latter is the sum of the friction contributed by the gears, the agitator and the load in the laundry machine. It does not include the friction due to the rotor of the unidirectional driving motor, since the rotor does not reverse directions in the laundry machine under discussion. The lag angle β is approximately 12° in the example under consideration.

During the spin cycle of the typical laundry machine under discussion here, the tub is slowly accelerated to a preselected number of revolutions, say for instance approximately 300 RPM. At that point a slip clutch maintains constant torque until the water is expelled from the tub. The clutch slips at a constant preselected torque. After the water is drained from the tub, the torque drops below this value and the tub accelerates to its preselected peak speed, say for instance approximately 600 RPM. It remains at that speed for a predetermined time interval, i.e., say for instance several minutes, until all the water is expelled from the wash load.

Thus, where a constant speed, unidirectional motor is used, a belt transmission and a clutch are believed to be required to provide the oscillating motion of the agitator. Further, gears are employed to match motor performance to the desired torque and speed of the agitator. The clutch is adapted to slip in order to limit the torque applied during the spin cycle. Apart from its complexity, it is believed that such a mechanism is costly and is subject to frequent breakdowns.

In the present invention, the clutch and belt portions of the aforesaid transmission are eliminated by a direct drive arrangement for both the agitator and the tub. In lieu of a constant speed induction motor, a bidirectional electronically commutated DC motor (ECM) is employed, which is capable of producing the relatively slow agitator oscillation of the wash cycle, as well as the high, unidirectional spin speed of the tub. Both can be implemented by means of appropriate control of the voltage and current applied to the motor windings.

For a better understanding of the invention which forms the subject matter of this application, it will be useful to explain the salient points of electronically commutated motors with reference to specific motor examples that may be used to implement the invention. Typically, the rotatable assembly of the ECM, occasionally referred to herein as a rotor, employs means, such as permanent magnets for providing a relatively constant DC flux field. The stationary assembly of the ECM, sometimes referred to herein as the stator, includes distributed winding stages which are used to provide mutually perpendicular magnetic fields which interact with the DC flux field to produce rotation of the rotatable assembly without the use of brushes. These winding stages may be commutated on the basis of sensed variables such as, for example, speed, current and/or position of the rotatable assembly. When commutation occurs on the basis of the latter position, shaft position sensors may be employed to determine the angular position of the rotatable assembly at any given instant of time. The sensors may consist of stationary photosensitive devices which cooperate with a light interrupting shutter mounted on the rotatable assembly.

In carrying out the present invention in one form thereof a position detecting circuit is used which is responsive to the electromotive force of the ECM, i.e., to its back EMF. The latter circuit provides a simulated signal indicative of the angular position of the shaft of the rotatable assembly. Such an arrangement eliminates the mounting and maintenance requirements associated with the aforementioned shaft position sensors. A logic circuit responds to these signals and controls current switching in the stator winding stages. Means may also be provided for selectively advancing the commutation of the winding stages in order to optimize motor performance.

Figure 4:
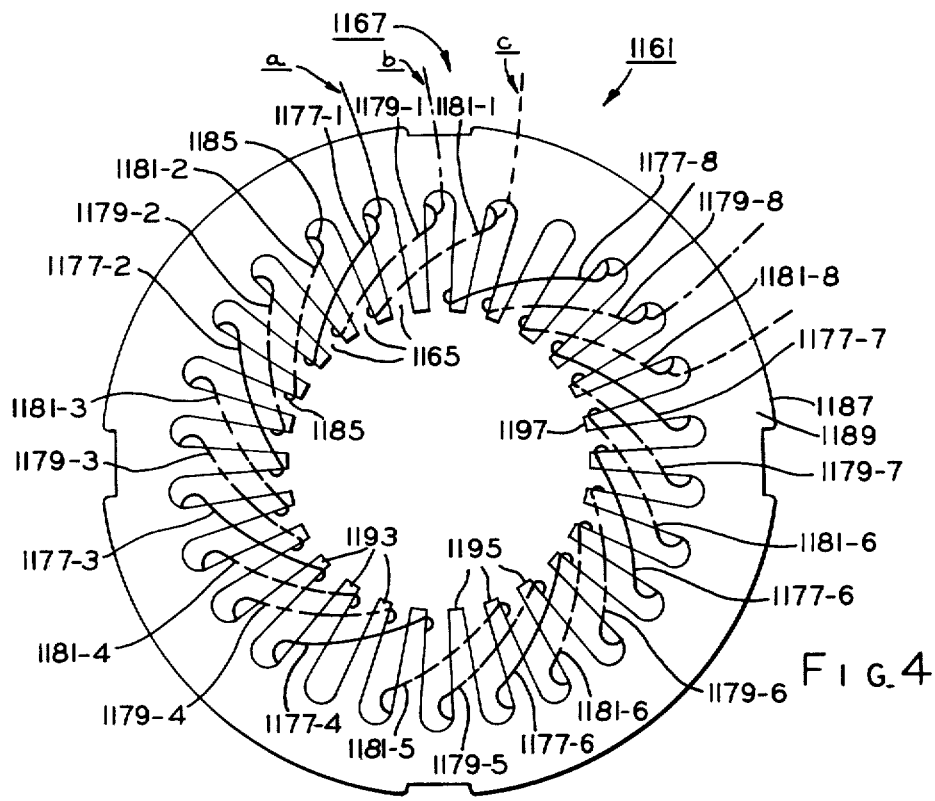
FIG. 4 illustrates an exemplary winding arrangement which may be used by the stationary assembly of the ECM shown in FIG. 3.

FIG. 3 illustrates an exemplary electronically commutated motor (ECM) 30 which may be used in accordance with the principles of the present invention. FIG. 4 illustrates an exemplary winding arrangement for the stationary assembly of the ECM of FIG. 3. An example of such a motor is disclosed in the above-mentioned patent application Ser. No. 77,784 filed Sept. 21, 1979, now U.S. Pat. No. 4,327,302 issued Apr. 27, 1982. incorporated by reference herein.

A housing 1213 comprises a generally cyclindrical sleeve 1219 which may be formed of any desired material. The sleeve has a bore 1221 extending therethrough between a pair of opposite annular end flanges 1223, 1225 or the like, integrally formed with the sleeve. A plurality of cooling fins 1227 are integrally formed on sleeve 1219 externally thereof between end flanges 1223, 1225, and a plurality of vent holes 1229 may be provided, if desired, through the sleeve adjacent the end flanges so as to intersect with sleeve bore 1221, respectively. Peripheral portion 1187 of stationary assembly 1161 is received within sleeve bore 1221, being retained therein by suitable means.

End shields 1215, 1217 are secured to housing 1213 adjacent opposite end flanges 1223, 1225 of sleeve 1219 by suitable means, such as a plurality of screws 1231 or the like. A pair of generally centrally located bearing openings 1233, 1235 extend through end shields 1215, 1217, and a pair of bearing means, such as self-lubricating bearings 1237, 1239 for instance, are mounted in the openings respectively. Rotatable assembly 1151 is generally coaxially arranged within bore 1197 of stationary assembly 1161 so as to provide a predetermined air gap 1241 therebetween. Shaft extensions 1157, 1159 of the rotatable assembly extend through bearings 1237, 1239 so as to be journaled thereby, respectively. Thus, the pole sections of the rotatable assembly are disposed in magnetic coupling relation with winding stages a, b and c of stationary assembly 1161. The winding stages are adapted to be commutated in sequence as discussed hereinafter.

It is characteristic of the stationary assembly under discussion, that the number of slots 1165 employed in stationary assembly 1161 to accommodate a multi-stage winding arrangement 1167 is different than the product of an integer multiplied by the number of poles in rotatable assembly 1151. Thus it will be noted that the twenty-six winding slots 1165 in the stationary assembly accommodate the three winding stages a, b and c magnetically coupled with the eight poles of rotatable assembly 1151. Similarly, the number of slots in the stationary assembly, i.e., twenty-six slots, is different than the product of an integer multiplied by the eight poles of the rotatable assembly.

In the operation of ECM 30, it is desirable to provide an advanced timing angle, i.e., an advancement of the energization of commutation of winding stages a, b and c, which is defined as angle α. In explanation of this timing angle advancement, zero advancement would occur in ECM 30 if one of the winding stages were energized at the instant the magnetic center of one of the pole sections in the rotor rotated into a position spaced approximately twenty-two and one-half degrees from the axis of one of the magnetic poles established by the energization of such a winding stage.

The preferred amount of advancement of timing angle α is associated with the L/R time constant of multi-stage winding arrangement 1167. At the aforementioned zero advancement, current in winding stages a, b and c would build up too slowly to achieve maximum possible torque throughout the full "on" time. Thus, advancing the commutation angle, as discussed above, takes advantage of the fact that the generated back EMF is less during incomplete coupling, i.e., when the polar axis of the rotatable assembly and the energized one of winding stages a, b and c are not in exact alignment; therefore, current build-up time and torque development can be improved. If the advanced timing angle is too great, current overshoots may occur which adversely affect efficiency; therefore, the optimum value of the advanced timing angle depends to some extent on the desired speed at which electronically commutated motor 30 is operated and the torque desired therefor.

With continued reference to FIGS. 3 and 4, the stationary assembly has a generally cylindrically shaped peripheral portion or section 1187 interposed between opposite end faces 1189, 1191 thereof. However, it is contemplated that other stationary assemblies having various other shapes, such as opposite peripheral flats thereon for instance, as well as other slot shapes or configurations, may be utilized within the scope of the invention so as to meet at least some of the objects thereof.

A plurality of teeth 1193 are integrally formed on stationary assembly 1161 between adjacent ones of winding slots 1165, with the teeth and slots extending generally axially through the core so as to intersect with the aforesaid opposite end faces. The teeth have generally arcuately spaced apart tips or radially inner ends 1195 which define, at least in part, a bore 1197 extending generally axially through the core between the opposite end faces thereof, respectively. While twenty-six winding slots 1165 are shown in the drawings, it is contemplated that other stationary assemblies having more or fewer winding slots may be employed or that winding slots of various other shapes may be used. Furthermore, while teeth 1193 and tips 1195 thereof are illustrated herein as being generally radially extending or straight, it is contemplated that teeth and tips thereof having various other shapes or positions may be employed.

The winding arrangement used is best shown in FIG. 4. This multi-stage winding arrangement, indicated generally at 1167, includes a plurality of winding stages a, b and c, each having a plurality of coils 1177-1 to 1177-8, 1179-1 to 1179-8 and 1181-1 to 1181-8. Each of the coils has at least one conductor turn with opposite side portions 1185 received or otherwise accommodated in respective ones of slots 1165. Most, or at least some, of coils 1177, 1179, 1181 in winding stages a, b, c have a side turn portion 1185 thereof sharing a respective one of slots 1165 with a side turn portion of other coils in the same winding stage, respectively. Two pairs of coils 1179 in winding stage b have a side turn portion 1185 thereof sharing respective ones of slots 1165 with two pairs of coils 1177, 1181 in winding stages a and c. Two pairs of coils 1167, 1181 of winding stages a and b have a side turn portion thereof which do not share a respective one of slots 1165.

Figure 5:
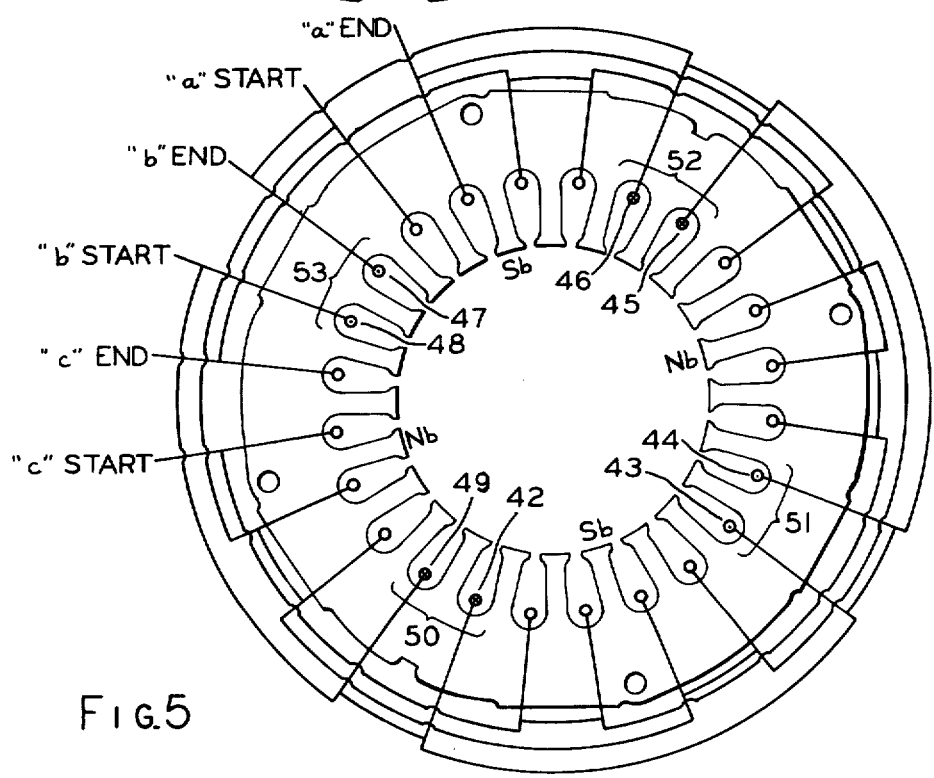
FIG. 5 illustrates a further winding arrangement for the stationary assembly of an ECM that may be used to implement the present invention.

FIG. 5 shows an alternative stationary assembly of an ECM that may be used in the present invention in lieu of the motor described above. An example of such alternative ECM is disclosed in the above-mentioned patent application Ser. No. 802,484, incorporated by reference herein. In this alternative example, the winding configuration comprises a 24 slot stator of a three-stage, four pole motor. Although each coil may have a plurality of conductor turns, for the sake of clarity the coils in FIG. 5 are illustrated with only a single turn per coil in each slot.

The three winding stages in FIG. 5 are designated a, b and c, each including one winding formed from four coils. For example, the winding of winding stage b has four coils. The first coil is disposed in core slots 42 and 43, the second coil is disposed in slots 44 and 45, the third coil is located in slots 46 and 47 and the fourth coil is in slots 48 nd 49. The coils may be wound consecutively, or separately and then disposed and interconnected to produce current flow. In FIG. 5, the symbol ⊗ indicates current flow away from the observer, while the dot notation in a circle indicates current flow toward the observer.

As illustrated, the side turns of the coil create four winding sets 50–53. Winding set 50 is disposed in slots 49 and 42; winding set 51 is in slots 43 and 44; winding set 52 is in slots 45 and 46; and winding set 53 is in slots 47 and 48. As illustrated, the conductor portion of each winding set conducts current in the same axial direction as indicated, i.e., along the axial length of the core when the winding of winding stage b is energized. Thus, two pairs of magnetic poles $N_b$ and $S_b$ are created. The winding of winding stages a and c are formed in the same manner as for winding stage b, each having four winding sets with conductor portions conducting current in the same axial direction along the core when energized.

The three stage, four pole armature winding arrangement illustrated in FIG. 5 has a winding "spread" of 30 mechanical degrees, or 60 electrical degrees. The "spread" is the angular expanse of adjacent core slots that carry the conductors of a given winding, which instantaneously conduct current in the same axial direction along the axial length of the core. As shown in FIG. 5, a set of windings in winding stage b occupies two adjacent slots and all of the conductors within the set carry current in the same axial direction along the axial length of the core. Thus, the spread is the angular expanse of the two slots occupied by the set. In the illustrated example, this spread is 60 electrical degrees, or 30 mechanical degrees.

The torque per ampere (T/I) characteristic of such a motor is a function of winding spread and permanent magnet arc length. It is generally preferred to keep the T/I waveform as "flat" as possible since motors having steep waveforms are more subject to starting problems. The duration of the maximum value of the T/I characteristic is increased by minimizing the winding spread and/or maximizing the length of the rotor magnet. In addition, as discussed in connection with FIGS. 3 and 4, an optimum advance timing angle, based on rotor speed and on the L/R time constant of the windings, is selected to advance the commutation of the windings and permit a reduction in the arc length of the magnet. The functional relationship of these factors on a per pole basis is expressed by the following relationship:

$$\text{Magnet arc} = \frac{180(N-1)}{N} + \text{spread} - 2$$

-continued where: "Winding On" time = $\frac{180(N-1)}{N}$

Spread = $\frac{180}{N}$

N = Number of stages.

An appropriate angle of advance timing is 5°-30°. The expression for spread assumes that a core having uniform slot punchings is utilized and that all of the slots have winding turns in them. In addition, the expression for spread assumes a measurement from center line to center line of the teeth separating the winding measured from adjacent windings. The expression ignores second and third order tooth effects due to tooth width and tooth tip saturation, respectively.

Referring again to FIG. 5, the winding spread for winding of the 3-stage phase, 4-pole motor is 60 electrical degrees or 180°/N. The "on" time for each winding is 180 (N-1)/N, or 120 electrical degrees. Thus, the optimum permanent magnet arc length for a motor employing the stationary armature illustrated in FIG. 5 is 180 electrical degrees minus 10°-60°, depending on the optimum timing angle determined as a function of the load and speed of the motor.

Figure 6:
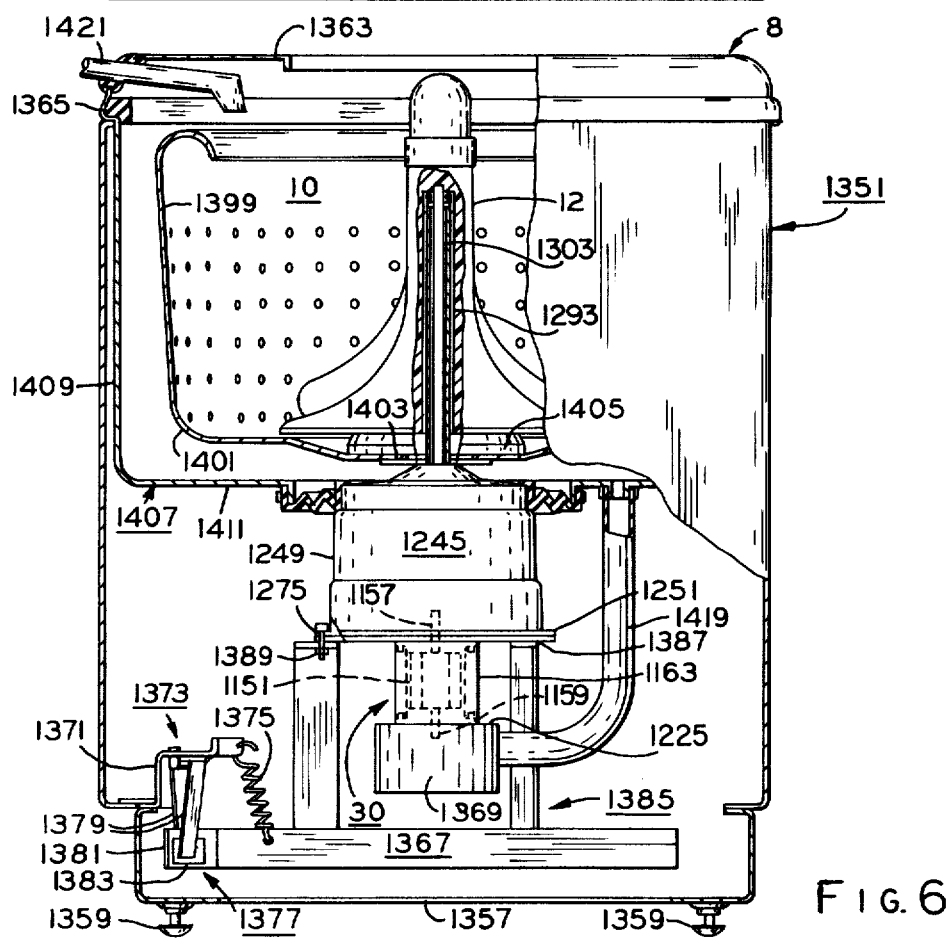
FIG. 6 is a partially cross-sectional view of a laundry machine in accordance with the present invention which may be driven by an ECM of the type shown in FIGS. 3–5.

FIG. 6 illustrates an ECM-driven laundry machine 8. The machine may be powered by a motor of the type described above in connection with FIGS. 3-5, through a transmission such as shown in FIGS. 20A-20D. Accordingly, in the discussion below reference is made to the apparatus shown in FIGS. 3, 6 and 20.

The cabinet of laundry machine 8 has a base 1357 with a plurality of adjustable or leveling support feet 1359 thereon. An outer or upper cabinet structure 1351 has the lower end portion thereof supported on, or otherwise connected to, base 1357 by suitable means, and the upper end portion of the upper cabinet structure supports or is otherwise connected with a cover 1363 therefor. Sealing means, such as a resilient gasket 1365 or the like for instance, is sealably fitted or otherwise interposed between the upper end portion of the cabinet structure 1351 and cover 1363.

Laundry machine 8 is provided with a supporting frame 1367 on which transmission mechanism 1245, electronically commutated motor 30, a pump device 1369 for the laundry machine, spin tub 10 and agitator 12 are supported generally in vertically aligned or in-line relation, as discussed hereinafter. Frame 1367 is suspended or otherwise mounted within cabinet 1351 on a plurality of brackets 1371 suitably attached to base 1357 by a plurality of damping means 1373; however, for the sake of simplicity only one of such bracket and damping means is shown in FIG. 6. Each vibration damping means 1373 has resilient means, such as a coil spring 1375 or the like for instance, biased or otherwise interconnected between bracket 1371 and frame 1367. Other resilient means, such as a generally U-shaped spring clamp 1377 or the like, is secured to the bracket having a pair of depending prestressed legs 1379 straddling a part 1381 of the frame in gripping engagement therewith with resilient friction pads 1383 interposed between the legs and the frame part, respectively. Thus vibration damping means 1373 acts not only to limit or damp twisting or torquing movement but also vertical movement of frame 1367 which may be imparted thereto particularly during the wash or spin cycles of the laundry machine.

A platform or other upstanding structure 1385 is generally centrally provided on frame 1367 and integrally connected thereto by suitable means (not shown). Lower end wall 1251 on casing 1249 of transmission mechanism 1245 is seated on an upper free end or seat 1387 of the platform being connected thereto by suitable means, such as a plurality of nuts and bolts 1389 or the like, arranged with mounting openings 1275 in the lower end wall and aligned mounting openings 1391 in the platform. ECM 30 is seen to be mounted to transmission mechanism 1245 so as to depend therefrom toward frame 1367. Shaft extension 1157 on rotatable assembly shaft 1151 of the ECM is journaled in bearing means 1281 disposed in lower end wall 1251 of transmission mechanism casing 1249 so as to constitute input shaft 1287 of the transmission mechanism. Input gear 1291 is mounted on the free end of shaft extension 1157 so as to be conjointly rotatable with rotatable assembly 1151 of the motor upon the energizatioin thereof. The other end shield 1217 of electronically commutated motor 30 may also be removed so that flange 1225 of housing sleeve 1219 is abutted against pump 1369, and the other shaft extension 1159 of rotatable assembly 1151 extends into driving engagement with the pump of laundry machine 8. Pump 1369 is secured to flange 1225 of motor 30 by suitable means, such as a plurality of nuts threadedly received on a stud plurality extending from the pump. While the aforementioned mounting arrangements or interconnections of transmission mechanism 1245 to platform 1385, electronically commutated motor 30 to the transmission mechanism, and pump 1369 to the motor have been illustrated herein for the purposes of disclosure, it is contemplated that various other mounting arrangements or interconnections may be made between such components of laundry machine 8 within the scope of the present invention so as to meet at least some of the objects thereof.

In FIG. 6, tub 10 is seen to include a generally annular perforate sidewall 1399 having a base wall 1401 integrally interconnected therewith. A generally central opening 1403 extends through the base wall. Means such as a collar 1405 or the like, is provided for securing tub 10 to tubular output shaft 1293 of transmission mechanism 1245. The securing means or collar extends through opening 1403 in tub base wall 1401, being grippingly and sealably engaged with the opposite sides thereof generally about the opening. Although not shown, the tubular output shaft 1293 extending exteriorly of transmission mechanism casing 1249 is connected by suitable means with collar 1405 so that tub 10 is conjointly unidirectionally rotatable with the tubular output shaft during the spin cycle of laundry machine 8, as discussed hereinbelow. Further, upper end 1305 of output shaft 1303, which extends exteriorly of transmission mechanism casting 1249 and coaxially through tubular output shaft 1293, is connected by suitable means (not shown) with agitator 12 so that the agitator is conjointly oscillated with output shaft 1303 during the wash cycle of laundry machine 8.

An intermediate or enclosing tub 1407 is provided with a sidewall 1409 spaced generally between spin tub sidewall 1399 and the upper cabinet structure. A base wall 1411 is integrally formed with the enclosing tub sidewall, having a generally centrally located opening therethrough defined by an integral generally annular flange depending from the base wall in spaced relation generally adjacent casing 1249 of transmission mechanism 1245. A hose 1419 or other flexible connection for instance is connected between base wall 1411 of enclosing tub 1407 and pump 1369 providing a passage for the removal from the enclosing tub of water selectively discharged into tub 10 through a nozzle 1421.

Before proceeding with the discussion of the operation of laundry machine 8, it is appropriate to discuss in greater detail the exemplary transmission shown in FIGS. 20A -20D. Casing or cover 1249 of transmission mechanism 1245 encases a bearing support or housing indicated generally at 1263, disposed within a chamber 1265 of the casing. Bearing support 1263 includes a pair of cylindrical sidewalls 1267, 1269 with sidewall 1267 being seated on casing end wall 1251. An intermediate support wall or plate 1271 is interconnected between sidewalls 1267, 1269. An upper support wall or plate 1273 is connected to the upper end of sidewall 1269 generally adjacent end wall 1253 of casing 1249. A plurality of mounting openings 1275 may be provided in casing 1249 so as to mount transmission mechanism 1245 in laundry machine 8 as discussed above. Opposite end walls 1251, 1253 have a pair of openings 1277, 1279 extending therethrough so as to intersect with chamber 1265. A pair of bearing means 1281, 1283 is supported in the openings in journaling engagement with input means 1255 and output means 1257, respectively. If desired, a plurality of mounting studs 1285 may be integrally or otherwise provided on lower end wall 1251 so as to extend therefrom for receiving electronically commutated motor 30 when transmission mechanism 1245 is mounted in laundry machine 8, as discussed above.

Input means 1255 includes an input shaft 1287 journaled in bearing means 1281 and extending through opening 1277 in end wall 1251, with a free end or end portion 1289 disposed generally adjacent end wall 1251 within chamber 1265. An input or pinion gear 1291 within chamber 1265 is carried on free end 1289 of input shaft 1287 so as to be conjointly rotatable therewith. The input shaft is adapted to be rotated or driven unidirectionally or, alternatively, to oscillate in opposite directions.

Output means 1257 includes a tubular output shaft 1293 having a generally axial bore 1295 therethrough. The tubular output shaft extends through opening 1279 in casing end wall 1253. Output shaft 1293 is journaled in bearing means 1283 in casing end wall 1253 and extends through support wall 1273. Thus, a lower interior or free end of the output shaft is journaled in another bearing means 1297 disposed in another opening extending through intermediate support 1271. An output, driven or pinion gear 1301 is carried about tubular shaft 1293 so as to be conjointly rotatable therewith. The output gear is arranged so as to extend from the tubular shaft generally in spaced relation between supports 1271, 1273.

Output means 1259 includes an output shaft 1303 which extends generally coaxially through bore 1295 of tubular shaft 1293. Output shaft 1303 has an exterior or free end or end portion 1305 exteriorly of chamber 1265, with an opposite interior free end or end portion 1307 disposed within the chamber. Although not shown, interior end 1307 of output shaft 1303 is journaled in a bearing means provided therefor in casing end wall 1251. Exterior end 1305 of output shaft 1307 may be journaled in suitable bearing means (not shown) provided therefor. Another output, driven or pinion gear 1309 is carried by output shaft 1303, generally adjacent interior end 1307 thereof, so as to be spaced between casing end wall 1251 and support wall 1271 within chamber 1265.

Transmitting means 1261 is provided for transmitting the rotational movement of input shaft and gear 1287, 1291 to tubular output shaft and gear 1293, 1301 and to output shaft and gear 1303, 1309, respectively. Transmitting means 1261 includes means, such as a driving or idler shaft 1311 and a pinion gear 1313 carried thereon, associated in coupled relation with output shaft and gear 1303, 1309 for driving it, and means, such as a driven or idler shaft 1315 and a pinion gear 1317 carried thereon, associated in coupled relation with input shaft and gear 1287, 1291 for being driven by it. Driving and driven means or idler shafts 1311, 1315 each have a pair of opposite end portions 1319, 1321 and 1323, 1325 journaled in a pair of bearing means 1327, 1329 and 1331, 1333. Bearing means 1327, 1331 are disposed in casing end wall 1251 and bearing means 1329, 1333 are disposed in upper support wall 1273, respectively. Driven idler shaft 1315 has a plurality of splines 1335 extending axially thereabout between its opposite ends 1323, 1325. Pinion gear 1317 is carried on the driven idler shaft generally adjacent lower opposite end 1323 thereof in meshing engagement with input gear 1291. Thus, the mesh between input gear 1291 and pinion gear 1317 effects the concert driven rotation of idler shaft 1315 with input shaft 1287. Pinion gear 1313 is carried on driving idler shaft 1311 so as to be arranged in meshing engagement with output gear 1309 on output shaft 1303. Thus, the meshing engagement between pinion gear 1313 and output gear 1309 effects the conjoint driven rotation of output shaft 1303 with the driving idler shaft. Another pinion gear 1337 is also carried on idler shaft 1311 generally in spaced relation with pinion gear 1313 thereon.

Figure 20A:
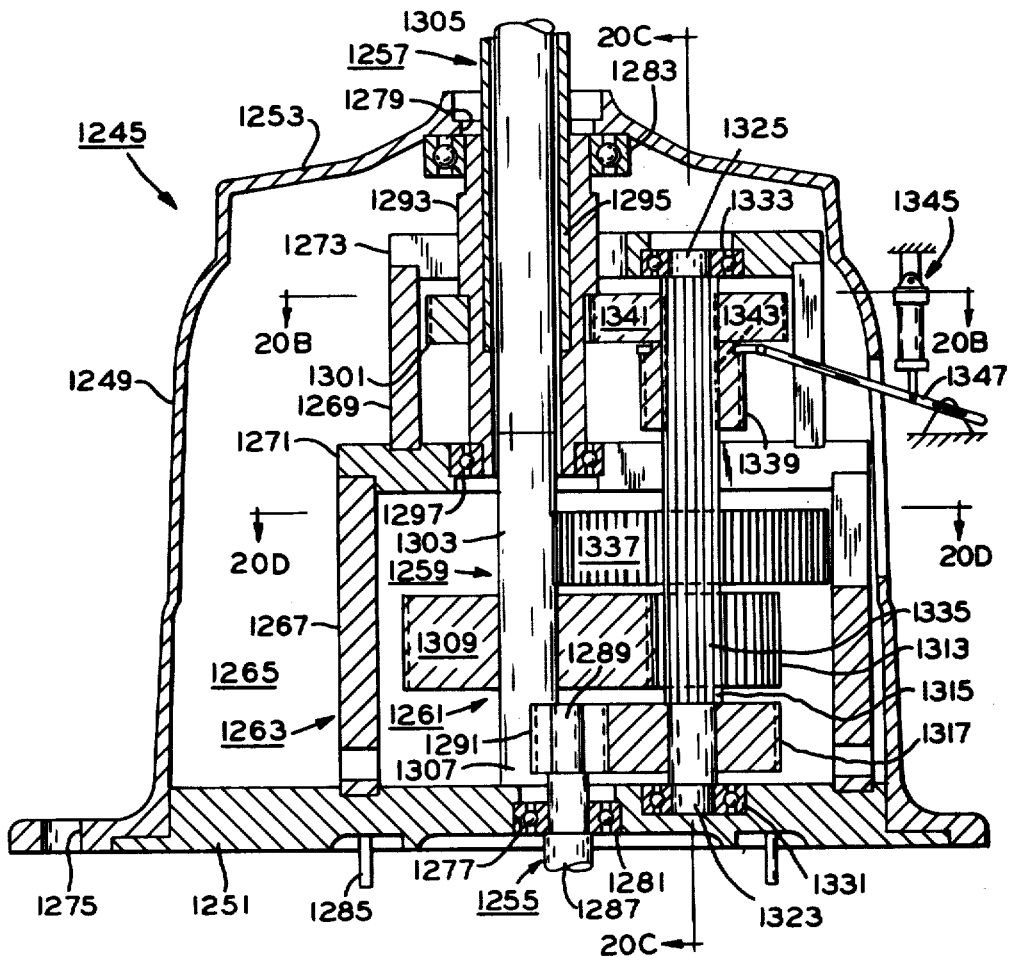
FIG. 20A is a cross-sectional view of an exemplary transmission that may be used to couple an ECM to a laundry machine.
Figure 20B:
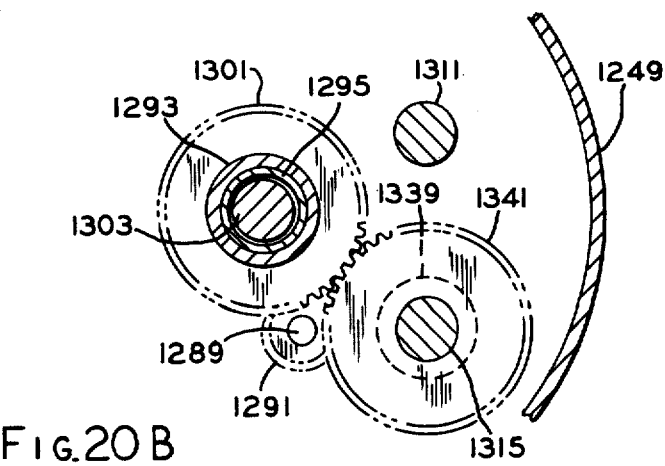
FIGS. 20B–20D show various cross-sectional views of the apparatus of FIG. 20A, taken at B—B, C—C and D—D, respectively, in the latter Figure.
Figure 20C:
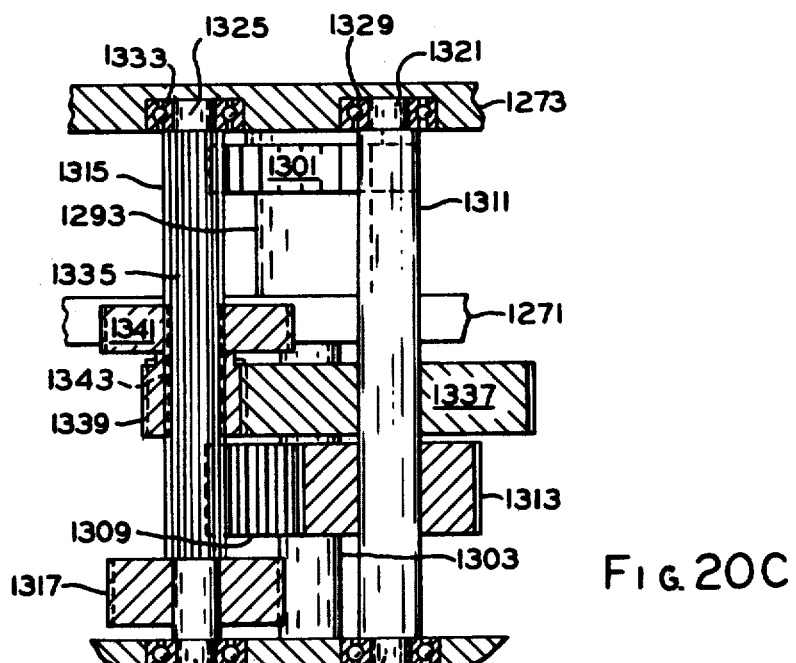
Figure 20D:
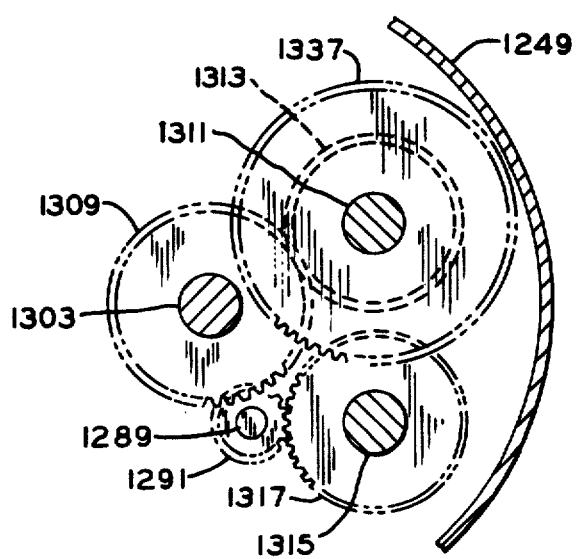

Transmitting means 1261 also includes means, such as a pair of interconnected stepped shifting gears 1339, 1341, selectively movable between a plurality of shifted positions with respect to idler shafts 1311, 1315 and operable generally in one of the shifted positions (as best seen in FIG. 20A) for coupling idler shaft 1315 with tubular output shaft 1293 and in another of the shifted positions thereof (as best seen in FIG. 20C) for coupling idler shaft 1315 with idler shaft 1311. A splined bore 1343 is coaxially provided through coupling means or stepped shifting gears 1339, 1341. Splines 1335 on idler shaft 1315 are cooperatively received in the splined bore so that the stepped shifting gears are axially movable between at least the upper shifted or spin position and the lower shifted or agitating position thereof on idler shaft 1315. Stepped shifting gears 1339, 1341 may also be provided with a third shifted position, such as a neutral or pump operating position, disengaged from output shafts 1293, 1303. Thus, through the engagement of splines 1335 on idler shaft 1315 with splined bore 1343 of stepped shifting gears 1339, 1341, the stepped shifting gears are not only axially movable or shiftable on idler shaft 1315, but also conjointly rotatable therewith in response to the rotation of input shaft 1287. Larger stepped shifting gear 1341 is arranged in meshing engagement with output gear 1301 on tubular output shaft 1293 when stepped shifting gears 1339, 1341 are in the upper shifted position thereof. Smaller shifting gear 1339 is arranged in meshing engagement with intermediate pinion gear 1337 on idler shaft 1311 when the stepped shifting gears are in the lower shifted position thereof.

A shift actuating device, schematically shown and indicated genrally at 1345, is selectively operable for moving a linkage 1347 thereof to effect the shifting axial movement of stepped shifting gears 1339, 1341 connected with the linkage between the shifted positions of the stepped shifting gears on idler shaft 1315. However, while the shift actuating device and linkage are illustrated herein in association with stepped shifting gears 1339, 1341, for purposes of disclosure it is contemplated, within the scope of the present invention, that other means may be employed for effecting the shifting of the stepped shifting gears between the shifted positions thereof, i.e., shifting transmission mechanism 1245 between its aforementioned operating modes.

With respect to the operation of transmission device 1245, it will be recalled that input shaft 1287 may be driven or operated so as to be oscillatable in one operating mode of the transmission mechanism and unidirectionally rotated in another operating mode of the transmission mechanism. When input shaft 1287 is unidirectionally rotated, linkage 1347 is actuated by shifting device 1345 so that stepped shifting gears 1339, 1341 are in the upper shifted position thereof (as best seen in FIG. 20A) wherein larger stepped shifting gear 1341 is meshed with output gear 1301 of tubular output shaft 1293. In this manner, unidirectional rotation of input shaft 1287 is transmitted through meshed input gear 1291 and pinion gear 1317 to idler shaft 1315, to effect the conjoint unidirectional rotation thereof with the input shaft. Since splines 1335 on idler shaft 1315 are received in splined bore 1383 of stepped shifting gears 1339, 1341, the stepped shifting gears are conjointly unidirectionally rotated with idler shaft 1315. This conjoint unidirectional rotation of the shifting gears is transmitted through meshed larger stepped shifting gear 1341 to output gear 1301 on tubular output shaft 1293 so as to effect the conjoint unidirectional rotation thereof with the stepped shifting gears. Thus, in the one operating mode of transmission mechanism 1245, as determined by shifting device 1287 is transmitted to tubular output shaft 1293 effecting the conjoint unidirectional rotation thereof with the input shaft while output shaft 1303 remains at rest.

When linkage 1347 is actuated by shifting device 1345 so as to axially move stepped shifting gears 1339, 1341 downwardly toward its lower shifted position on idler shaft 1315 (as best seen in FIG. 20C) larger stepped shifting gear 1341 is disengaged from output gear 1301 on tubular output shaft 1293, and smaller stepped shifting gear 1339 is moved into meshing engagment with intermediate pinion gear 1337 on idler shaft 1311. With stepped shifting gears 1339, 1341 in their lower shifted position, transmission mechanism 1245 may function in its other operating mode, with input shaft 1287 being oscillatably rotatable. Thus, the oscillation of input shaft 1287 is transmitted through meshed input gear 1291 and pinion gear 1317 to idler shaft 1335 to effect the conjoint oscillation thereof with the input shaft. Since splined bore 1343 of stepped shifting gears 1339, 1341, is received on splines 1335 of idler shaft 1315, the stepped shifting gears are conjointly oscillated with stepped shifting gears 1339 with intermediate gear 1337 on idler shaft 1311. This conjoint oscillation of idler shaft 1311 with idler shaft 1315 is transmitted to output shaft 1303 through the meshing engagement of pinion gear 1313 on idler shaft 1311 with output gear 1309 on output shaft 1303. Thus, the oscillation of input shaft 1287 is transmitted to output shaft 1303 during the other operating mode of transmission mechanism 1345.

Reverting now to the operation of laundry machine 8, let it be assumed that stepped shifting gears 1339, 1341 in transmission mechanism 1245 are disposed in the lower shifted or agitation position thereof, with smaller stepped shifting gear 1339 driving output shaft 1303 through the meshing engagement of the smaller shifting gear, with intermediate gear 1337 on idler shaft 1311 and the meshing engagement of pinion gear 1313 thereon with output gear 1309 on the output shaft, as further discussed hereinbelow with respect to FIGS. 20A-20D. With transmission mechanism 1245 so set or shifted to effect the wash cycle of laundry machine 8, water may be introduced through nozzle 1421 into spin tub 10 so that it flows through the perforations therein into enclosing tub 1407. Clothes to be laundered in the water and a charge of detergent or the like (not shown) may also be placed in the spin tub. Of course, the level to which the water rises in enclosing tub 1407 may be controlled by an suitable fluid level sensing means, as well known in the art. With this preparation, electronically commutated motor 30 may be energized to commence the wash cycle of the laundry machine. Upon the energization of the motor, winding stages a, b and c are commutated so as to be alternately excited in the aforementioned preselected different sequences. This effects the magnetic coupling therewith of rotatable assembly 1151 so as to impart oscillating movement or rotation to the latter. This oscillating motion may be of any desired or preselected frequency, as explained in greater detail hereinbelow. It may also be of any desired or preselected amplitude, depending on the selected control functions, as explained elsewhere in this specification.

The oscillating motion of rotatable assembly 1151 is translated or transmitted by transmission mechanism 1245 to its output shaft 1303 which is drivingly connected or otherwise associated with agitator 12 so as to effect the conjoint oscillation thereof with the rotatable assembly of electronically commutated motor 30. In this manner, the oscillator motion of the agitator within tub 1353 effects the agitation and laundering of the clothes therein. Although not shown in the drawings, pump 1369 may include means for pumping water from enclosing tub 1407 through a filter back into spin tub 10 in order to trap or filter out much of the lint which may be separated from the clothes as they are laundered during the above-discussed wash cycle of the laundery machine. After laundry machine 8 has been operated for a desired or preselected period of time in its wash cycle, electronically commutated motor 30 may be de-energized or braked to terminate the cycle.

Subsequent to the wash cycle of laundry machine 8 and in order to initiate the spin cycle thereof, shifting device 1345 for transmission mechanism 1245 may be actuated. This will cause its linkage 1347 to move stepped shifting gears 1339, 1341 upwardly on idler shaft 1315 toward the spin or upper shifted position thereof, as shown in FIG. 20A, so that larger stepped shifting gear 1341 is meshed with output gear 1301 on tubular output shaft 1293. At this time, motor 30 may be reenergized with its winding stages a, b and c commutated so as to be excited in a preselected sequence. Magnetic coupling with rotatable assembly 1151 is effected in the manner discussed hereinabove to impart unidirectional rotation thereto. As discussed below, the unidirectional speed of rotatable assembly 1151 may be of any desired or preselected magnitude. It is contemplated that the speed of the unidirectional rotation of the rotatable assembly will be appreciably greater than the speed of the above discussed oscillation motion.

With stepped shifting gears 1339, 1341 moved into the upper shifted position in transmission mechanism 1245, the unidirectional rotation of rotatable assembly 1151 is translated or transmitted by the transmission mechanism to its tubular output shaft 1293 which is drivingly connected or otherwise associated with tub 10 so as to effect the conjoint unidirectional rotation thereof with the rotatable assembly of electronically commutated motor 30. In this manner, the unidirectional rotation of spin tub 10 is operative to effect the centrifugal displacement of water from the clothes within the spin tub. Pump 1369 may, if desired, be arranged to be driven by motor 30, as discussed hereinbelow, and includes means for effecting the removal of water from spin tub 10 and enclosing tub 1407, through hose 1419 to a drain (not shown). After laundry machine 8 has been operated for a desired or preselected period of time in its spin cycle, electronically commutated motor 30 may be de-energized or braked so as to terminate the spin cycle.

To complete the operation of laundry machine 8, shifting device 1345 may be selectively actuated to operate linkage 1347 and move stepped shifting gears 1339, 1341 to their neutral position as previously mentioned, in order to bring about a pumping cycle of the laundry machine during which water is expelled. In their neutral position, stepped shifting gears 1339, 1341 are disengaged from output gear 1301 on tubular output shaft 1293 and from intermediate gear 1337 on idler shaft 1311. The latter is drivingly connected, through its gear 1313, with output gear 1309 on output shaft 1303. Therefore, with stepped shifting gears 1339, 1341 in their neutral position, electronically commutated motor 30 may be energized to drive pump 1369, while being in effect drivingly disconnected from spin tub 10 and agitator 12 by transmission mechanism 1245.

It will be understood that the discussion above of laundry machine 8 does not dwell on all of the valving and particular controls normally provided on modern domestic laundry machines. The omission of these components is primarily for the purpose of brevity; however, it is contemplated that such components may be provided in the laundry machine and that such laundry machine may be provided with other operating modes or cycles within the scope of the invention.

It will be clear from the discussion above that tub 10 and agitator 12 of laundry machine 8 are arranged to follow the basic motion of the driving ECM. Accordingly, the combination of the laundry machine and of the ECM, as shown in FIG. 6, dispenses with the need for a clutch, a belt transmission and a compensating balancing weight used by prior art laundry machines of the kind illustrated in FIG. 1. While the invention is not limited to the transmission shown in FIGS. 20A-20D, it is clear that the mechanism between the laundry machine and the ECM must be capable of selectively applying the motion of the ECM rotor shaft to the tub and agitator respectively of the laundry machine. Although the latter components can be driven at the ECM rotor angular velocity, a step-down gear ratio is advantageously employed, at least for portions of the operation, in order to minimize motor size. In Table A below, exemplary combinations of RPM, gear ratio and voltage are listed which may be employed for a direct drive washing machine of the type shown in FIG. 6.

TABLE A

| MOTOR | GEAR RATIO | | MOTOR VOLTS | |
|---|---|---|---|---|
| RPM | WASH | SPIN | WASH | SPIN |
| 140 | 1:1 | 1:1 | 32 | 80 |
| 700 | 5:1 | 1:1 | 80 | 80 |
| 700 | 5:1 | 5:1 | 32 | 80 |
| 1400 | 10:1 | 2:1 | 80 | 80 |
| 1400 | 10:1 | 10:1 | 32 | 80 |

In the foregoing table the motor RPM column is referenced to the peak speed of the wash cycle. For example, for a fixed 1:1 gear ratio, i.e. using no step down ratio, the motor would be operated at a peak voltage of 32 volts for the wash cycle and at 80 volts for the spin cycle. While the 80 volt value is an arbitrary selection, the 32 volt value is related to the spin-to-wash ratio of angular velocity. Alternatively, a 5:1 gear ratio may be interposed for the wash cycle, while resetting to a 1:1 ratio for spin. The voltages involved in the latter case are 80 volt peak for both wash and spin cycles. Other gear ratio possibilities are identified in Table A above, together with their associated voltage and RPM values.

As previously stated, the purpose of introducing gear ratios between the shaft of the ECM rotor and the drive shaft of the laundry machine is to reduce the size of the ECM. While a 1:1 gear ratio for both the wash and spin cycles is possible, it requires a larger motor and may, for that reason, be the costlier alternative. On the other hand, if a 5:1 gear ratio is used for the wash cycle alone, a motor of smaller size may be used.

Another criterion to keep in mind is that the inertia of the rotor must remain small compared to the inertia reflected from the agitator.

TABLE B

| GEAR RATIO | 1:1 | 5:1 | 10:1 |
|---|---|---|---|
| Peak $\theta$ Degrees | 160 | 800(2.2 REV) | 1600(4.4 REV) |
| Peak $\omega$ Rad/Sec (RPM) | 14.65 (140) | 73.25 (700) | 146.5 (1400) |
| Peak $\alpha$ Rad/Sec$^2$ | 153.5 | 767.5 | 1535 |
| Moment of inertia (Agitator) oz ft Sec$^2$ | .168 | .00672 | .00168 |
| Friction Constant (Agitator) oz ft Sec/Rad | 12.83 | .513 | .128 |
| Moment of Inertia (Motor) oz ft Sec$^2$ | .027 | .0046 | .0023 |
| Peak Friction Torque oz ft | 188 | 38 | 19 |
| Peak Inertia Torque oz ft | 30 | 8.7 | 6 |
| | ↑ MOTOR & AGITATOR | ↑ REFERRED TO MOTOR | |

Table B above shows that the latter would be the case, up to a 5:1 gear ratio, where the agitator undergoes essentially sinusoidal motion. Moment of inertia and friction constant are both reflected to the motor by a factor of the gear ratio squared. Energy to be dissipated by the system as the torque passes through zero at the point of reversal of the agitate cycle is $I\omega^2/2$. The inertia should be kept as small as possible, since the moment of inertia, I, affects the energy to be dissipated upon reversal, as well as the angular velocity $\omega$ at the torque zero crossing. The larger the value of I, the greater the lag angle $\beta$ between torque and angular velocity and the larger the value of $\omega$ at the zero crossing. The friction load also affects the value of $\omega$. As it drops off, $\beta$ increases and $\omega$ at the torque zero crossing increases. This accounts for the importance of maintaining the rotor inertia small. Table B above summarizes the physical constants involved relative to the wash cycle, for exemplary gear ratios of 1:1, 5:1 and 10:1. The moments of inertia shown in Table B are based on motor specimen which may be advantageously employed in the present invention.

TABLE C

| GEAR RATIO | 1:1 | 5:1 | 10:1 |
|---|---|---|---|
| Largest $\omega$ RPM | 600 | 3000 | 6000 |
| Largest $\alpha$ Rad/Sec$^2$ | 1.57 | 7.85 | 15.7 |
| Largest Moment of Inertia oz ft Sec$^2$ | 15.5 | .62 | .16 |
| Largest Friction Torque oz ft | 66 | 13.2 | 6.6 |
| Largest Inertia Torque oz ft | 24 | 4.9 | 2.4 |
|  | ↑ MOTOR & TUB | ↑ REFERRED TO MOTOR | |

Table C lists the physical constants for the spin cycle of the laundry machine for the three gear ratios discussed above. For each ratio setting a separate peak torque exists, e.g. 66 oz ft for a 1:1 ratio. In contrast to the use of a slip clutch in prior art laundry machines for limiting the maximum torque applied, the present invention permits torque control by limiting the current to the motor windings, as will be discussed in greater detail below.

Figure 7:
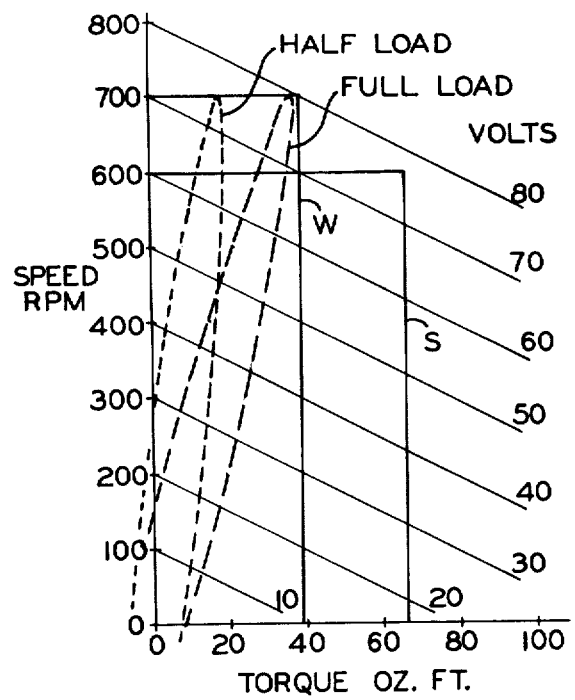
FIG. 7 illustrates the angular velocity/torque performance of an exemplary ECM under laundry machine load conditions, using different gear ratios for the wash and spin cycles.

FIG. 7 illustrates the angular velocity/torque characteristics for different applied voltages, as well as the performance of an ECM using a 5:1 gear ratio for the wash cycle and a 1:1 gear ratio for the spin cycle. As shown by the set of straight lines, motor speed decreases linearly as the load on the motor increases. The area enclosed by lines designated by the letter S applies to the spin cycle and that designated by the letter W applies to the wash cycle. Within the operating parameters of the wash cycle, the two broken line curves represent the angular velocity/torque performance for full load and half load respectively, during the positive stroke of the back-and-forth sinusoidal motion of the agitator. The performance curves for the negative stroke are substantially the same, except for direction, provided the two strokes are otherwise identical. Since the same considerations apply, the illustration of the negative stroke has been omitted in order to simplify the explanation herein.

It will be noted that the angular velocity/torque performance curves for the wash cycle have an elliptical shape, bearing in mind that only one half of each curve is shown in FIG. 7. The elliptical shape is caused by the inertia of the system which results in a net loss of energy when the motion of the agitator is reversed. For an applied voltage of 80 V, maximum torque is developed slightly after the maximum angular velocity of 700 RPM is reached, consonant with the characteristics illustrated in FIG. 2E. Thereafter, angular velocity and torque diminish in preparation for motion in the reverse direction.

When the agitator reaches zero torque, it is seen to have an angular velocity of approximately 270 RPM at half load and approximately 140 RPM at full load. A negative torque is required to bring the rotational assembly to zero angular velocity. This work represents energy which must be dissipated, and which may have a peak value of approximately 245 watts at full load for the example selected. A number of techniques may be used for implementing such dissipation of energy, all of them readily carried out where an electronically commutated motor drives the laundry machine. They are as follows:

1. Coasting and letting the load in the laundry machine absorb the energy.
2. Shorting the stator winding stages.
3. Feeding the energy back to its source capacitor.
4. Using a controlling plug reverse, i.e. reversing the terminals of the stator winding stages.

In FIG. 7, the lines designated by the letter S represent an idealized angular velocity/torque performance curve for the spin cycle. As shown, the angular velocity remains substantially at the zero level until the desired torque is built up, i.e. the tub will not begin to turn until a torque of approximately 66 oz ft is applied in the example under consideration. By limiting the current applied to the windings of the ECM, the torque is maintained at that level while the angular velocity of the rotatable assembly builds up to its full 600 RPM value. It will be understood that in practice there is some increase of the rotor angular velocity as the pre-set torque level is gradually attained. Likewise, at some point in mid-velocity range, e.g. at approximately 300 RPM, the load will drop below the maximum torque of 66 oz ft and will follow a diagonal rather than a vertical path to full speed.

In a preferred embodiment of the invention, explained in greater detail below, a combination of the first three energy dissipation techniques listed above is used, combined with a dynamic braking feature which adapts to existing operating conditions. The motor windings are either shorted outright or across a resistor. Thus, while some coasting is permitted, the motor is brought to a halt quickly. The resultant effect on the load in the laundry machine is not as harsh and destructive as is the case where a plug reversal is used.

Figure 8:
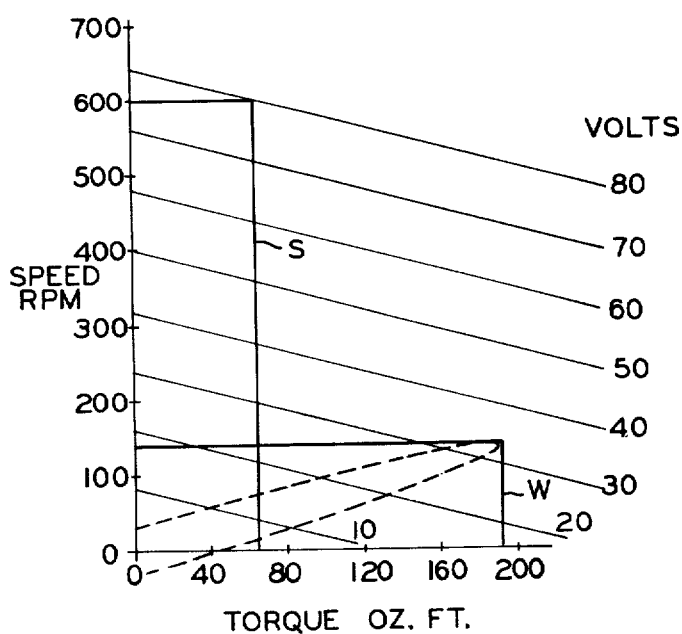
FIG. 8 illustrates the angular velocity/torque performance of an exemplary ECM under laundry machine load conditions using identical gear ratios for the wash and spin cycle.

FIG. 8 illustrates the angular velocity/torque characteristics and performance of the ECM discussed above, using a 1:1 gear ratio for both the wash and the spin cycle. To conserve space, the torque coordinate is drawn to a different scale than that in FIG. 7. As shown, torque demand is up by a factor of 5 in the wash cycle, as compared to the situation illustrated in FIG. 7. Although the elliptical shape of the speed/torque characteristic during the wash cycle is retained, the energy which must be dissipated as the torque changes from positive to negative is approximately 30% less than is the case for the situation shown in FIG. 7.

Assuming the maximum torque of the motor in FIG. 7 is 66 oz ft, a relatively small motor suffices for the 5:1/1:1 gearing arrangement, which is used nearly to capacity in the wash and spin cycles. However, in addition to the 30% saving in energy which needs to be dissipated, the arrangement of FIG. 8 also eliminates the need for transmission gearing for ratio step down purposes. Clearly then, the selection of the gear ratio employed depends in large measure on the particular objectives set for the machine.

FIGS. 9–11 show various performance characteristics of one embodiment of an ECM coupled to a laundry machine in one form of the invention, using a 5:1 gear ratio for the wash cycle and a 1:1 gear ratio for the spin cycle. These characteristics apply to a 24 slot, 4 pole motor, utilizing copper wire and cobalt-samarium magnets and having a rotor moment of inertia of 0.0046 oz ft sec$^2$. The angular velocity/torque characteristic $\omega/T$ shown in FIG. 9 is identical to that shown in FIG. 7 for an applied voltage of 80 V and is the same for the wash and spin cycles. The current/torque characteristic, I/T, is linear. Its intersection with $\omega/T$ determines that the current required to develop the maximum required torque of 66 oz ft at a rotor speed of 600 RPM is about 6 amps.

FIG. 10 illustrates the relationship of motor efficiency to the angular velocity of the rotatable assembly, as it applies to the wash cycle. As shown, in the vicinity of 600 and 700 RPM, (see FIG. 9), motor efficiency is highest, i.e. on the order of 75% for increasing rotor velocity and slightly higher for decreasing rotor velocity. For the full wash cycle the efficiency is estimated to be between 65%–70%. The efficiency curve shown in FIG. 10 takes into account motor losses as well as associated solid state losses.

FIG. 11 illustrates the efficiency/torque characteristic for the spin cycle, for a median angular velocity of 700 RPM's and an applied voltage of 80 volts. The solid line curve in FIG. 11 shows efficiency when motor losses alone are taken into consideration, while the dashed line curve also takes into account solid state losses. At maximum torque, the efficiency is estimated to be somewhat greater than 60%.

FIGS. 12–14 show the characteristics of a 24-slot, 4-pole motor having a moment of inertia of the rotatable assembly of 0.27 oz ft sec$^2$ and using materials similar to those used for the motor discussed above in connection with FIGS. 9–11. A 1:1 gear ratio applies for both the wash and the spin cycle and hence a larger motor is required due to higher torque demand. The angular velocity/torque characteristics, $\omega/T$, are seen to be different in FIG. 12 for the wash and the spin cycles respectively. Likewise, the I/T characteristics show that currents of different amplitude are required to develop the same torque. In the example under consideration, the voltage applied for the spin cycle was a full 80 volts, while a reduced value of 32.5 volts peak was applied for the wash cycle.

FIG. 13 shows the efficiency curve for the wash cycle plotted against angular velocity. Here again, the efficiency at decreasing rotor velocity is slightly higher than at increasing speed, neither however, rising above an efficiency at 45%.

FIG. 14 illustrates efficiency plotted against the torque developed by the motor. As before, the solid line curve takes into consideration motor losses alone, while the dashed line curve includes motor losses as wel as associated solid state losses. At a torque at 66 oz ft, the efficiency is seen to approach 90%. This is also the efficiency for the overall spin cycle.

FIG. 15 illustrates in schematic form a laundering system in accordance with the principles of the present invention. Laundry machine 8 includes a basket or tub 10 and coaxially mounted agitator 12, both adapted to rotate independently or jointly about their common axis. An electronically commutated motor 30 is adapted to be coupled to the drive shaft of machine 8 through a connection mechanism which may take the form of transmission 1245 discussed above in connection with FIGS. 20A–20D. Further, the transmission may include gearing to establish desired angular velocity and torque ratios, as explained above. Power derived from a 115V, 60 Hz AC line is rectified at 70 and applied to a power conditioning circuit 72. The latter operates on the rectified signal in accordance with external conditions and parameters, as determined by an applied command signal. The latter acts to control the application of the rectified signal with respect to amplitude, duration and timing. The output of power conditioning circuit 72 takes the form of an effective DC voltage $V_M$ which is applied to power switching means or circuit 74. The operation of the latter is controlled from a commutation circuit 76 which acts to apply the effective voltage to the winding stages of ECM 30 in a selected sequence. The motion of the rotatable components 10 and 12 of laundry machine 8 is thus controlled by the applied command, as well as by the action of the commutation circuit.

Figures 16A, 16B:
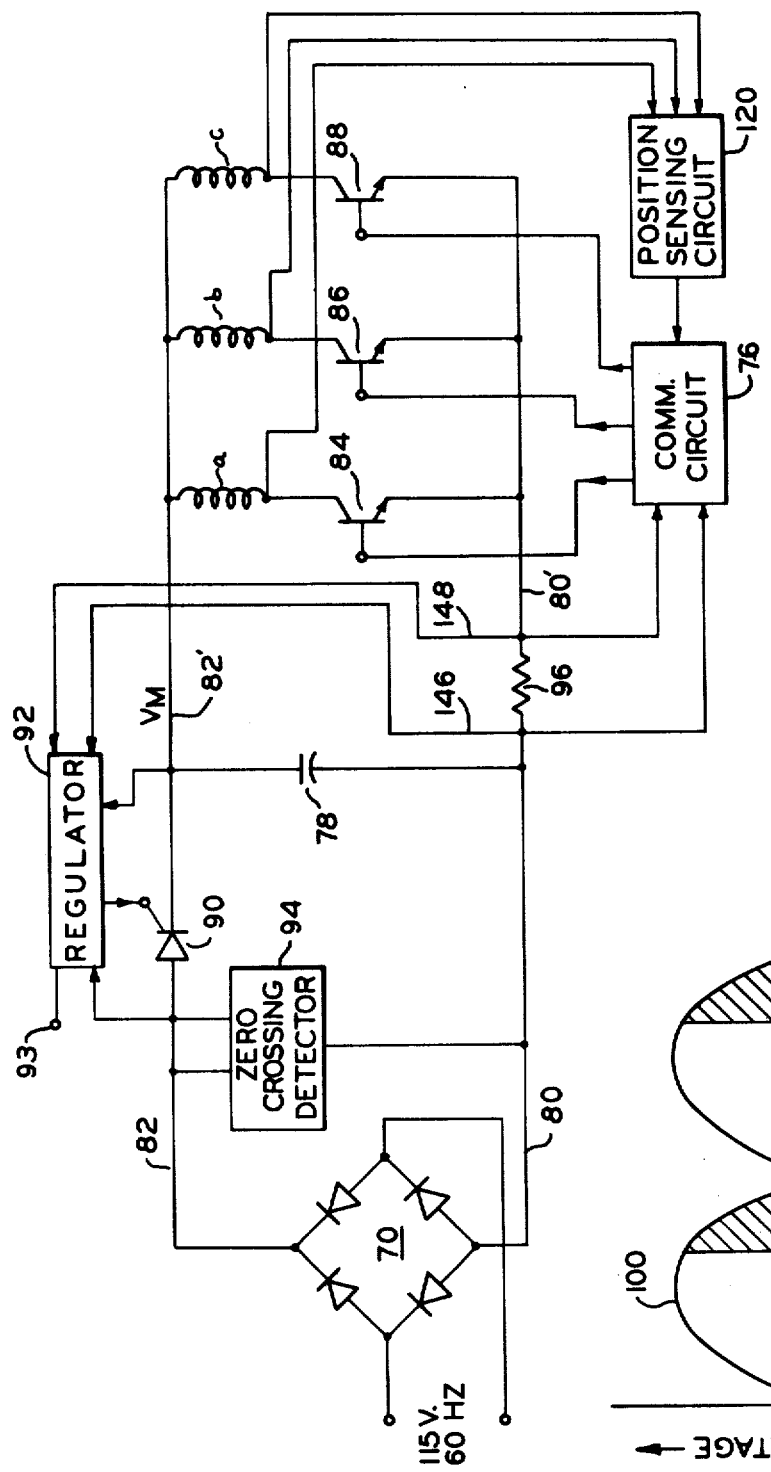
FIG. 16A shows the essential elements of a control system which uses phase control in accordance with the present invention.
FIG. 16B illustrates the operation of the control system of FIG. 16A.

FIG. 16A shows the essential components of a control system for operating the apparatus of FIG. 15 in accordance with the principles of the present invention. As before, applicable reference numerals have been carried forward from earlier Figures. Rectifier circuit 70 is seen to consist of a full wave diode bridge having a pair of nodes connected across a 115 V,60 Hz power line. The other pair of nodes of rectifier bridge 70 is connected to line 82 and common line 80. The DC voltage which appears across these lines takes the form of a full wave rectified signal, as shown by waveshape 100 in FIG. 16B. A silicon controlled rectifier 90 is connected in series between lines 82 and 82' and acts as a switch in the line to connect or interrupt power to the remainder of the control circuit. A capacitor 78, which may have a capacity on the order of 2500 uf, is connected across lines 82' and 80 and serves as a ripple filter to smooth out the rectified waveform appearing across these lines. A current shunt 96 is connected in series between lines 80 and 80'.

The motor is preferably of the type discussed above in connection with FIGS. 3–5, i.e. an electronically commutated motor having three winding stages, although other types of ECM's may be used. The stator winding stages a, b and c respectively, are shown to be connected in a single ended configuration, i.e. with one winding terminal connected to line 82'. The other terminals of winding stages a, b and c are connected to the collectors of a set of commutation transistors 84, 86 and 88 respectively, whose emitters are jointly connected to line 80'. Transistors 84, 86 and 88 thus collectively form the power switching circuit 74 of FIG. 15, the transistor bases being connected to receive signals from commutation circuit 76 in accordance with applied position signals. The latter signals may be provided by a position sensor 120, shown in FIG. 24. As explained in the aforesaid copending application Ser. No. 802,484, optical, magnetic, or other physical effects may be employed to provide the aforesaid signals. In one form of the present invention, the position sensing circuit is preferably actuated by back EMF signals derived from the aforesaid collector-connected terminals of winding stages a, b and c. These signals, which are proportional to rotor angular velocity, are subsequently integrated to provide the desired position signals.

SCR 90, which is normally cut off, is controlled from a regulator 92 which is responsive to a number of different input signals. Although SCR 90 is conceptually part of the regulation circuit, it is shown separately herein to facilitate an understanding of the invention. It will be understood that SCR 90, regulator 92 and capacitor 78 all form part of the power conditioning circuit which is indicated by block 72 in FIG. 15.

A first input signal of regulator 92, applied at terminal 93, is derived from an external source and is representative of the desired motor performance. In a laundry machine environment in accordance with the present invention, this signal may be provided by a microcomputer in response to instructions dialed or otherwise set into the laundry machine control panel. It will be understood, however, that the invention is not so limited and that signals representative of motor performance may be generated in different ways. A second regulator input signal is derived from a zero crossing detector unit 94, which is connected across the output of diode bridge 70. A pair of lines 146, 148, connected across current shunt 96, provide a further input to regulator 92. Line 46 serves as a common voltage reference at the regulator input. The signal derived across the current shunt is proportional to the current in the winding stages and it is further connected to the input of commutation circuit 76.

As previously explained, capacitor 78 serves to smooth out the ripple in the signal which appears between lines 82' and 80. Thus the effective voltage $V_M$ applied to winding stages a, b and c is a substantially ripple-free DC voltage. As shown, $V_M$ is further fed back as an input to circuit 92 for regulation purposes.

In operation, position sensing circuit 120 controls commutation circuit 76. The latter, in turn, controls the timing of the energization of winding stages a, b and c in response to the applied rotor position signal, as well as controlling the sequence of winding energization. This is done by the application of signals to the bases of commutation transistors 84, 86 and 88, which render these transistors conductive at the desired points in time. The signal derived from current shunt 96 is proportional to motor current, which itself is representative of the torque applied by the motor, as explained above. If the motor current rises above a preselected value, the signal derived across resistance 96 acts through commutation circuit 76 to cut off the commutation transistors. Simultaneously, a signal is applied to regulator 92 which, by controlling $V_M$, controls the amplitude of the current in the winding stages.

In the circuit of FIG. 16A, the angular velocity of the rotatable assembly is regulated in accordance with a technique known as phase angle control. Zero crossovers of the 60Hz line are detected and a signal is generated at a predetermined time interval thereafter, e.g. at a phase angle of 120°. The latter signal is applied to regulator 92 which responds by turning on SCR 90. Thus, the signal applied at terminal 93 which represents the desired motor performance, determines that power is to be supplied to the winding stages during a time interval corresponding to a 60° phase angle, as shown by the shaded area in FIG. 16B. In accordance with the discussion above, capacitor 78 filters the signal at the output of SCR 90 to produce an effective voltage $V_M$ which is applied to winding stages a, b and c. It will be seen therefore, that a DC voltage is applied only during a 60° interval under the assumed operating conditions. Thus, where phase control is employed, the angular velocity of the rotatable assembly is controlled by preselecting the phase angle during which a DC voltage is applied to the winding stages.

As shown in FIG. 16A, the control of the angular velocity of the rotatable motor assembly may be further refined by means of voltage feedback, whereby $V_M$ is applied to regulator 92 for comparison against the signal derived from terminal 93. Since $V_M$ is representative of the actual angular velocity of the rotatable motor assembly, such velocity will vary with the difference between the compared signals. The resultant error signal is applied to SCR 90. If the amplitude of the error signal increases, SCR 90 is conductive for a longer time interval and the motor speeds up; if it decreases, SCR 90 is open for a shorter time interval and the drag on the rotor, e.g. due to friction and the wash load in the laundry machine, reduces motor speed until the desired angular velocity is reached.

The invention is not limited to the voltage feedback technique shown and discussed above. For example, a further way of providing closed loop regulation of the angular velocity of the rotatable assembly, is to compare the signal at terminal 93 with the back EMF signals applied to position sensing circuit 120, (or with a single combined back EMF signal), proportional to rotor velocity. In this manner the extraneous factors introduced by the resistance and inductance of the winding stages is avoided and a more closely regulator operation of the motor results.

As previously explained, the signal derived from current shunt 96 is applied to commutation circuit 76 and thence to the base of each commutation transistor, as well as to regulator 92. While the regulation of $V_M$ is carried out by unit 92 in the circuit illustrated in FIG. 16A, such action may not respond sufficiently quickly to an over-current condition. Accordingly, by applying the signal derived from resistance 96 to the bases of transistors 84, 86 and 88 via commutation circuit 76, immediate corrective action is effected by rendering these transistors nonconductive and thereby interrupting the energization of winding stages a, b and c as long as the over-current condition persists. By suitably adjusting the settings of regulator 92, the signal derived from resistance 96 may be caused to take effect at a lower value with respect to the operation of SCR 90 than with respect to its direct application to the commutation transistors. Thus, under normal operating conditions regulator 92 and SCR will have sufficient time to control motor operation through the applied voltage $V_M$ when an over-current condition exists. Control through transistors 84, 86 and 88 is thus reserved for extreme situations only.

Although the circuit illustrated in FIG. 16A, which uses phase control to control the performance of an ECM, is relatively simple and inexpensive to implement, it is capable of regulating only 120 times per second for a full-wave rectified 60 Hz signal. This may not be adequate where a faster motor response is required. Further, such a circuit reflects a relatively low power factor to the AC line, i.e. less than 60%. FIG. 17A illustrates the essential elements of a different type of control system wherein motor speed regulation is monitored more closely and power factor correction is provided. As before, applicable reference numerals have been retained.

As in the circuit of FIG. 16A, diode bridge 70 receives the 115 V, 60 Hz line signal on a pair of nodes and provides a full wave rectified sinusoidal signal, designated 100 in FIG. 17B, on a second pair of bridge nodes connected to lines 82, 80. A zero crossing detector and timer 95 is connected across lines 82, 80, its output being connected to one input of an AND gate 116 in regulator 92. The collector of a transistor 102 is connected to line 82, the transistor emitter being connected to a filter 103. A line resistor 110 is connected in series between line 80 and a line portion designated 80", the latter line serving as a common voltage reference C. A signal $R_L$ is derived at the opposite terminal of the line resistor. Filter 103 includes a coasting diode 104 connected across lines 82, 80", an inductance 106 connected to the collector of transistor 102, and a capacitor 108 connected between line 80" and the other terminal of inductance 106, which is connected to a line designated 82' in FIG. 17A. Effective voltage $V_M$ appears on line 82' for application to the stator winding stages.

The circuit further includes current shunt 96 connected in series between lines 80" and 80' and adapted to provide a signal $R_S$. The stator winding stages a, b and c and commutation transistors 84, 86 and 88 are connected in the same manner to each other and to commutation circuit 76 as is shown in FIG. 16A. These components perform the identical functions in the circuit of FIG. 17A. Likewise, position sensing circuit 120 is connected and performs in identical manner.

Regulator 92 is seen to comprise an oscillator 112 whose output is controlled by a pulse width modulator 114. Unit 114 is controlled by an error detector 97 which receives as inputs the signals designated $V_M$, $R_S$ and $R_L$ respectively. Input C establishes a common reference level. These input signals are compared against the signal applied to terminal 93 which is representative of the desired motor performance. Thus, the signal applied to terminal 93 is modified by signals $V_M$, $R_S$ and $R_L$ to produce an error signal which is applied to pulse width modulator 114. The output of the pulse width modulator is applied to the other input of AND gate 116 whose output is coupled to the base of transistor 102.

In operation, the commutation action as well as the effect of current shunt 96, (acting through commutation circuit 76), on the conductivity of transistors 82, 84 and 88, is substantially identical to that described in connection with the circuit of FIG. 16A. The action of regulator 92 is different, however. Here, the regulator acts in conjunction with regulating transistor 102 to provide time ratio control of the applied voltage rather than phase control as was the case in FIG. 16A. Specifically, oscillator 112 provides an output signal at a preselected frequency. A frequency range from 20to 50 KHz is feasible and 20 KHz is chosen in a preferred embodiment of the invention. The width of the oscillator output pulses is modulated by pulse width modulator 116 in accordance with the error signal at the output of error detector 97, as discussed above. The pulses of varying width are thus applied to AND gate 116 together with the output of unit 95. If the output from unit 95 renders gate 116 conductive, pulses of variable width are applied to the base of transistor 102. This action has the effect of modifying the full wave rectified signal applied to the transistor from line 82.

The envelope of the full wave rectified sinusoidal signal on line 82 is represented by waveform 100 in FIG. 17B. Reference numeral 101 designates the variable width pulses applied to filter 103 from transistor 102. It will be clear that neither the true width nor the true number of these pulses can be accurately represented in FIG. 17B and the pulses are therefore shown as individual lines only. The current flowing in the winding stages is shown by waveform 105 in FIG. 17B, which is seen to have substantially rectangular pulses.

As explained above, pulses are applied to transistor 102 only while gate 116 is conductive. It can be shown that the power factor reflected to the AC line, i.e. to the 115 V, 60 Hz line, is materially improved when the third harmonic of the applied waveform is substantially eliminated. Thus, $$PF = \frac{\text{Watts}}{V_{RMS} \times I_{RMS}}$$

In order to raise the power factor, $I_{RMS}$ must be minimized. The latter situation obtains when the line current has a waveform which is substantially square or rectangular. Such a waveform is approached if the initial and the final portion of each sinusoidal half wave on line 82 are eliminated, while the amplitude of the remaining waveform is maintained substantially constant.

This power factor correction feature is implemented in part by permitting gate 116 to be conductive only during a predetemined time interval, e.g. during a phase angle extending substantially from 30° to 150° and from 210° to 330° respectively, although it will be understood that the invention is not limited to these precise intervals. This action, which minimizes the third harmonic of the rectangular current waveform, is implemented by permitting transistor 102 to be conductive only during the aforesaid intervals. Thus, the aforesaid pulses of variable width are applied to filter 103 only during these intervals. This is illustrated in FIG. 17B where waveform 100 is shown in broken lines for the non-conductive intervals of gate 116.

As explained above, a signal $R_L$ derived from line resistance 110 is applied to error detector 97. This signal takes the form of a voltage referenced to common voltage level C and varies with the line current. Its effect on regulator 92 is to control the width of the pulses applied to the base of transistor 102, such that the line current is maintained substantially constant during the conductive intervals, i.e. between a phase angle of 30°-150° and 210°-330° respectively, instead of varying in amplitude during these intervals in the manner of envelope 100 in FIG. 17B. Coupled with the action of filter 103 which further smooths out the 120 Hz and 20 KHz ripple of the signal at the output of transistor 102, the effect of signal $R_L$ is to provide a line current whose amplitude is substantially as shown by waveform 105 in FIG. 17B. Thus, the combined effect of the feedback action of signal $R_L$, the cut-off produced by the output signal of unit 95, and the action of filter 103, is to provide a rectangular-shaped current waveform as shown at 105. Hence, a corresponding improvement of the power factor reflected to the AC line is achieved.

The effect of applying signals $V_M$ and $R_S$ to error detector 97 in the circuit of FIG. 17A is similar to the corresponding action in FIG. 16A where signals derived in like manner are applied to regulator 92. Specifically, the application of current shunt signal $R_S$ in the circuit of FIG. 17A results in a variation of the width of the 20 KHz pulses such that the current in the winding stages is decreased when it exceeds a predetermined limit. Similarly, signal $V_M$ provides a feedback which is compared against the signal from terminal 93 so as to maintain the desired angular velocity of the rotatable assembly by suitably controlling the width of the pulses applied to the base of transistor 102 and thence to filter 103.

It should be noted that regulation circuit 92 is not limited to the embodiment shown in FIG. 17A. For example, the conversion of the voltage signal into pulses, i.e. chopping of the signal, may also precede the rectifying action of diode bridge 70. Thus, the line voltage may be chopped prior to being applied to bridge 70. Alternatively, chopping may be carried out by transistor 102 itself, or by a gate turnoff device, or by a controlled rectified such as an SCR. Other variations within the scope of the invention will readily suggest themselves to those skilled in the art.

While the control system of FIG. 17A is believed to be more complex and more costly than that shown in FIG. 16A, it is capable of reflecting a power factor greater than 90% to the line terminals and it is therefore a system which has greater energy efficiency. Further, this system achieves better voltage regulation by monitoring the voltage applied to the winding stages at the selected frequency of the oscillator, i.e. at 20 KHz in the example under consideration. By comparison, the system of FIG. 16A monitors at only 120times per second and therefore cannot regulate to the same tolerances. It should also be noted that the power factor correction feature shown in FIG. 17A is not limited to ECM circuits, but may also find application in other motor circuits, as well as in other circuits where it is important for an electrical load to present a high power factor to an AC line.

Figure 18A:
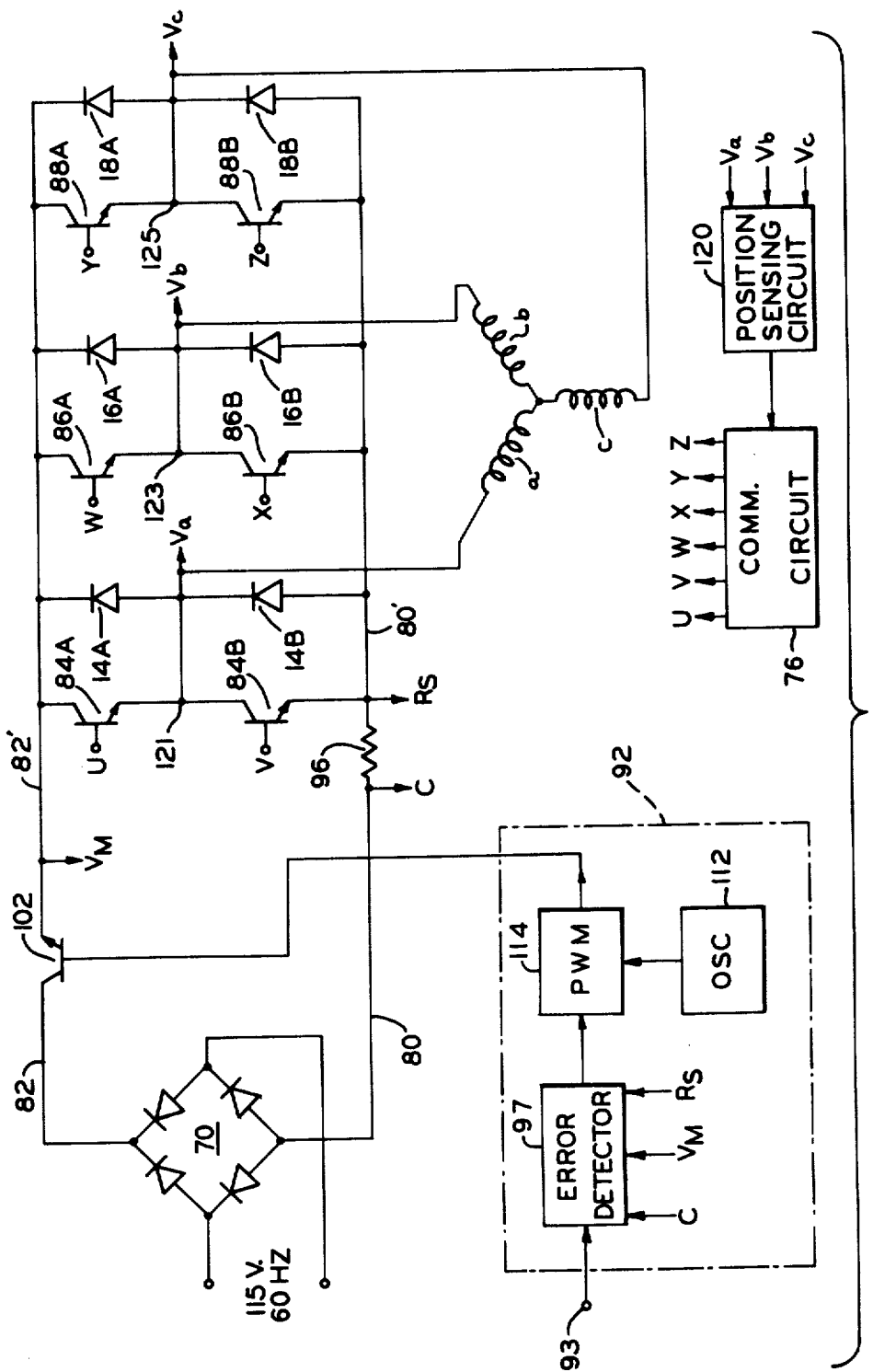
FIG. 18A illustrates a modification of the control system of FIG. 17A.

FIG. 18A illustrates another embodiment of a control system for an ECM or for other electrical loads, adapted to reflect a relatively high power factor to the AC line. As shown, winding stages a, b and c are connected in a full bridge arrangement which offers certain advantages over the half bridge connection shown in earlier embodiments, for example, in FIG. 17A. In the latter circuit the current flows through a single winding only. In the full bridge connection illustrated in FIG. 18A, windings a, b and c have one terminal connected to a point common to all three windings. Each of the other winding terminals is connected to a separate junction point 121, 123 or 125 respectively, which join respective pairs of commutation transistors 84A, 84B; 86A, 86B; and 88A, 88B respectively. Each transistor pair is connected in series across lines 82', 80' and each transistor base is connected to receive a signal from commutation circuit 76. These commutation signals, designated U, V, W, X, Y and Z respectively, are illustrated in FIG. 18B. The signals are generated by unit 76 in response to position signals provided by position sensing circuit 120, which is connected to receive back EMF signals $V_a$, $V_b$ and $V_c$.

An advantage of the full bridge connection of the winding stages resides in the fact that motor current flows through a pair of winding stages, e.g. taking a path which comprises line 82', transistor 84A, junction point 121, winding stages a and b, junction point 123, transistor 86B and line 80'. In this circuit, torque is developed more efficiently than is the case in a half bridge connection where the current flows through a single winding stage only. For a given torque requirement, the difference may be compensated in the half bridge connection by the use of high-flux permanent magnets in the rotatable assembly. Alternatively, a larger motor may be used with a concomitant increase of the inertia of the rotatable assembly. In either case, the cost of the motor is increased. By contrast, for a given torque requirement the use of a full bridge-connected ECM permits relatively inexpensive, low-flux, permanent magnets to be used in the rotatable assembly, with a consequent saving in the total cost of the motor. Where the permanent magnets remain the same, a smaller, less expensive, low inertia motor may be substituted to provide the same torque at a cost saving.

Each of commutation transistors 84A, 84B, 86A, 86B, 88A, 88B, has a diode connected thereacross, designated 14A, 14B, 16A, 16B, 18A, 18B respectively. The purpose of these diodes is to provide alternate current paths for the flow of inductive current through the winding stages when the commutating transistors become nonconductive. For example, during commutation transistor 84A may be turned off and transistor 88A turned on. Such a situation is illustrated in FIG. 18B, which shows the signals applied to the commutation transistors. As shown, between 60° and 120° signal U is down and signal Y is up. Typically, transistors 84B, 86A and 88B will be cut off at this time, i.e. signals V, W and Z are down. Transistor 86B remains on at this point and hence signal X is up. The current path then includes line 80', diode 14B, junction point 121, windings a and b, junction point 123 and transistor 86B. Thus, the current contributes to the overall torque developed.

In addition to the differences discussed above between the present circuit and FIG. 17A, it will be noted that zero crossing detector and timer 94, line resistance 110 and filter 103 are all eliminated from the circuit shown in FIG. 18A. The absence of these components in the present circuit places the latter at a cost advantage, particularly where the filter is concerned. The purpose of filter 103, as explained above, is to smooth out the ripples due to the 120 Hz frequency of the rectified signal and due to the 20 KHz switching frequency of transistor 102. The cost contribution of filter 103 to the overall cost of the circuit shown in FIG. 17A, excluding the ECM, is believed to be relatively high, rising to as much as 50% of the total circuit cost. Thus, the elimination of the filter circuit alone confers a cost advantage on the circuit of FIG. 18A.

The operation of the present circuit differs from that shown in FIG. 17A in that no effort is made to switch transistor 102 "on" at the 30° and 210° points, or to switch it "off" at the 150° and 330° points. Instead, transistor 102 is operated in a continuous switching mode at the selected frequency, e.g. at 20 KHz. Under these conditions, the transistor will conduct only when the voltage at its input, i.e. the full wave rectified sinusoidal voltage applied between lines 82, 80, is higher than the effective voltage $V_M$ between lines 82' and 80'. No conduction occurs when $V_M$ exceeds the line voltage, since the diodes of bridge 70 are back-biased under such conditions.

Figure 18C:
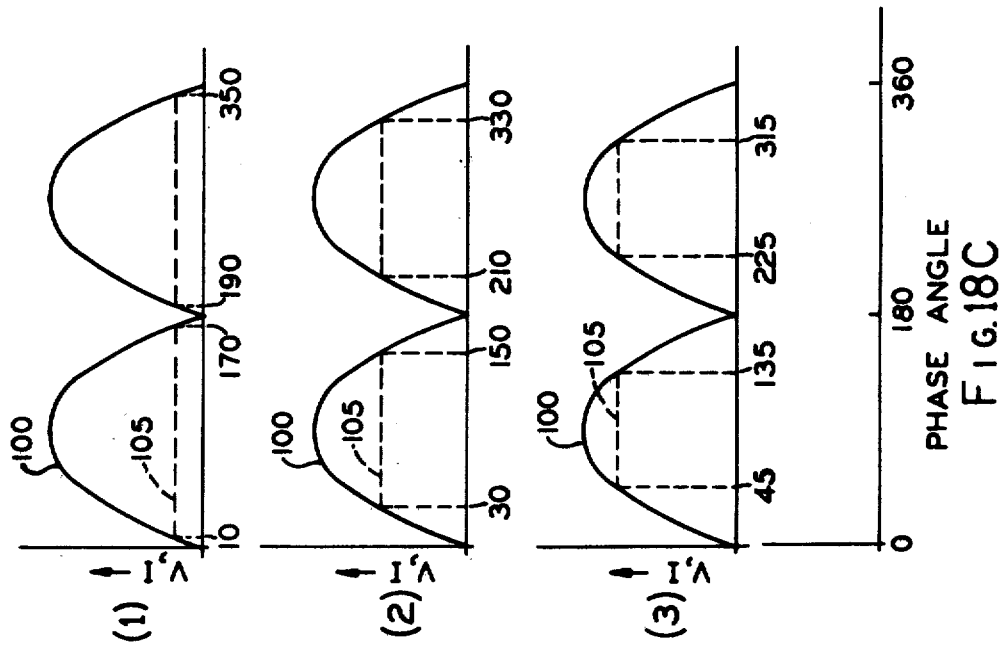
FIG. 18C illustrates the operation of the control system of FIG. 18A under various operating conditions.
Figure 18B:
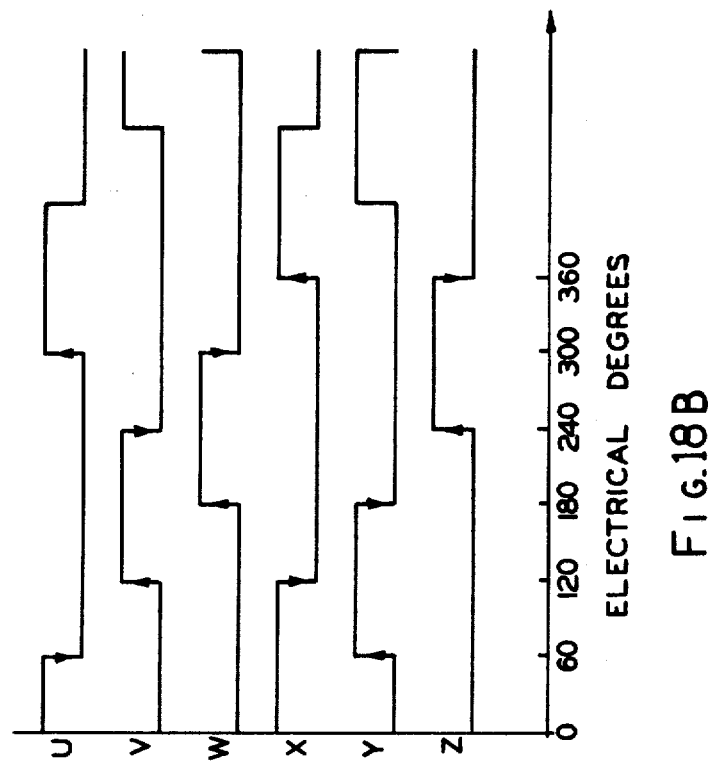
FIG. 18B shows the relative timing of the commutation signals used in the operation of the control system of FIG. 18A.

FIG. 18C illustrates the operation of the circuit shown in FIG. 18A for different operating conditions. Waveform 100 again represents the full wave rectified sinusoidal voltage on line 82, while waveform 105 illustrates motor current flow during the conduction interval of transistor 102, as sensed by current shunt 96. Waveform 105 is also representative of the relative amplitudes of $V_M$ for the three operating conditions illustrated at (1), (2) and (3) in FIG. 18C.

It will be seen that the conduction interval of transistor 102 occurs in the mid-portion of the sine wave, but that its duration varies substantially for different operating conditions. Thus, for the operating condition illustrated at (1) in FIG. 18C, the amplitude of the effective voltage $V_M$ is such that the rotatable assembly turns at an angular velocity which is roughly 25% of the velocity when maximum effective voltage is applied. The conduction interval of transistor 102, as represented by the duration of current waveform 105, is seen to be relatively long, extending from 10° to 170° in the first half of the cycle and from 190° to 350° in the second half. The operating condition shown at (3) in FIG. 18C represents the application of the maximum effective voltage $V_M$. Here, the maximum angular velocity is approximately four times that of the velocity for operating condition (1). The conduction interval is considerably shorter for this operating condition, extending only 90° in each half cycle, i.e. from 45° to 135° and from 225° to 315° in the first and second halves respectively, of the cycle. Operating condition (2), which lies between the extremes of conditions (1) and (3), has a conduction interval that extends from 30° to 150° and from 210° to 330° in the first and second halves of the cycle respectively.

It should be noted that the circuit of FIG. 18A, like that shown in FIG. 17A, relies on the presence of a current shunt signal $R_S$ which is applied to error detector 97 in order to limit the maximum current in the winding stages. Further, regulation of the angular velocity is maintained by feeding back signal $V_M$ to an input of unit 97. Both of these signals act to vary the width of the pulses applied to the base of transistor 102, i.e. using time ratio control in a manner similar to the corresponding action in the circuit of FIG. 17A.

Certain operating factors must be considered which apply to the circuit under discussion here. For example, under certain operating conditions, e.g. those shown at (3) in FIG. 18C, the peak motor current 105 will be twice the amplitude of the average current. This current flows through the winding stages, as well as through commutation transistors 84, 86 and 88 and switching transistor 102. Thus, the $I^2R$ losses in the winding stages and in other circuit parts will be doubled during the 90° conduction interval when the peak current flows. Further, the effect of the inductance of the winding stages assumes increased significance at the higher current values and tends to limit current flow. Thus, under certain conditions a modification of the motor may be required in order to provide smaller inductance and resistance values in the winding stages.

As stated above, when operating condition (3) occurs and the peak-to-average current ratio is 2:1, current flows only during the central 90° interval in each half cycle. Since torque is developed only when current is present, torque pulsation occurs. While this pulsation is largely smoothed out by the inertia of the rotatable assembly, it may cause a problem under worst case conditions which may limit the effective operating range of the motor.

It will be understood that the effects of a doubled peak current amplitude, as discussed above for operating condition (3), can be avoided by the use of a filter, e.g. as shown in FIG. 17A, the effect of which is to average the current. Thus, the price of the cost saving effected by eliminating the filter is a somewhat poorer performance which may, under certain conditions, require circuit or motor modifications. It should be noted, however, that the 2:1 ratio of peak-to-average current occurs only under worst case conditions, i.e. at the maximum angular velocity of the rotatable assembly, when the conduction interval of transistor 102 is 90°. By contrast, under the operating conditions shown at (1) and (2) is FIG. 18C, the effects discussed above remain within tolerable limits. Thus, for operating condition (1), the transistor conduction interval is 160° and the peak current, as well as the $I^2R$ losses, increase only by a factor of 1.13 over what they would be if a filter were used. Likewise, the peak-to-average torque ratio is down to 1.13 at this angular velocity.

The elimination in FIG. 18A of line resistance to maintain a constant line current, works, to some extent, against achieving a high power factor. However, to the extent that the effective voltage $V_M$ remains constant, the peak current in the winding stages will also remain substantially constant if the load on the motor does not vary. Further, the $R_S$ signal provides some regulation of current amplitude and thus compensates in part for the function otherwise provided by the line resistance.

It will be clear that the AC line sees a different power factor for each of the three operating conditions illustrated in FIG. 18C and, in fact, power factor is a continuously changing function for settings of angular velocity that remain between the extremes shown for operating conditions (1) and (3). The highest power factor values, i.e. above 80%, will occur for conduction intervals of transistor 102 ranging from 140° at the long extreme to 60° at the short extreme. For conduction intervals which are longer or shorter, the power factor will fall below 80%. It can be seen, therefore, that the overall power factor throughout the expected operating range is relatively high, although not as high as is achievable with the arrangement shown in FIG. 17A. However, since the cost of the filter and of other components is saved in the circuit of FIG. 18A, the overall cost of the control system, exclusive of the motor, may be reduced by as much as 50%. Thus, the embodiment shown in FIG. 18A may constitute a preferable alternative over other control systems.

Figure 19A:
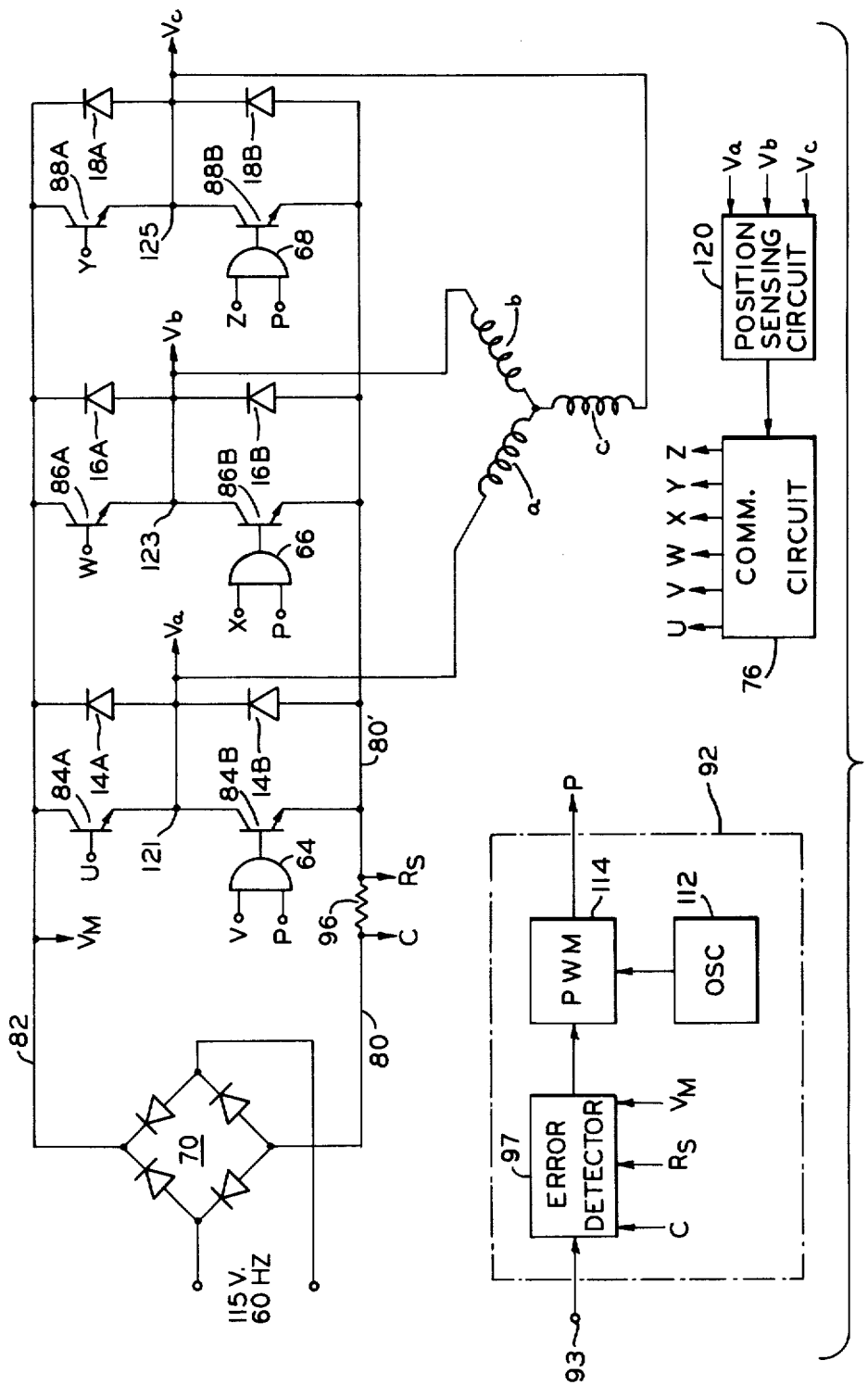
FIG. 19A shows the essential elements of still another control system wherein the control functions are performed through the commutation transistors.

FIG. 19A illustrates a further embodiment of a control system in which applicable reference numerals have been carried forward. As shown, winding stages a, b and c are connected in a full bridge arrangement with communication transistor pairs 84, 86 and 88, similar to the corresponding connection in FIG. 18A. However, transistor 102 is dispensed with in the present embodiment of the invention so that each transistor pair is series connected between lines 82 and 80'.

Commutation signals, U, V, W, X, Y and Z are substantially identical to the signals shown in FIG. 18B, being generated by commutation circuit 76 in response to the back EMF signals applied to position sensing circuit 120 and the resultant position signal applied from the latter circuit to the commutation circuit. As in FIG. 18A, the bases of transistors 84A, 86A and 88A are energized by signals U, W and Y respectively, which are provided by commutation circuit 76. However, the bases of transistors 84B, 86B and 88B are connected to the outputs of corresponding AND gates 64, 66 and 68 respectively, each of which has a pair of inputs. Signals V, X and Z are applied to a first input of gates 64, 66 and 68 respectively, while a signal P is applied to the second input of each gate. A current shunt 96 is connected in series between lines 80 and 80'.

Signal P is derived at the output of regulator 92, whose error detector 97 compares signal $R_S$ and $V_M$ against the signal provided from terminal 93 which is representative of the desired performance of the ECM. As in FIG. 18A, the error signal at the output of circuit 97 is applied to modulator 114, which responds by varying the width of the output pulses of oscillator 112. Thus, signal P is a time ratio control signal which is provided at the output of unit 114.

It will be clear that the circuit discussed above is not limited to the precise embodiment shown in FIG. 19A. For example in one form of the invention, gates 64, 66 and 68 could be connected to the bases of transistors 84A, 96A and 88A respectively, with signals U, W and Y appropriately applied to one gate input each. In such an arrangement, signals V, X and Z are then applied directly to the bases of transistors 84B, 86B and 88B respectively.

In operation, the effective voltage $V_M$ is derived from line 82 as a full wave rectified sinusoidal signal. Line 82 applies this signal simultaneously to commutation transistors 84A, 86A and 88A, each of which becomes conductive when the appropriate commutation signal is applied to its base. Respective ones of gates 64, 66 and 68 become conductive only when the appropriate commutation signal applied to one input thereof coincides with the occurrence of signal P which is applied to the other input. Thus, conductive paths are established in sequence, each including a pair of commutation transistors and a pair of winding stages, as discussed above in connection with FIG. 18A.

In the circuit illustrated in FIG. 19A, transistors 84, 86 and 88 are used to commutate as well as to vary the duration of the voltage applied to the winding stages. Thus, these transistors are believed to be used more efficiently than is the case in the circuits discussed hereinabove and switching transistor 102 in eliminated. A further advantage of the circuit shown in FIG. 19A resides in the relatively high power factor which is obtainable during the operation of the circuit, provided the angular velocity of the rotatable assembly is limited to a predetermined velocity range. This relationship is illustrated in FIG. 19B wherein the AC line power factor is plotted against $V_M/V_L$ peak. As before, $V_M$ is the effective voltage applied to the winding stages which, as explained above, takes the form of a full wave rectified sinusoidal voltage in the present circuit. $V_L$ peak is the peak AC line voltage. Since $V_M$ determines the angular velocity of the motor, the $V_M/V_L$ peak ration is velocity-sensitive.

As shown in FIG. 19B, the power factor peaks at approximately 90% when the $V_M/V_L$ peak ratio is about 0.6. It has been determined in practice that this corresponds to a conduction interval of approximately 106, i.e. an operating condition which lies somewhere between conditions (2) and (3) in FIG. 18C. Thus, there is a relatively wide voltage range, and hence a wide range of angular velocity, in which the ECM can be operated with the control system of FIG. 19A, while reflecting a satisfactory power factor to the line.

The function of the circuits discussed above in connection with FIGS. 16–19 is to vary the effective voltage $V_M$ applied to the winding stages in accordance with the desired ECM performance represented by the signal provided at terminal 93. As explained above, this is carried out by varying the duration of the application of the full wave rectified sinusoidal signal obtained at the output of the diode bridge. The function of commutation circuit 76 is to apply the aforesaid effective voltage to the winding stages of the ECM in a predetermined sequence. If the sequence is repeated, e.g. a-b-c-a-b-c . . . etc., unidirectional rotation of the rotatable motor assembly in one direction will result. If sequenced a-c-b-a-c-b . . . , unidirectional rotation in the opposite direction occurs. As discussed above, unidirectional rotation is called for during the spin cycle of the laundry machine.

If the commutation circuit alternates the sequence, e.g. a-b-c-a-c-b-a-b-c . . . etc., the rotatable assembly will reverse directions for each alternation of the sequence. The resultant oscillation of the rotatable assembly, e.g. at a frequency of 0.8 Hz in a preferred embodiment of the invention, is required for the wash cycle of the laundry machine. As will become apparent from the discussion below, this frequency is selectively variable. It should be noted that the ability of reversing the electronically commutated motor by varying the sequence in which the winding stages are energized, is in large measure responsible for the elimination of the clutch and of the belt transmission required in prior art laundering apparatus where the drive shaft of the laundry machine must be connected and disconnected with respect to the unidirectional rotation of the induction motor in use with such machines.

Figure 24:
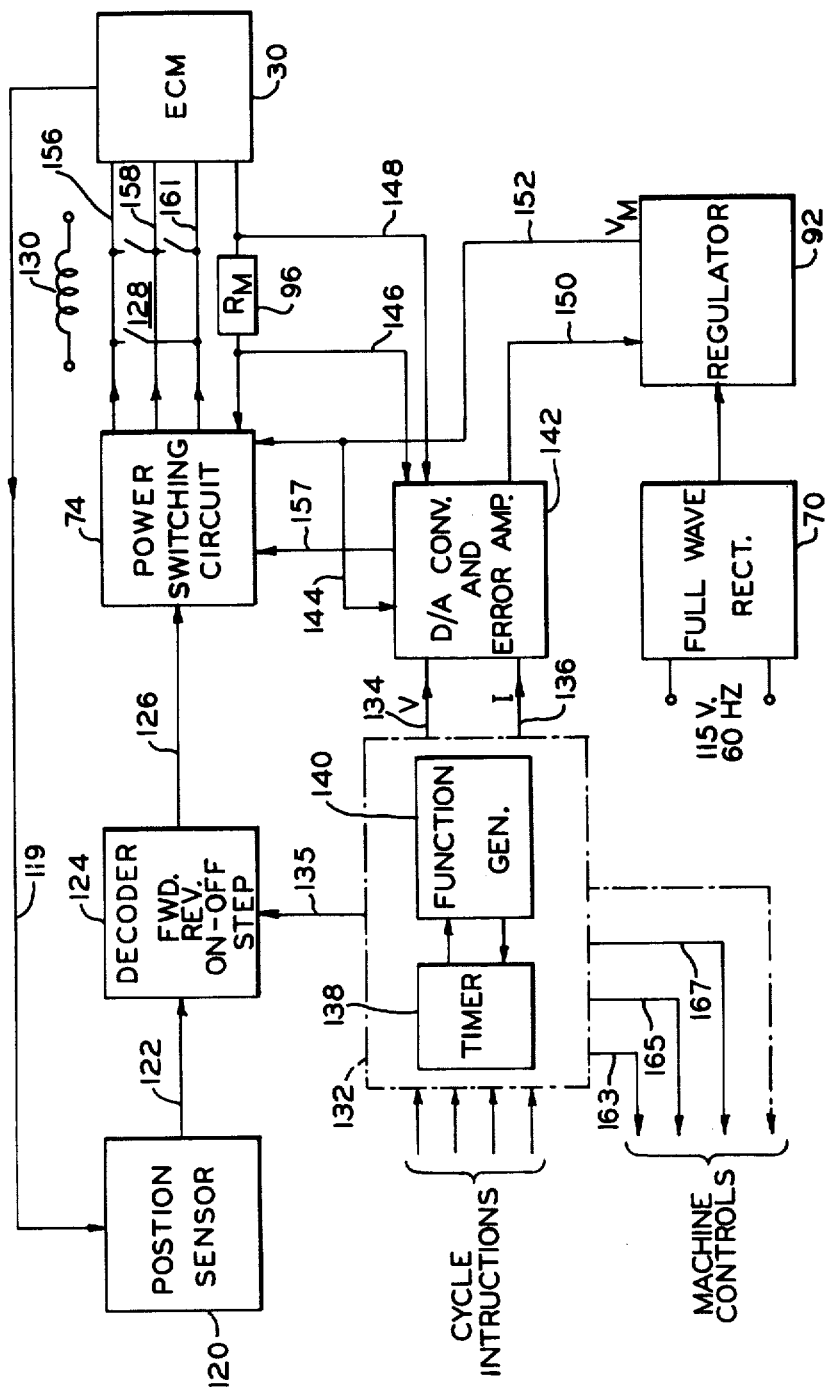
FIG. 24 is a schematic illustration of a control system for an ECM adapted to drive a laundry machine in accordance with the present invention.

FIG. 24 illustrates in block diagram form a system for controlling the operation of an electronically commutated motor adapted to drive a laundry machine in accordance with the principles of the present invention in one form thereof. The desired motor performance is represented by electrical signals which are compared with feedback signals representative of actual motor performance to obtain an error signal which modifies the duration of a full wave rectified sinusoidal signal so as to apply a resultant effective voltage to the motor winding stages. Although applicable reference numerals have been retained, it will be understood that FIG. 24 provides only a schematic overview of a preferred embodiment of the present invention and is not intended to specify actual connecting lines or the like, even though such lines may be individually referred to in the discussion below.

Electronically commutated motor 30 is energized from power switching circuit 74 and operates in conjunction with rotor position sensor 120 which provides a rotor position signal on line 122. In a preferred embodiment of the invention, line 119, which connects motor 30 to position sensor 120, carries a signal representative of the back EMF of the motor, which itself is representative of rotor position, as explained in greater detail in the aforesaid copending application Ser. No. 802,484. This information is transmitted to decoder 124 by way of line 122. A further input is applied to the decoder by way of line 135. The latter input represents information regarding the sequencing of the motor windings which controls the direction of rotation, on-off information with respect to motor winding energization, step advance information and the like. This data is combined with that received from position sensor 120 and is applied to power switching circuit 74 by way of line 126.

A unit 132 responds to cycle instructions loaded in by the operator of the laundry machine to provide appropriate signals on lines 134 and 136 for the control of the voltage and current to be applied to the motor, as well as signals which carry the information discussed above in connection with line 135. The basic functions of unit 132 are those of a timer and of a function generator, as denoted by the blocks designated by the reference numerals 138 and 140 respectively. While these modules may be commercially available, or may be readily constructed from commercially available equipment, it is preferred to implement these functions by means of a commercially available microcomputer owing to the economic advantages of doing so and the ease and flexibility of handling information.

Lines 134 and 136 are connected to a unit 142 and apply signals thereto representative of the desired motor speed and motor torque. Unit 142 performs digital-to-analog conversion of the signals received in digital form from unit 132. Unit 142 also functions as an error amplifier by comparing the generated analog signals with feedback received from ECM 30. As such, the actual performance of motor 30 is monitored. Specifically, line 144 applies a signal to unit 142 which is representative of the actual instantaneous angular velocity of the rotatable assembly, as represented by the effective voltage $V_M$ applied to motor 30. Alternatively, line 144 could apply a signal derived from a speed indicating device, e.g. a tachometer mounted on the motor.

Lines 146 and 148 provide an input proportional to motor current sensed by current shunt 96. Unit 142 acts on the difference between the voltage and current feedback signals and the signals applied by way of lines 134 and 136 respectively, to apply an error signal to regulator 92 by way of line 150. Regulator 92, which here includes SCR 909 if the phase control technique discussed in connection with FIG. 16A is used, is fed from full wave rectifier 70 and modifies the signal received from the latter by varying its duration. The resultant effective voltage $V_M$ is applied to power switching circuit 74 by way of line 152, to enable circuit 74 to appropriately control the signals applied to motor 30 by way of lines 156, 158 and 161. Circuit 74 performs the commutation function of circuit 76 in FIG. 16A and in other Figures, as well as certain other functions which will become apparent from the discussion below.

A set of switches 128 is selectively actuated by a braking relay 130 and is capable of shorting the winding stages, or placing a low value impedance across them, in order to arrest the rotation of the rotatable assembly by the application of a negative torque thereto. The braking relay may be actuated from unit 132 in response to action taken by the operator of the laundry machine. Unit 132 further provides control signals by way of lines 163, 165, 167 etc. These lines may control the heat and cold water valves of the laundry machine, the selective coupling of the machine drive shaft to the agitator or to the tub, a display, etc., all coordinated by unit 132 with the signals applied to ECM 30.

In operation, unit 132 responds to the cycle instructions provided at its inputs to apply coded instructions to decoder 124 by way of line 135 regarding direction of rotation, motor stepping, on-off data, etc. Similarly, instructions are given to unit 142 by way of lines 134 and 136 regarding instantaneously desired motor speed and motor torque respectively; and to the machine controls by way of lines 163, 165, 167, etc. concerning various information such as water temperature and the like. Regulator 92 in the circuit under discussion is capable of receiving the full wave rectified power signal from unit 70 and of applying a D.C. voltage, i.e. effective voltage $V_M$, to power switching circuit 74 by way of line 152. The amplitude of $V_M$ will vary in accordance with the waveforms provided by function generator 140. Specifically, the error signal received from unit 142 and applied by way of line 150, will cause regulator 92 to vary the duration of the application of the full wave rectified sinusoidal signal so as to vary the amplitude of $V_M$. If the effective voltage is too high, the SCR in regulator 92 will open for a longer time interval in order to lower $V_M$. Conversely, the SCR will open for briefer periods to raise the level of $V_M$ if a higher motor angular velocity is called for. In either case, the signal from regulator 92 is applied to power switching circuit 74 by way of line 152. Circuit 74 is further controlled by the signal received from decoder 124 by way of line 126. The latter signal controls the commutation of the windings and the sequence in which they are energized so as to control the direction of rotation.

Current shunt 96 senses current in the windings which is proportional to the torque applied by the motor. Thus, the voltage developed across lines 146 and 148 is proportional to motor current and is applied to unit 142 where it is compared to the then desired motor current, as represented by the signal on line 136. If the actual motor current exceeds that represented by the signal on line 136, power switching circuit 74 is instructed by a signal, applied by way of line 157, to turn off the energization of the winding stages momentarily. Concurrently, regulator 92 is instructed by way of line 150 to regulate to a lower voltage, regardless of the results of the voltage comparison between the signals on lines 134 and 144. This process repeats until the motor current falls below the maximum level set for it. Thus, when over-current occurs in the motor, i.e. when the motor current rises above the maximum level set for it, units 74 and 92 are both instructed to take action. The reason for doing so stems from the fact that the action of regulator 92 may be too slow to cope with the immediacy of a serious over-current situation. However, it will be clear that this situation arises primarily in the context of a particular implementation of the present invention and that the regulating action could be speeded up by a proper choice of suitable design criteria. Alternatively, the regulating action could also occur in the commutating portion of the power switching circuit, as discussed above in connection in FIG. 19A. Whatever implementation is chosen, it will be clear that, notwithstanding the particular mode of operation selected for the ECM-driven laundry machine, the control system is capable of responding to changing load conditions.

FIG. 21 illustrates an exemplary panel switch arrangement for imposing pertinent control functions on the operation of an ECM-driven laundry machine in accordance with the present invention in one form thereof. Upon being reset to zero by the actuation of switch 184, subsequent switch settings will determine cycle instructions applied to unit 132, as explained in connection with the discussion of FIG. 24. Switch 160 is an on-off switch which determines the application of power to the ECM and other components of the system once the proper instruction is given by the microcomputer. The setting of switch 162 causes the microcomputer to instruct brake relay 130 in FIG. 24 to short the stator windings by means of switches 128.

The switches shown within the dashed line enclosure designated by reference numeral 164 provide settings that are related to each other, as will become clear from the explanation below. Switch 178 determines the applicability of the settings of the related switches to either the forward or the reverse rotation of the agitator. In the present invention, motor velocity or torque in opposite directions need not be identical. Switch 166 determines the applicability of the settings of the related switches to the control of either voltage or current, depending on whether it is at a "V LOAD" or an "I LOAD" setting. Thumb wheel switch 168 is capable of selecting by code number one of the waveshapes shown separately in FIG. 22A. Depending on the setting of switch 166, the selected waveshape can apply to either voltage or current, i.e. it will determine the manner in which either the rotor angular velocity, or the motor torque will vary during the selected stroke. It will be clear that the various waveshapes shown are not exhaustive and that the motion of the agitator and the tub may be controlled in numerous different ways. The waveshapes designated by codes 0–5 apply only to the wash cycle, i.e. to the reciprocating action of the agitator whose angular velocity and torque are controlled in accordance with the selected waveshape. Codes 6 and 7 apply only to the spin cycle. Switch 170 is capable of selecting by code number the maximum amplitude of the selected waveshape. Depending on whether voltage (angular velocity) or current (torque) values are involved, preferred ranges of maximum amplitude corresponding to the selected code numbers are given in the table below:

| VOLTAGE SETTING | | CURRENT SETTING | |
| --- | --- | --- | --- |
| Amplitude Code | Maximum Voltage | Amplitude Code | Maximum Current |
| 0 | 15 volts | 0 | 1¼ amps |
| 1 | 30 | 1 | 2¼ |
| 2 | 45 | 2 | 3¾ |
| 3 | 60 | 3 | 5 |
| 4 | 75 | 4 | 6¼ |
| 5 | 90 | 5 | 7½ |
| 6 | 105 | 6 | 8¾ |
| 7 | 120 | 7 | 10 |

The setting of switch 172 determines whether or not the forward and reverse strokes of the wash cycle will be carried out during time units of equal length. For the setting RF=RR, the two time units are identical and one rate setting suffices. Such a setting is effected by turning RATE FWD potentiometer switch 174 to the desired value which then determines the duration of the agitator stroke in both directions. For a setting RF≠RR of switch 172, potentiometer switches 174 and 176 must be separately set to obtain the appropriate forward and reverse stroke time units.

Switch 180 constitutes a scaling switch. The normal rate, as determined by the setting of potentiometer switches 174 and 176, applies when switch 182 is set to "÷1." If it is desired to operate at one-tenth of that rate, switch 180 is placed to the "÷10" setting.

Once the settings of the switches discussed above have been made, switch 182 is pressed. This action serves to load the information set by each switch into unit 132 in the form of the cycle instructions shown in FIG. 24.

In order to define the time unit (time interval) required to carry out successive excursions when the rotatable assembly oscillates back and forth, e.g. during the wash cycle, the waveshape selected must be sampled periodically as shown in FIG. 22B. For purposes of illustration only, the triangular waveshape which corresponds to code 1 in the Table above was taken as an example. Sampling is carried out in a predetermined number of steps, 256 steps being used in a preferred embodiment of the invention.

As used herein, the term "sampling" may apply to two different modes of operation. When used in connection with a waveshape, e.g. one provided by a function generator, its meaning is to take 256 successive readings of the amplitude of such waveshape. The values read then jointly define the waveshape. When the term is used in connection with a control system that uses a microcomputer, its meaning is to read out, in succession, stored values which jointly represent the desired waveshape. In either case, the sampled values are applied to the winding stages of the ECM in order to energize the latter.

The rate at which sampling occurs is determined by the settings of potentiometer switches 174 and 176, or by switch 174 alone if RF=RR. For a fixed number of samples, i.e. 256, the faster the chosen sampling rate, the shorter will be the time unit (time interval) during which the full waveshape is sampled. Thus, the time unit within which each excursion of the oscillating rotatable assembly is completed is determined by the selected sampling rate. Accordingly, the sample rate also bears on the frequency of oscillation.

Owing to the degree of control afforded by the features of the invention discussed hereinabove, certain performance parameters, which are not directly controllable, may nevertheless be varied by controlling those parameters which underlie them. For example, the displacement angle of the agitator is a function of velocity and time. Since rotor velocity responds to the applied voltage and since the time interval during which the agitator stroke is carried out may be varied by changing the sampling rate, the selection of these two parameters determines the angle of displacement. This is illustrated in FIG. 23A for a sinusoidal stroke corresponding to the waveshape of code 0 in FIG. 22A. Thus, for a given stroke rate, the selection of the maximum voltage, which is selected by the setting of switch 170, determines the displacement. As will be seen from curves 190, 192 and 194 in FIG. 23A, as the maximum voltage increases a corresponding increase occurs of the maximum positive as well as maximum negative displacement. This holds also true for the situation where the maximum applied voltage is held constant and the rate is decreased.

Similarly, the acceleration rate is adjustable by varying its underlying parameters. FIG. 23B illustrates this aspect of the present invention. For a given time interval, a change of velocity obtained by varying the amplitude of the applied voltage will result in a variation of acceleration, as illustrated by curves 196, 200 and 202. The velocity is varied by selecting the desired maximum voltage amplitude from the table above. The variability of acceleration has application not only to both strokes of the wash cycle, but also to that portion of the spin cycle during which the motor comes up to speed.

Figure 25:
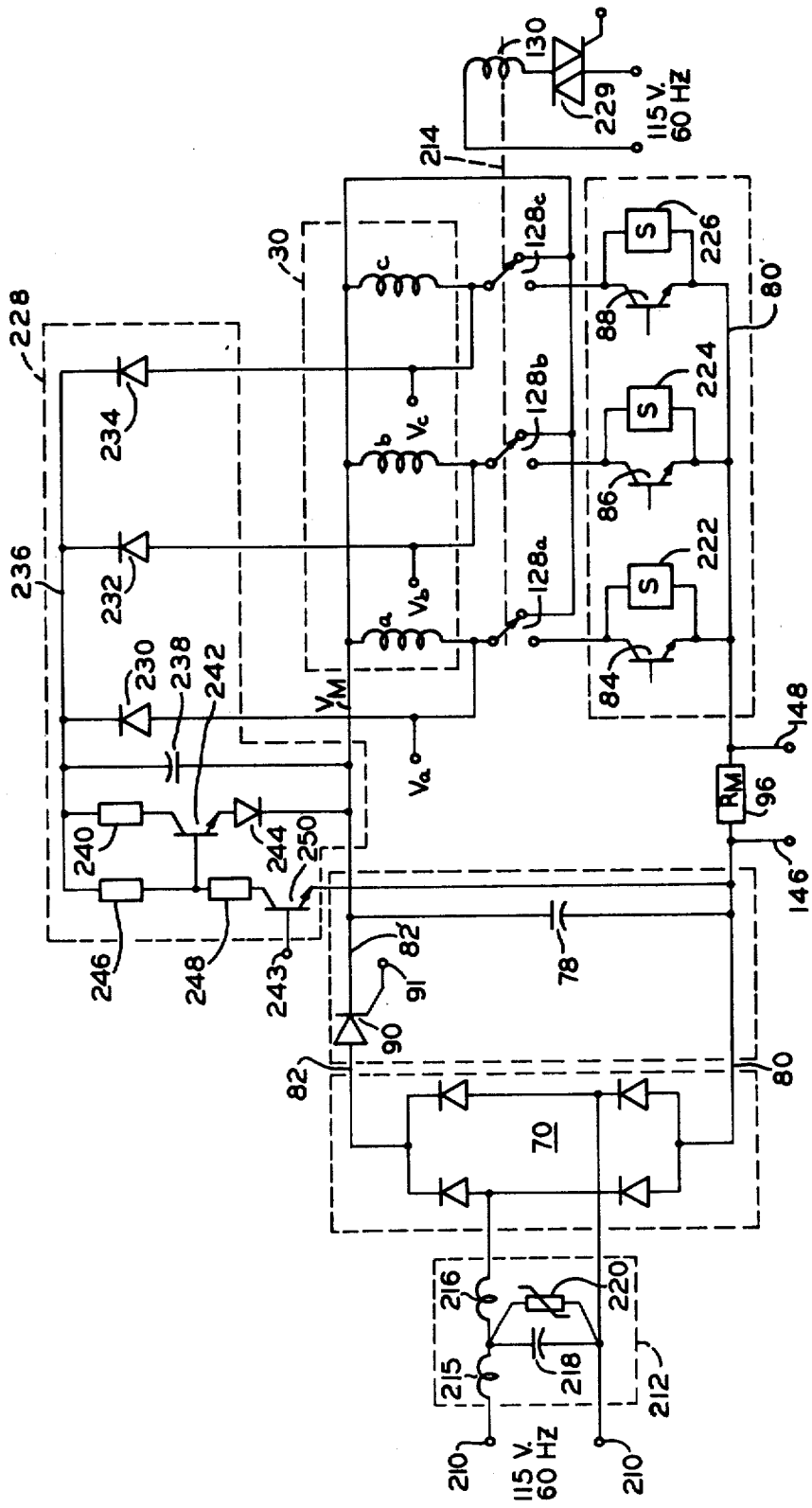
FIG. 25 illustrates the relationship of pertinent portions of a preferred implementation of a control system shown in detail in FIGS. 26–39.

Before considering the detailed implementation of a preferred embodiment of the present invention, as illustrated and discussed below with respect to FIGS. 26–39, it will be useful to review the relationship of certain component portions of the invention, as shown in FIG. 25, in order to further an understanding of their function in the overall control system. Thus, FIG. 25 is keyed to the discussion above relative to FIG. 24. It is pointed out that FIG. 25, while similar to FIG. 16A, is more detailed in some respects, while omitting other portions that are not pertinent to the particular aspect of the invention under discussion here. However, both circuits illustrate a phase-controlled system for regulating the voltage applied to the ECM. Wherever possible, applicable reference numerals have been retained.

In the circuit of FIG. 25, 115 V, 60 Hz power is applied by way of input terminals 210 to a filter 212 which screens out electromagnetic interference and which suppresses transients. Unit 212 comprises a pair of series-connected inductances 215 and 216, and a capacitor 218 connected in parallel with a component 220 between the junction point of inductances 215, 216 and the opposite line. Component 220 is a transient suppressor of the type which is commercially available from General Electric Company under the designation GEMOV and it functions to apply a relatively pure sine wave to full wave diode bridge 70. The output of bridge 70 appears on a pair of lines 82 and 80. A silicon controlled rectifier 90 is connected in series with line 82. The line portion on the far side of SCR 90 is designated 82' for purposes of identification. As was the case in the circuit of FIG. 16A, a full wave rectified DC signal is applied to SCR 90. A capacitor 78 is connected between lines 82' and 80 and provides an essentially ripple-free effective voltage $V_M$ to the subsequently connected winding stages.

Motor 30, which may be identical to one of the ECM motors discussed in connection with FIGS. 3 to 5, includes winding stages a, b and c which are connected in common to line 82'. The other winding terminals are connected to switches 128a, 128b and 128c respectively, which may be ganged so as to be jointly operable by brake relay 130. Each of switches 128 has two positions. In the position shown, the winding stages are shorted across the line. In the second position, winding stages a, b and c are connected in series with the collectors of commutation transistors 84, 86 and 88 respectively, whose emitters are connected in common to line 80'. Transistors 84, 86 and 88 have "snubbers" 222, 224 and 226 respectively, connected in parallel therewith, for the purpose of suppressing transients across these transistors during commutation. Brake relay 130 is connected in series with an optically coupled switch 229 which is capable of being selectively turned on and off by an external signal. A current shunt 96 is connected in series with line 80' and provides a voltage between the common reference line 146 and line 148 representative of current in the winding stages.

Three separate signals designated $V_a$, $V_b$ and $V_c$, which are representative of the back EMF of motor 30 and which are used for position sensing, are derived at the terminals of winding stages a, b and c, which are connected to switches 128a, 128b and 128c respectively. The latter winding terminals are further connected to a set of diodes 230, 232 and 234 which form part of an energy dissipation circuit 228. The other diode terminals are connected in common to a line 236. A capacitor 238 is connected between lines 236 and 82', in parallel with the series combination of a resistor 240, a transistor 242 and a diode 244. A resistor 246 is connected between line 236 and the base of transistor 242. A resistor 248 is connected in series with a transistor 250 between the base of transistor 242 and line 80. The base of transistor 250 is connected to a terminal 243.

To the extent that the operation of the circuit shown in FIG. 25 follows that discussed above in connection with the operation of FIG. 16A, no repetition is required. It will be clear that SCR 90 in the circuit of FIG. 25 is turned on upon the application of a suitable signal to its terminal 91. Such a signal is generated at a phase angle, i.e. at a time interval following a zero crossover of the line voltage, which is determined by the particular conditions such as speed, torque, etc., which are being regulated.

In the energy dissipation circuit 228, transistor 250 is normally maintained in a conductive state by the application of a suitable signal to its base from terminal 243. When transistor 250 is conductive, transistor 242 is biased into a conductive state, as determined by the division of voltage between resistors 246 and 248. Under these conditions, the voltage across capacitor 238 is regulated to the same value as the effective voltage $V_M$ applied to the winding stages. Whenever a winding stage is switched during the commutation process, the energy stored in the inductance of the winding stage must be dissipated. The dissipation path includes the diode connected to the switched winding and capacitor 238. Thus, capacitor 238 is charged through diodes 230, 232 and 234 by the energy stored in the inductance of the winding stages during normal commutation. Between these successive commutations, the capacitor discharges through a series path comprising resistor 240, transistor 242 and diodes 244, and thus dissipates the stored energy. The excess energy is dissipated directly in the path which comprises resistors 246 and 248 and transistor 250 on the one hand, and resistor 240, transistor 242 and diode 244 on the other hand.

As will become clear from the explanation below, the signal applied to terminal 243 is proportional to the error voltage which ultimately determines whether the motor is to speed up or slow down. At a predetermined level of this voltage, indicative of excessive motor speed, this signal is applied to terminal 243 and causes transistor 250 to cut off. The full voltage which appears across winding stages a, b and c is therefore applied to the base of transistor 242 and causes the latter to turn on to its maximum extent. In consequence, maximum energy dissipation now takes place in the network branch which comprises resistor 240, transistor 242 and diodes 244. The energy so dissipated exceeds the amount of energy which is required to be dissipated due to commutation alone. As a consequence, the rotor encounters a drag which slows down its speed of rotation. In essence, a low impedance is substituted for the relatively high impedance previously connected across the motor windings, but only as required by the particular situation. The increased drag or negative torque on the rotatable assembly comes into effect automatically as required, i.e. energy dissipation is increased when needed. Thus, the control system responds automatically to the existing circuit operating conditions.

The above-described feature of the invention is superior to merely lowering the effective voltage applied to the motor, since it can act more decisively and quickly than a system which depends primarily on the drag torque during coasting of the rotatable assembly. This property of the present control system is particularly valuable in a laundry machine, e.g. for slowing down the agitator preparatory to a reversal of rotation during its oscillatory motion. In the absence of special circuitry, the agitator will have a tendency to coast if it is slowed down merely by lowering $V_M$. While it would be possible to short the motor winding stages, or even to reverse them, the resultant agitator action may be undersirable since it may damage the wash load. By comparison, the dynamic braking feature of the present invention, which comes into effect automatically as required, is believed to provide gentle handling of the wash load.

FIGS. 29 to 39 illustrate, in one form of the invention, a preferred implementation of the control system shown in block diagram form in FIG. 24 and which was further explained with reference to FIG. 25. It is pointed out that FIGS. 26–39 illustrate an actual implementation of the present invention. Hence, the organization and discussion of these Figures follows the physical location of various circuit components on the different circuit boards used, i.e. in accordance with the actual immplementation of the control system. It will be understood, however, that the invention is not so limited and that the same components may be arranged in a different organizational plan without departing from the principles of the present invention.

To the extent that they are applicable, previously used reference numerals have been retained. The reference letters and numbers shown within a circle in the drawings designate interconnections in the form of terminals between different circuit boards. The relationship of these interconnections to each other is shown in detail in Appendix "A" and is further clarified with reference to FIG. 39. In the specification, the aforesaid reference letters are called out as such; however, reference numbers which apply to terminal connection are shown underlined to distinguish them from the reference numerals by which various circuit components are designated.

FIG. 39 illustrates the interconnections of various circuit terminals of FIGS. 26–38 discussed below, as well as circuitry immediately connected to these terminals. For further details of these connections, recourse may be had to Appendix A.

A 115 V, 60 Hz power line input is applied across terminals F, H and J, K, which are further connected to full wave diode bridge 70. Lines 80 and 82 couple the output of bridge 70 to terminals B, C and D, E respectively. A filter comprising a resistor 676 and a capacitor 218 is connected across terminals B, C and D, E, ahead of bridge 70, for the purpose of suppressing transients. Terminals F, H are further coupled to terminal V, which itself is connected to optically coupled switch 229, identical to that shown in FIG. 25. Device 229 is coupled to a terminal W which is further connected to the brake coil relay 130, e.g. as shown in FIG. 25.

A pair of optical couplers 680, 682, is connected in series with a resistor 685 across terminals X and Y. Terminals X and Y are further connected to the output of unit 132 in FIG. 24, which comprises a microcomputer in the preferred embodiment of the invention. Although different types of commonly available microcomputers may be employed, it is preferred to use a PLS 858 unit, as described in Appendix B, which is commercially available from Prologue Corp. of Calif. Thus, a braking command from the microcomputer, e.g. in response to actuation of switch 162 in FIG. 21, is transmitted to the brake by way of the aforesaid optical couplers. This arrangement isolates the computer to keep its ground reference inviolate.

The terminal connections shown in FIG. 39 further include terminals L, N and R connected to diodes 230, 232 and 234 respectively, which are likewise shown in FIG. 25. These diodes are coupled to a common line 236 which is connected to a terminal S. Line 236 is also connected to a terminal U by way of a pair of capacitors 238A and 238B which jointly substitute for capacitor 238 in FIG. 25.

FIG. 26 illustrates a low voltage power supply which provides regulated power for the microcomputer employed in the control system herein. The primary winding of a transformer 260 is connected across terminals L and N and receives 115 V, 60 Hz power. A pair of diodes 262 and 264 is connected to opposite terminals of the transformer secondary. The free diode terminals are jointly connected to line 270 to provide a full wave rectified signal at the latter. A capacitor 266 is connected between lines 270 and 272, the latter line being coupled to a tap, preferably the midpoint, of the transformer secondary winding. Thus, 11 V peak of DC voltage appears across capacitor 266 which provides a filtering action to eliminate ripple. A regulator 268 is coupled to line 270 and 272. A potentiometer 274 is connected across the output of regulator 268 and is capable of adjusting the voltage provided at the output. A capacitor 276 is connected across potentiometer 274 and provides filtering of the 5.0 V regulated DC output voltage provided between a pair of output terminals S and R.

FIG. 36 illustrates another low voltage power supply which provides 10.0 V DC across a pair of output terminals U and T. The power supply shown in FIG. 36 is substantially similar in construction to that illustrated in FIG. 26. Its function is to provide a regulated voltage for various circuits discussed below, primarily for the operational amplifiers and for the logic circuits. A transformer 280 has its primary winding connected across terminals K and M to which the 115 V, 60 Hz power line is connected. A pair of diodes 282 and 284 is connected to opposite terminals of the transformer secondary. The free diode terminals are connected to line 290 to provide a full wave rectified signal across a ripple capacitor 286. Capacitor 286 is connected between lines 290 and 292, the latter line being connected to a tap, preferably at the midpoint of the transformer secondary. Thus, 17 V peak DC is applied across capacitor 286. This voltage is further applied to a series regulator 288 connected between lines 290 and 292. A potentiometer 294 is connected between the output of regulator 288 and common line 292 and is adjustable so that its output voltage may be regulated to 10.0 volt D.C. applied across output terminals U, T. This voltage is referred to as $V_r$ in the drawings and has been so indicated in FIG. 36. A filter condenser 296 is connected across the aforesaid output terminals. The secondary winding of transformer 280 is further connected to terminals R and P so as to apply 12 V RMS, 60 Hz between each terminal and common line 292. Information relating to zero crossovers on the AC line appears at these terminals for subsequent application to the circuit shown in FIG. 30 which is discussed below.

The circuits illustrated in FIGS. 32 and 37 are substantially identical, each providing a variable frequency oscillator for sampling, at a chosen rate, the particular waveshape that was selected from the set of waveshapes shown in FIG. 22A. Sampling occurs as explained in connection with FIG. 22B. FIG. 32 illustrates the circuit used for varying the rate in the forward direction in accordance with the setting of potentiometer 174, as discussed in connection with FIG. 21. The potentiometer is coupled to a pair of terminals T and S, which are further connected to an oscillator 684 by way of a series-connected resistor 686. The frequency of the oscillator is determined by the setting of potentiometer 174, sometimes referred to as a potentiometer switch in the discussion of FIG. 21. A capacitor 688 is connected between resistor 686 and a further input of oscillator 684. Other input terminals of oscillator 684 are connected to voltage $V_r$ and ground respectively, as shown in the drawing.

Output 690 of oscillator 684 is coupled to the base of a transistor 700 by way of a resistor 692. The transistor emitter is coupled to ground and its collector is connected to an optical coupler 694, which is further connected to receive reference voltage $V_r$ by way of a resistor 698. One output terminal of optical coupler 694 is connected to terminal R which is further coupled to the microcomputer. The same output terminal of the coupler is further connected to a +5 volt level by way of a resistor 696, the other coupler output terminal receiving −5 volt.

In FIG. 37, potentiometer 176 is set as described above in connection with the discussion of FIG. 21. Potentiometer 176 is connected across terminals 18 and 17, the latter terminals being directly connected to an input of an oscillator 702. Terminal 18 is coupled to the oscillator input by way of a resistor 704. A capacitor 706 is connected between the latter resistor and a further input terminal of oscillator 702. Other oscillator inputs are connected to terminals T and M respectively, as shown, the latter terminal being tied to ground. A pair of capacitors 708 and 710 are connected in parallel between terminals T and M, capacitor 710 serving as a high-frequency bypass around capacitor 708.

The frequency of oscillator 702 is determined by the setting of potentiometer 176. The oscillator output 712 is coupled to the base of a transistor 716 by way of a resistor 714. The emitter of transistor 716 is grounded, its collector being connected to an optical coupler 722 whose input is further connected to terminal T by way of a resistor 718. The output terminals of coupler 722 are connected to terminals P and Z respectively. The side connected to terminal P is further connected to terminal Y by way of a resistor 720.

The operation of the circuits of FIGS. 32 and 37 is substantially identical and will therefore only be described for the former circuit. The setting of rate potentiometer 174 determines the frequency of the signal obtained at output 690 of oscillator 684. This signal is amplified by transistor 700 and is coupled to microcomputer 132 (in FIG. 24) by way of terminal R. As explained above, optical coupler 694 maintains the microcomputer isolated. The frequency of the incoming signal is used by the microcomputer to sample the selected waveshape in the forward direction of the rotor. Thus, the setting of rate control potentiometer 174 acts through the microcomputer to determine the sampling rate of the selected waveshape and hence the duration and displacement of the agitator stroke in the forward direction. The setting of rate potentiometer 176 has the same effect for the reverse stroke of the agitator.

FIG. 27 illustrates a preferred implementation of a scaling circuit for scaling the rate selected by potentiometer 174. The scale selection is made by switch 180 in FIG. 21, as explained above. A signal is applied to terminal J at a particular oscillator frequency, the latter being determined by the settings of rate potentiometer switch 174 in FIG. 21. The incoming signal is applied to a divider 300 whose output is connected to one leg of NAND gate 302. Terminal K is connected to the other leg of NAND gate 302, as well as to both inputs of a NAND gate 306. The latter gate has its output connected to one input of a NAND gate 308. A further input of gate 308 is connected to receive the incoming signal directly from input terminal J. The output of gate 308 is connected to one input of NAND gate 304, another input of the latter being connected to the output of gate 302. The output signal of the circuit is derived at the output of gate 304 which is connected to terminal H.

In operation, a signal generated by the setting of switch 180 in FIG. 21 is applied to terminal K. If the waveshape selected from those shown in FIG. 22A is to be sampled at the normal rate, i.e. the rate determined by the settings of switch 174 in FIG. 21, the signal applied to terminal K renders gate 308 conductive by way of gate 306. Accordingly, the oscillator signal applied to terminal J is transmitted by gate 308 and thus reaches terminal H by way of NAND gate 304. If, on the other hand, scaling by a factor of 10 is to take place, the signal applied to terminal K when switch 180 is set, renders gate 302 conductive. Accordingly, the oscillator signal is applied to frequency divider 300 and a signal having one-tenth the frequency of the oscillator signal is transmitted by way of gates 302 and 304 to output terminal H, for subsequent coupling to the microcomputer.

FIG. 28 illustrates preferred implementation of the digital-to-analog converter and error amplifier unit for the applied motor voltage, shown at 142 in FIG. 24. The regulated DC voltages supplied by the circuits of FIGS. 26 and 36 dicussed hereinabove, i.e. +5 volt and $V_r$, respectively, are applied to terminals B and D respectively. In the preferred embodiment of the invention shown, eight optical couplers 310 are employed, which are powered from the aforesaid regulated DC voltages. As before, the optical couplers serve to isolate the microcomputer from the rest of the control system in order to keep the computer at a true ground reference. In each instance, the terminal designated by a letter numeral and shown in a circle in FIG. 28, represents one of the eight digit input lines from the computer which are collectively designated by the reference numeral 134 in FIG. 24. The corresponding output terminal in each case, designated by the same letter but with a bar above it, is connected to the D/A converter proper. Thus, the 8-bit computer input is received on terminals J, K, L, H, N, P, R and M, while the corresponding signals which are applied to the D/A converter itself appear at terminals $\bar{J}, \bar{K}, \bar{L}, \bar{H}, \bar{N}, \bar{P}, \bar{R}$ and $\bar{M}$ respectively.

As shown, the latter set of terminals is connected to a pair of electronic switching units 312 and 314 respectively, each having four terminals which are appropriately designated $\bar{J}, \bar{K}, \bar{L}, \bar{H}$, and $\bar{N}, \bar{P}, \bar{R}, \bar{M}$ respectively. Voltage $V_r$ is coupled to switching unit 312 by means of resistors 501, 503, 505 and 507, each having a different value. Depending on which of terminals $\bar{J}, \bar{K}, \bar{L}$ and $\bar{H}$ receive a signal to actuate the appropriate switch contacts, none, one, or more of resistors 501, 503, 505 and 507 respectively, will be connected in parallel between voltage source $V_r$ and the common output of switching unit 312. The latter is further connected to an input leg of an operational amplifier 316. Accordingly, the level of the signal applied to amplifier 316 will depend on the 4 bit code applied to terminals $\bar{J}, \bar{K}, \bar{L}$ and $\bar{H}$ to provide digital-to-analog conversion. Similarly, switching unit 314 provides a signal level at its common output which depends on the 4 bit code applied to terminals $\bar{N}, \bar{P}, \bar{R}$ and $\bar{M}$.

Connected as shown, amplifier 316 is adapted to provide a gain. To stabilize its output signal, a feedback is placed around the gain stage by means of resistor 317. The output of amplifier 316 is coupled to a junction point 321 by means of a resistor 319, whence it is combined with the output of electronic switching unit 314 and is so applied to one input leg of a summing amplifier 318. The latter has a feedback path coupled between its output and another input leg thereof, comprising a resistor 223 connected in parallel with a capacitor 326. Thus, at the output of amplifier 318 a voltage is provided which is proportional in amplitude to the 8 bit binary number applied by the microcomputer to the input terminals of optical couplers 310. This voltage is coupled to one input leg of an amplifier 322 by way of a variable resistor 335 connected in series with a fixed resistor 337.

The voltage $V_M$, which is applied to the common connection of the winding stages, (see FIG. 25), is applied to terminal 9. From there, it is coupled to an input leg of an amplifier 320 by way of a resistor 325 connected in parallel with the series combination of a capacitor 327 and a resistor 329. The output of amplifier 320 is fed back to a second input leg by way of a resistor 331 connected in parallel with a capacitor 333, to provide a forward gain factor of 0.05 in a preferred embodiment of the invention. Thus, the motor voltage is scaled down to be compared by amplifier 322 with the output signal of amplifier 318. The output of amplifier 320 is coupled to another input leg of amplifier 322 by way of a resistor 339, as well as to an output terminal 11 at which the scaled down motor voltage can be observed directly. The output of amplifier 322 is coupled to the last-recited input leg of amplifier 322 by way of a parallel resistor-capacitor combination 341, 343. Voltage $V_r$ is resistively coupled to both input legs of amplifier 322. The signal which results from the comparison of the outputs of amplifiers 318 and 320, i.e. the error signal, appears at output terminal 12 which is coupled to the output of amplifier 322. This is an analog signal which is proportional to the difference between the actually applied motor voltage and the motor voltage called for by the microcomputer.

FIG. 29 illustrates a preferred implementation of the D/A converter portion of unit 142 in FIG. 24 which applies to motor current only and which receives its computer input signal by way of line 136 in FIG. 24. In similar manner to the circuit shown in FIG. 28, optical couplers 330 couple an 8 bit digital signal received from the microcomputer by way of terminals W, Y, Z, X, S, U, V, T, to corresponding terminals $\overline{W}, \overline{Y}, \overline{Z}$ and $\overline{X}$ on electronic switching unit 332 and to terminals $\overline{S}, \overline{U}, \overline{V}$ and $\overline{T}$ on electronic switching unit 334, respectively. Digital-to-analog conversion is provided through the signal level at the output of each switching unit, which depends on the 4 bit code applied at the input terminals. The output of switching unit 332 is applied to a gain stage 336 whose output is coupled, by way of a resistor 345, to one input leg of a summing amplifier 338, jointly with the output of unit 334. The feedback loop of amplifier 338, connected between its output and a second input leg, includes a variable resistance 347 in parallel with a capacitor 349. The signal which appears at terminal 13 is thus proportional in amplitude to a maximum current permitted by the 8 bit digital signal applied by the microcomputer to the input terminals of optical couplers 330.

The comparison of the signal appearing at output terminal 13 in FIG. 29 with a signal representative of actual motor current is carried out in the circuit shown in FIG. 31. It will be understood that the signal provided at terminal 13 in FIG. 29 is an analog signal representative of the maximum permissible current for a given setting of potentiometer switch 170 in FIG. 21. This signal is coupled to terminal W in FIG. 31, for application to a comparator 410 by way of a resistor 411. A capacitor 412 is connected to ground from the aforesaid input terminal of comparator 410 and is adapted to filter out transient voltage surges. Voltage $V_r$ is coupled directly to a further input of comparator 410 and, by way of a resistor 413, to the output of unit 410. The output of unit 410 is connected to terminal V.

A voltage proportional to motor current, which is derived across current shunt 96 in FIG. 38 discussed below, is applied to terminals X and Y in FIG. 31. The latter terminals are coupled, by way of resistors 415 and 417, to input legs 414 and 416 respectively, of an amplifier 418. The output of amplifier 418 is coupled back to input leg 414 by way of a pair of parallel resistors 419 and 421 in order to provide greater signal stability. Voltage $V_r$ is applied to input leg 416 by way of a network 420. The latter includes a resistor 423 connected to a junction point 422. A pair of resistors 425 and 427 is connected in parallel between the latter junction point and input leg 416. Point 422 is further connected to ground through a pair of series connected diodes 429, as well as through a capacitor 433 connected in parallel with the diode pair. The output of amplifier 418 is coupled to a further input leg of comparator 410 by way of a resistor 435. A capacitor 437 is connected between the last recited input leg and ground.

In operation, the voltage across terminals X and Y, which is representative of actual current in the winding stages, is compared by unit 410 to the analog voltage appearing at terminal W representative of the maximum current called for by the microcomputer, i.e. as applied by line 136 in FIG. 24. The result of this comparison is an error signal which appears at terminal V and which is applied to a one shot multivibrator 424 by way of terminal N in the circuit of FIG. 35 discussed below. The output of one shot 424 appears at terminal 10 in FIG. 35, whence it is coupled to terminal 14 in FIG. 30 and is subsequently applied to comparator 350, as discussed below. In essence then, the circuit shown in FIG. 31 performs the function of comparing the voltage across current shunt 96, which is representative of actual motor current, with the signal applied to terminal W from the circuit of FIG. 29, which represents the maximum motor current set by the microcomputer.

A more elaborate technique for using phase control is employed in the circuit illustrated in FIG. 30 which shows the use of a ramp and pedestal technique for controlling the SCR. The error voltage derived at terminal 12 in FIG. 28, which represents the difference between the voltage called for by the microcomputer and that actually applied to motor 30, is applied to terminal J in FIG. 30. Terminal J is connected, by way of a resistor 351, to one input leg of an operational amplifier 350 which functions as a comparator in the present circuit. The voltage $V_r$ is resistively coupled to another input leg of comparator 350, by way of a junction point 376. The 8 V RMS, 60 Hz voltage, obtained at terminals R, P in FIG. 36, is applied to terminals F, H, whence it is full wave rectified by diodes 352 and 354 and is applied, by way of resistors 353 and 355, to one input leg of an amplifier 356. A Zener diode 358 which is connected between ground and the junction point 360 of resistors 353 and 355, serves to regulate the voltage applied to amplifier 356 to 6.8 volts in a preferred embodiment of the invention. Voltage $V_r$ is resistively coupled to another input leg of amplifier 356.

Junction point 360 is coupled by way of a pair of resistors 362 and 364 to the input leg of comparator 350 to which the error signal from terminal J is applied. Resistors 362 and 364 are joined at a junction point 366 which is connected to ground by way of a capacitor 368. A resistor 299 coupled the output of amplifier 356 to the base of a transistor 370 whose emitter is directly connected to ground. The collector of transistor 370 is connected to junction point 366 by way of a diode 372 and a resistor 374 connected in series therewith.

As discussed above, the signal at terminal 10 in FIG. 35 is coupled to terminal 14 in FIG. 30, from where it is applied to junction point 376 by way of a network 378 connected in series with a resistor 357 at a further junction point 380. Network 378 includes a resistor 359 connected in parallel with a resistor-diode series combination 347, 363, between junction point 380 and terminal 14. A filter capacitor 381 is connected between junction point 380 and ground. The purpose of network 378 is to obtain a fast rise—slow decay response to a signal appearing at terminal 14 upon the occurrence of excess current in the winding stages.

Amplifier 350 has a feedback resistor 361 connected between its output and junction point 376 which provides positive feedback for stabilization during switching. The latter output is further connected to one input leg of a NOR gate 382, whose other input leg is connected to the output of amplifier 356. The output of gate 382 is coupled to an oscillator circuit 386 by way of a further NOR gate 384. Oscillator circuit 386 takes the form of an astable multivibrator and comprises a NOR gate 388 having a first input leg connected to the output of gate 384. A second input leg of this gate is connected to the output of a further NOR gate 390, by way of a capacitor 392 and a resistor 394. The output of gate 388 is connected to the jointly connected input legs of gate 390, as well as to a resistor 396 whose other terminal is connected to the junction point of capacitor 392 and resistor 394.

The output of gate 390 is coupled, by way of a resistor 365, to the base of a transistor 398 whose emitter has the aforesaid reference voltage $V_r$ applied thereto. The collector of transistor 398 is connected to the primary winding of an output transformer 400 whose secondary winding is connected to a pair of terminals L and K. A resistor 401 is connected across terminals L, K. As shown elsewhere in the drawings, terminals L, K are connected to apply a signal to SCR 90.

Terminal J, which receives the aforesaid error signal representative of the difference between the voltage called for by the microcomputer and, that which is actually applied to the winding stages, is further coupled to one input leg of a comparator 402 by way of a pair of resistors 367, 369, whose junction point is coupled to ground through a capacitor 371. The output of comparator 402 is coupled through resistor 373 to the aforesaid input leg to provide positive feedback for stabilization during switching. Reference voltage $V_r$ is resistively coupled to a second input leg of comparator 402. The comparator output is coupled to output terminal C through a resistor 375. In FIG. 25 the latter terminal corresponds to terminal 243 in energy dissipation circuit 228.

As previously explained in conjunction with the discussion of FIG. 16A and 25, the regulation of the voltage applied to the winding stages of motor 30 controls the angular velocity of the motor. By means of phase control the time interval during which SCR 90 is conductive is varied. This is done by choosing the point in time, i.e. the phase angle of the applied sine wave, at which the normally non-conductive SCR is turned on. The voltage appearing at the output of the SCR is filtered so that a relatively smooth effective voltage $V_M$ results, the amplitude of which varies with the interval of conductivity of the SCR. By increasing the time interval during which the SCR conducts, the effective voltage $V_M$ applied to the winding stages is increased and the motor angular velocity increases. By decreasing the conductivity period of the SCR, motor angular velocity is decreased.

The ramp and pedestal technique illustrated by the circuit of FIG. 30 enhances the effectiveness of phase control by providing greater stability. As implemented herein, this technique depends on the application of a reference voltage to the comparator together with a ramp signal, i.e. with a linearly increasing voltage which is started at a determinable point in time. In the present invention, this point is taken at the zero crossover point of the full wave rectified line signal which is applied at the input of amplifier 356. When the line voltage applied across terminals F, H goes to zero, operational amplifier 356, which compares this signal to reference voltage $V_r$, turns on. By this action transistor 370 is turned on and causes capacitor 368 to discharge to ground through the path established by resistor 374, diode 372 and transistor 370. The signal appearing at the output of amplifier 356 is further applied to the input of NOR gate 382 in order to lock the latter, i.e. to render it nonconductive. The resultant signal across terminals L, K is applied to the SCR and prevents triggering of the latter.

As the full wave rectified line voltage appearing at junction point 360 rises beyond a pre-established value, the output of amplifier 356 goes to zero and transistor 370 is cut off. At this point, the RC circuit formed by resistor 362 and capacitor 368 causes the latter to charge from the line, i.e. from the signal appearing at junction point 366. Accordingly, there is a rise of the voltage at junction point 366 and thus a rise of the voltage applied to the connected input leg of comparator 350. At such time as the voltage on the last-recited input leg of comparator 350 exceeds the voltage applied to the other input leg, the comparator turns off and its normally high output signal goes to zero.

The error signal applied to terminal J, which is derived from terminal 12 in FIG. 28, changes polarity depending on whether the voltage applied to the motor is too high or too low, indicative of motor over-speed or under-speed respectively. This signal, which is resistively coupled to one input leg of comparator 350, thus either adds or subtracts from the ramp voltage applied to the same input leg. When it adds to the ramp voltage, comparator 350 turns on sooner and causes the SCR to be conductive for a longer time interval. The effective $V_M$ applied to the stator windings is thereby increased so as to raise the angular velocity of the motor. The opposite is true if the error signal subtracts from the ramp signal applied to comparator 350. In the latter case, the comparator turns off at a later point in time and the SCR is conductive for a shorter time interval. As a consequence, a smaller effective voltage is applied to the winding stages and the angular velocity of the motor decreases.

As discussed above, terminal 14 is connected to receive a signal from terminal 10 in FIG. 35. The signal so applied is indicative of excessive current in the winding stages and is added to the applied reference voltage $V_r$ to increase the "pedestal" voltage applied to comparator 350. Thus, the voltage difference between the two inputs of comparator 350 is decreased and hence the comparator turns off at a later point in time. The effect is the same as that discussed above in connection with an error signal which decreases the applied ramp voltage. Specifically, comparator 350 turns off at a later point in time and the effective $V_M$ applied to the stator windings of motor 30 is decreased. The result is to decrease motor angular velocity until the motor current falls below its pre-set maximum level.

In order to couple the output signal of comparator 350 to SCR 90 via transformer 400, the signal is first applied to a stable multivibrator 386 which provides an output signal at a frequency of 10 KHz in the preferred embodiment of the invention. The oscillator output signal is power-amplified by transistor 398 and is applied to the primary winding of transformer 400. The output signal appearing across terminals L, K then serves to turn on the SCR at the desired phase angle.

From the foregoing explanation it will be apparent that the circuit of FIG. 30 is capable of responding to changing load conditions by controlling the operation of motor 30 in accordance with pre-selected voltage and current values. Whichever of these quantities reaches its preselected limit first will be the regulated quantity. For example, if during a particular motor operation the motor current never reaches the maximum limit set for it, motor speed will follow the voltage waveshape selected from those shown in FIG. 22A. However, if the maximum motor current is exceeded while following the selected voltage waveshape, motor angular velocity will be decreased regardless of the selected waveshape until the motor current, (torque applied by the motor), falls below the maximum value. Similarly, for a selected maximum applied motor voltage, i.e. for a selected maximum angular velocity of the motor, the motor operation will follow the selected current waveshape only as long as the maximum motor voltage is not exceeded.

Figure 33:
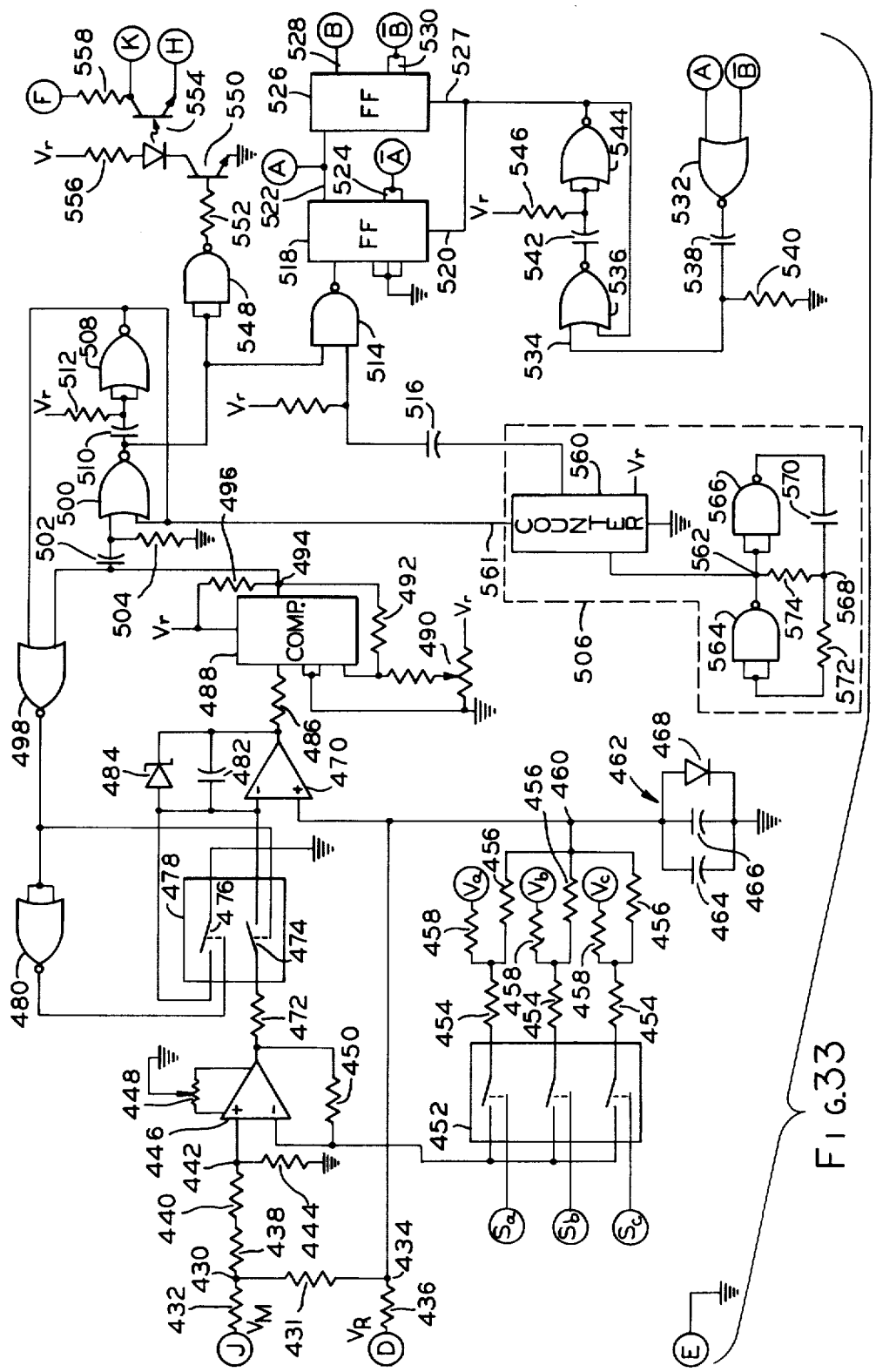
FIG. 33 illustrates a circuit for sensing the position of the rotatable motor assembly.

FIG. 33 illustrates a preferred embodiment of position sensor 120 shown in block diagram form in FIG. 24, as well as other circuitry required for electronic commutation of the motor windings. Portions of the circuit herein are similar to the commutation circuit disclosed in the aforesaid copending application Ser. No. 802,484 incorporated by reference herein. As disclosed in the latter application, the back EMF generated in successive winding stages of motor 30 is detected in each stage during the interval when that stage is not being energized, i.e. when $V_M$ is not applied thereto. In each instance the detected back EMF is processed to determine the position of the rotor relative to the stator. A simulated output signal representative of relative rotor position is generated by means of which the successive energization and deenergization of winding stages a, b and c respectively, is effected.

Voltage $V_M$ which is applied to the ECM, is provided at terminal J in FIG. 33. $V_M$ is coupled to a first junction point 430 through a resistor 432; to a second junction point 442 through a pair of series-connected resistors 438 and 440; and to ground through a resistor 444. Junction points 430 and 442 are thus at a reduced voltage level with respect to terminal J due to the action of the voltage divider constituted by the aforesaid resistors. Voltage $V_r$ is applied at terminal D and is coupled to a junction point 434 via a resistor 436 and then to junction point 430 via a resistor 431.

Junction point 442 is connected to one input leg of a differential amplifier 446 which has an adjustable resistor 448 connected thereto adapted to set the amplifier bias at a selected level. A feedback resistor 450 is connected between the output of amplifier 446 and a second input leg, the latter being further coupled to the contact points of an electronic switching device 452. Each variable contact of switching device 452 is coupled to ground by way of a pair of series-connected resistors 454 and 456, a common junction point 460 and a network 462. The latter comprises a pair of capacitors 464 and 466 and a diode 468 connected in parallel with each other between junction point 460 and ground. The connecting point between each pair of resistors 454 and 456 is further connected to a resistor 458. Back EMF's $V_a$, $V_b$ and $V_c$, generated by winding stages a, b, and c respectively, are applied to the other terminal of respective resistors 458. Each network comprising resistors 454, 456 and 458 acts as a voltage divider to scale down the levels of the back EMF's applied to the variable contacts of switching unit 452.

The application of one or more of signals $S_a$, $S_b$, $S_c$ whose derivation is discussed below, closes the appropriate contact of electronic switching unit 452 and applies the corresponding scaled-down back EMF signal to the second input leg of differential amplifier 446. As explained above, amplifier 446 further receives a scaled-down effective voltage $V_M$ on its first input leg.

The output signal from differential amplifier 446 is coupled by way of a resistor 472 to a variable contact 474 of an electronic switching device 478. Depending on the signal at the output of a NOR gate 498, contact 474 is either connected to, or disconnected from, a first input leg of an amplifier 470. A second input leg of the amplifier 470 is connected to junction points 434 and 460. The output of NOR gate 498 is coupled to the jointly connected inputs of a further NOR gate 480. The output of gate 480 controls a second variable contact 476 of switching unit 478, which is adapted to connect to, or disconnect from, ground the first input leg of amplifier 470.

A capacitor 482 and a Zener diode 484 are connected in parallel between the output of amplifier 470 and its first input leg. Thus connected, amplifier 470 operates to integrate the signal applied to its first input leg which represents the difference between the applied motor voltage $V_M$ and the back EMF. The Zener diode functions to prevent integration of a negative signal value. Integration is therefore initiated when the difference between the two voltages goes through zero in a positive direction. Zener diode 484 also functions to determine the voltage at which capacitor 482 is reset, i.e. charged, prior to the start of the integration process.

The output of amplifier 470 is coupled to a first input of a comparator 488 by way of a resistor 486. A pair of further inputs of comparator 488 is tied to ground, while a fourth input taps a portion of voltage $V_r$ which is applied across a variable potentiometer 490. Voltage $V_r$ is coupled directly to a further input of comparator 488. The output 494 of comparator 488 is coupled to one input leg of the aforesaid NOR gate 498, to potentiometer 490 by way of a resistor 492, and to voltage $V_r$ by way of a resistor 496.

The integrated signal from amplifier 470 is compared at the comparator input against the voltage tapped off from potentiometer 490, which may be selectively varied. When the signal applied from amplifier 470 reaches a reference level corresponding to a predetermined number of volt-seconds, comparator 488 produces a high level logic signal at output 494. Whenever the integrated voltage signal falls below the aforesaid reference level, comparator 488 produces a low level output signal, as determined by the setting of potentiometer 490.

As stated above, the reference level at which comparator 488 provides a high level output signal corresponds to a predetermined number of volt seconds and hence it indicates that a predetermined rotor position relative to the stator windings of motor 30 has been reached. These high level output pulses are used to commutate the winding stages of the motor in the preferred embodiment of the invention under discussion. The point in time at which the high level output pulses occur is adjustable by means of potentiometer 490 and is selected to provide an advanced timing angle, i.e. a predetermined amount of commutation advancement. As discussed in greater detail in the aforesaid copending application Ser. No. 802,484, zero advancement is said to exist when a winding stage is turned on at the point where the magnetic center of the rotor-established polar region is a predetermined number of electrical degrees from alignment with an axis of a magnetic pole established by energizing the winding stage and when it is moving toward the latter. In the example under consideration, this angle is 150 electrical degrees. Switching the winding stage before the zero advance position is reached, provides advancement of commutation and allows the current built up in the winding stage to achieve the maximum possible torque throughout the time interval during which the winding stage is energized. In the present invention this is accomplished by the setting of potentiometer 490.

Comparator output 494 is further coupled to a one-shot multivibrator by way of a series-connected capacitor 502 and a resistor 504 connected between capacitor 502 and ground. The one-shot comprises a NOR gate 500 which has one input leg connected to the junction point of elements 502 and 504. The other input leg of gate 500 is connected to a counter circuit 506 as well as to the output of a further NOR gate 508. The one shot further includes a capacitor 510 connected in series between the output of NOR gate 500 and the commonly connected input of NOR gate 508. Voltage $V_r$ is coupled to the input of gate 508 by way of a resistor 512. The output of gate 508 is further connected to a second input leg of NOR gate 498.

The signal from the output of NOR gate 500 is coupled to a first input leg of a NAND gate 514. A further input of the latter gate receives a signal from the output of a counter circuit 506, by way of a capacitor 516. The aforesaid voltage $V_r$ resistively coupled to the last-recited gate leg. The output of gate 514 is applied to a first input of a flip flop circuit 518. A second input leg of this flip flop is designated by the reference numeral 520. A first output leg 522 of flip flop 518 is coupled to an output terminal at which the flip flop output signal A is provided. Logically inverted signal $\overline{A}$ is provided at a second flip flop output leg designated 524. The aforesaid first output is further connected to a first input leg of another flip flop 526. A second input leg 527 is connected in common with input leg 520 of flip flop 518. Signals B and $\overline{B}$ are provided at a pair of outputs of flip flop 526, designated 528 and 530 respectively.

Signals A and $\overline{B}$ are applied to the respective inputs of a NOR gate 532 which is connected to another one shot multivibrator comprising NOR gates 536 and 544. The output of gate 532 is connected to one input leg of gate 536 by way of a series-connected capacitor 538 and a resistor 540 connected between the aforesaid input leg and ground. Another input of NOR gate 536 is coupled to the output of NOR gate 544. The commonly connected inputs of gate 544 are coupled to the output of gate 536 by way of a capacitor 542. Voltage $V_r$ is coupled to the inputs of gate 544 by way of a resistor 546. The output of gate 544 is further connected to flip flop inputs 520 and 527.

The output of NOR gate 500 which provides a signal representative of rotor position is connected to the commonly connected inputs of a NAND gate 548. The output of gate 548 is connected to the base of a transistor 550 by way of a resistor 552. The emitter of transistor 550 is grounded and its collector is connected to an optical coupler 554 which receives the aforesaid reference voltage $V_r$ by way of resistor 556. One output terminal of optical coupler 554 is directly connected to terminal K and, by way of a resistor 558, to terminal F. The other coupler output terminal is connected to terminal H. Thus, the signal which indicates that the rotatable assembly is in commutation position and hence ready to commutate, is coupled back to the microcomputer through terminals K and H.

A counter circuit 506 comprises a counter 560 which has an output connected to capacitor 516 and a reset input connected to the output of NOR gate 508. Counter 560 also receives voltage $V_r$ at an input thereof, while a further input is connected to a junction point 562 which joins the output of a first NAND gate 564 to the commonly connected inputs of a second NAND gate 566. The output of the latter gate is connected to a further junction point 568 by way of a capacitor 570. Junction point 568 is connected to the commonly connected inputs of NAND gate 564 by way of a resistor 572. A resistor 574 connects junction points 562 and 568.

In operation, when the high logic level output signal of comparator 488 is applied to the one shot multivibrator comprising NOR gates 500, 508 and RC combination 510, 512, a signal is produced at the output of gate 500 which is applied to subsequently connected circuitry for the purpose of commutating the winding stages. Further, the corresponding logically inverted output signal of gate 508 is applied an input leg of NOR gate 498 to produce a signal that changes the setting of variable contact 474 in switching unit 478. The last-recited signal also causes the resultant output signal of gate 480 to change the setting of variable contact 476. At the new switch settings, the integrator constituted by amplifier 470 and the parallel connection of capacitor 482 and Zener diode 484, is reset by charging capacitor 482. The new setting of switches 474 and 476 is further effective to lock out the signal derived at the output of amplifier 446 and prevent it from being integrated during commutation.

The signal derived from the one-shot mutivibrator, whether taken at the output of gate 500 or taken in logically inverted form at the output of gate 508, is representative of a predetermined position of the rotatable assembly. In addition to the described functions of this signal, i.e. to reset integrator capacitor 482 and to lock out the signal from unit 446 during commutation, the signal also performs the functions of selecting the next winding stage to be energized; initiating the deenergization of the presently energized winding stage; and the selection of a subsequent unenergized winding stage for the purpose of detecting its back EMF. These selection functions are accomplished through the flip flop arrangement provided by units 518 and 526 and their associated one-shot multivibrators. The flip flop provide the aforesaid signals A, $\overline{A}$, B AND $\overline{B}$ which, before carrying out the selection process, are further decoded as described below in connection with the discussion of FIG. 34.

Under ordinary conditions, flip flops 518 and 526 acts as a counter together with the associated one shot comprising NOR gates 536 and 544 and with NOR gate 532. This counter counts to 3 in response to signals derived at the output of gate 514 and then resets to 0. The resetting action is initiated by NOR gate 532.

As previously explained, commutation occurs by way of the commutation transistors 84, 86 and 88 which are connected to winding stages a, b and c respectively. See FIGS. 25 and 38. The back EMF is used to sense rotor position, as explained above in connection with FIG. 33, in order to energize the windings in sequence. This is carried out by means of signals $S_a$, $S_b$ and $S_c$ which are developed when the rotatable assembly is turning, as explained in connection with the discussion of FIG. 34 below. However, when the motor is at a standstill, e.g. upon start up, no back EMF is generated. Depending on the position of the rotatable assembly at standstill, three possibilities exist with respect to the selection of the next winding stage to be energized or, more precisely, with respect to turning on the connected commutation transistor. These are as follows:

(1) The correct winding stage was selected, i.e. the winding stage which would be next energized if the rotor were turning in the selected direction;

(2) The wrong winding stage was selected, i.e. the winding stage which will cause the rotor to turn in the reverse direction from that selected; or (3) A winding stage was selected which, because of the rotor position, provides no torque and hence the rotor fails to turn.

Situation (1) above presents no problem. In large measure this is likewise true for situation (2) because of the fact that some EMF—albeit the incorrect signal—is generated and serves as a reference signal. Thus, the motor will start up in the wrong direction, but will reverse almost immediately.

Circuit 506 provides a timing function which permits the motor to start even if situation (3) obtains. Specifically, if a high level signal is not applied to NOR gate 500 from output 494, the output signal of gate 500, which is applied to a first input of gate 514, will be ONE. Accordingly, a ZERO signal must be applied to the other input of gate 514 in order to obtain the requisite ONE signal at its output so that the aforesaid resetting action can be initiated. This is accomplished by applying the output signal of NOR gate 508 to the reset input 561 of counter 560. If a ZERO signal is applied from NOR gate 500 to the input of NOR gate 508, it will result in the application of a ONE signal to input 561 of counter 560. This signal initiates the counting sequence of counter 560 at a rate determined by the frequency of the oscillator constituted by NAND gates 564 and 566 and their associated circuitry. When a predetermined count is reached, a ZERO output signal is applied by way of capacitor 516 to the other input of NAND gate 514. The resultant ONE signal at the output of the latter gate then initiates the counting sequence of flip flops 518 and 526. This has the effect of applying the motor voltage $V_M$ to the next winding stage in the sequence and rotation of the rotatable assembly is initiated. During normal commutation, counter 560 is reset upon each commutation, but before a predetermined count has been reached. The predetermined count is representative of the maximum amount of time permitted between commutations. Under normal operating conditions this count, which indicates a stalled condition, is never reached. Therefore, counter circuit 506 comes into play only when a stalled condition exists and otherwise has no effect on the operation of the control circuit.

Signals $S_a$, $S_b$ and $S_c$, which are applied to electronic switching unit 452 in FIG. 33, are developed from output signals A, $\overline{A}$, B and $\overline{B}$ generated by the circuit illustrated in FIG. 33. The logic circuit for providing signals $S_a$, $S_b$ and $S_c$, for both the forward and the reverse rotation of the rotor, is shown in FIG. 34. The microcomputer is coupled to an optical coupler 580 by way of terminals F, S, a resistor 582 being connected between terminal S and the coupler. Reference voltage $V_r$ is applied to the output of the optical coupler by way of a resistor 584, while the other output terminal is grounded.

The output of optical coupler 580 provides a Forward/Reverse signal in response to a computer command received at terminals S, F. The computer command in turn is responsive to the setting of switch 178, as discussed in connection with FIG. 21. The Forward/Reverse signal is coupled to the forward section of a decoder where it is applied to one input leg of each of NAND gates 586, 588 and 590 respectively. The term "forward section" refers to a circuit portion concerned exclusively with the forward rotation of the rotor. Gate 586 further receives the aforesaid signals A and B on separate input legs thereof; gate 588 receives the signals $\overline{A}$, $\overline{B}$; and gate 590 receives the signal A, $\overline{B}$.

The output of optical coupler 580 is connected to the commonly connected inputs of a NAND gate 592. The output of gate 592, which constitutes the "Reverse" signal, is connected to one input leg of each of a set of NAND gates 594, 596 and 598 respectively, which form the reverse section of the decoder. NAND gate 594 further receives signals A, $\overline{B}$ at its inputs; gate 596 receives signals A, B; and gate 598 receives signals $\overline{A}$, $\overline{B}$. The outputs of gates 590 and 594 are applied to a NAND gate 600 which provides signal $S_a$ at its output. Gates 588 and 596 are connected to the inputs of NAND gate 602 which provides the signal $S_b$ at its output. Gates 586 and 598 are connected to the inputs of a NAND gate 604 which provides the signal $S_c$ at its output.

In operation, the signal applied from the microcomputer to terminals S, F actuates either the forward or the reverse section of the decoder. The signals A, B, $\overline{A}$ and $\overline{B}$, which are successively generated in the same sequence at the output of the circuit of FIG. 33, are applied to the inputs of gates 586, 588, 590, 594, 596 and 598. Depending on whether the forward or the reverse section of the decoder is active, the decoder output signals will either be generated in the sequence $S_a$, $S_b$, $S_c$, or in the sequence $S_a$, $S_c$, $S_b$. As previously explained, these signals are then applied to the individual switches of electronic switching unit 452 in FIG. 33 which functions to apply the back EMF's of the connected winding stages to differential amplifier 446.

FIG. 35 illustrates a preferred decoding circuit for controlling the energization and deenergization respectively, of the winding stages. Here again, a section of the logic circuitry shown is devoted to decoding for forward rotation of the rotatable assembly and a separate section is devoted to reverse rotation. The Forward signal, derived at the output of optical coupler 580 in FIG. 34, is applied to one input leg of each of NAND gates 606, 608 and 610 respectively. Similarly, the Reverse signal derived at the output of gate 592 in FIG. 34, is applied to an input leg of each of NAND gates 612, 614 and 616 respectively. Signals $S_a$, $S_c$ and $S_b$, which are developed as discussed above in connection with the circuit of FIG. 34, are applied to the inputs of gates 606, 608 and 610 respectively. Gates 612, 614 and 616 receive signals $S_c$, $S_a$ and $S_b$ respectively, at their inputs.

A NAND gate 618 is connected to the outputs of gates 610 and 612 and provides an output signal to a further NAND gate 624. A NAND gate 620 is connected to the outputs of gates 608 and 614 and has its own output coupled to one input of a NAND gate 626. A NAND gate 622 is connected to the outputs of gates 606 and 616 and has its own output connected to one input of a NAND gate 628. Each of gates 624, 626 and 628 further receives a pair of inputs from the output of a NAND gate 630 and from the output of an optical coupler 632. The latter output is further connected to receive voltage $V_r$ by way of a resistor 634. The input of coupler 632 is connected to terminal S by way of a resistor 636 and directly to terminal M to receive ON/-OFF instructions of switch 160, as explained in connection with FIG. 21.

Voltage $V_r$ is applied directly to a number of inputs of the earlier mentioned one-shot multivibrator 424 and to other input terminals of unit 424 by way of resistors 638 and 640 respectively. Resistors 638 and 640 are further connected to capacitors 642 and 648 respectively, each of which is coupled to its own input terminal on unit 424.

As previously explained in connection with FIG. 31, one-shot 424 is activated from terminal N when the motor current exceeds the maximum value set by the microcomputer. Further, as explained above, the output 650 of unit 424 is connected to terminal 10. The latter terminal is further coupled to terminal 14 in FIG. 30 which is connected to the ramp and pedestal circuit illustrated there. Output 650 is also coupled to the commonly connected inputs of NAND gat 630.

The outputs of NAND gates 624, 626 and 628 are coupled to the bases of corresponding driver transistors 652, 654 and 656 respectively, by way of resistors 658, 660 and 662 respectively. The emitters of the latter transistors are connected in common to terminal P. The collectors of transistors 624, 626 and 628 are connected to terminals R, U and X respectively, by way of resistors 654, 666 and 668. As will be explained in greater detail below in connection with the discussion of FIG. 38, the signals applied to terminals R, U and X are effective to control the switching of the commutation transistors which are connected in series with the winding stages of the motor.

In operation, when the motor current exceeds the maximum value set by the microcomputer, as dicussed in connection with FIG. 31, the signal applied to terminal N causes one-shot 424 to apply an output pulse to the input of NAND gate 630. The resultant output signal from gate 630 is NANDED by gates 624, 626 and 628 with the decoded position signals and with the ON/OFF instruction signal from the microcomputer. The resultant output signals from these gates are applied in sequence to driver transistors 652, 654 and 656 and render the latter conductive for the duration of the multivibrator pulse. This action serves to apply corresponding signals to terminals R, U and X adapted to activate the commutation transistors.

Figure 38:
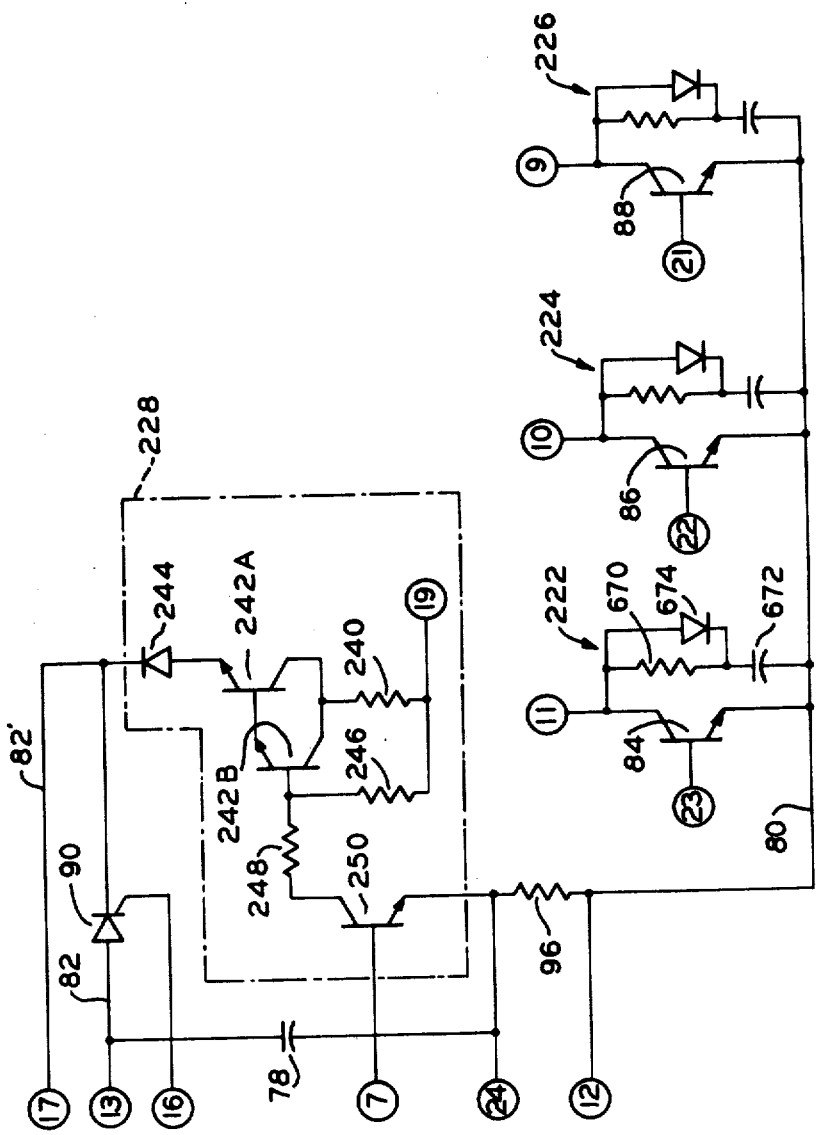
FIG. 38 illustrates a motor power control circuit.

FIG. 38 illustrates a preferred implementation of the power control circuit for motor 30 for use with the circuits of FIGS. 26–37 discussed above. Terminal 13 receives the full wave rectified line voltage from the output of diode bridge 70, which is further applied to SCR 90. The control voltage is applied to the SCR by way of terminal 16 and is derived from one of terminals L or K in FIG. 30. The output of the SCR is applied to terminal 17, as well as to energy dissipation circuit 228. The latter circuit is physically located on several circuit boards in the preferred embodiment of the invention and therefore appears only in part in FIG. 38. Its function, discussed in connection with FIG. 25, remains the same.

When SCR 90 is closed, the full wave rectified line signal applied to terminal 13 is coupled to a high gain amplifier by way of a diode 244. The high gain amplifier comprises a first transistor 242A connected in series with diode 244, and a second transistor 242B having its emitter connected to the base of transistor 242A. The collectors of both transistors are connected in common to a terminal 19. Terminal 19 is connected to terminal S in FIG. 39 and thus, through common line 236, to diodes 230, 232 and 234. Energy dissipation circuit 228 is completed by capacitors 238A and 238B, which are connected in parallel between line 236 and terminal U. The latter terminal is coupled to terminal 17 in FIG. 38. A resistor 246 is connected between the base of transistor 242B and line 236. The aforesaid transistor base is further connected to the collector of a transistor 250 by way of a resistor 248. The base of transistor 250 is connected to terminal 7 which is coupled to terminal C in FIG. 30. The emitter of transistor 250 is connected to line 80, in series with the aforesaid current shunt 96. The voltage developed across resistor 96 appears across output terminals 24 and 12, which are further coupled to terminals X and Y in FIG. 31.

Capacitor 78, which serves to filter the voltage at the output of SCR 90 in FIG. 25, is seen to be connected between terminals 13 and 24 and it provides an essentially ripple-free effective voltage $V_M$ to the winding stages.

Terminals 11, 10 and 9 are connected to the collectors of commutation transistors 84, 86 and 88 respectively. Terminals 23, 22 and 21, which are coupled to the bases of these transistors, are further connected to terminals R, U and X respectively, in FIG. 35. Hence, the action of power transistors 652, 654, 656 in FIG. 35 controls the action of the corresponding commutation transistors 85, 86 and 88 respectively, whose emitters are connected in common to line 80.

As explained in connection with the discussion of FIG. 25, snubbing circuits 222, 224 and 226 are provided to suppress transients. In a preferred embodiment of the invention, each snubbing circuit comprises a parallel combination of a resistor 670 and a diode 674, connected in series with a capacitor 672 between the collector of the corresponding transistor line 80. For the sake of simplicity, the components of snubbing circuit 222 only have been detailed in the drawings, it being understood that snubbing circuits 224 and 226 are substantially identical to circuit 22.

To place the circuit shown in FIG. 38 in its proper context, it will be understood that terminals 11, 10 and 9 are coupled to terminals L, N and R respectively in FIG. 39. Further, terminal 11 is connected to switch 128a shown in FIG. 25, which connects to winding stage a. Similarly, terminal 10 is connected to switch 128b which is further connected to winding stage b. Terminal 9 is connected to switch 128c, the latter being further connected to winding stage c.

As previously explained in connection with the discussion of FIG. 24, unit 132 receive cycle instructions and communicates with decoder 124; with D/A converter and error amplifier 142; and with the controls of the laundry machine. In carrying out these tasks, unit 132 acts essentially in the capacity of a function generator and timer. In the preferred embodiment of the invention these functions are performed by a microcomputer of the type shown in Appendix B. Other commercially available computers capable of carrying out these functions may be substituted.

When acting in the capacity of a function generator, the microcomputer can select a variety of different waveshapes, such as shown in FIG. 22A, or others that may be stored in memory in digital form. By way of example, Appendix C is a printout in hexedecimal form of the information actually stored in the ROM of the aforesaid microcomputer in a preferred embodiment of the invention. This information is called up by making use of the sampling technique described hereinabove. The values called up from memory jointly represent the selected waveshape from among those shown in FIG. 22A.

The timing function performed by the computer clocks the wash and spin cycle. Various other timed operations of the laundry machine are performed under microcomputer timing control, such as the number of rinsings to be used, the tub filling cycle, etc., which are, however, beyond the scope of the invention herein. The microcomputer receives commands in the form of cycle instructions. These cycle instructions are effective to select a particular speed and torque waveshape, to select the maximum values of applied voltage and current respectively, to select the rate of the agitator stroke, etc.

To illustrate the operation of the apparatus disclosed herein for the wash and the spin cycle respectively, two examples are given. For a better understanding, reference should be made to the control panel and the waveshapes illustrated in FIGS. 21 and 22 respectively, and to Tables D and E above.

Wash Cycle

Let it be asumed that during the wash cycle the agitator is to follow the speed profile given by waveshape code O in FIG. 22A, i.e. a sinusoidal waveform. Further, the maximum applied voltage is to be 90 V, equivalent to amplitude code 5 in Table D above. Maximum torque is to correspond to amplitude code 3 in Table E, i.e. maximum current is to be 5 amps. Finally, the agitator is to have the same speed profile in the forward and reverse directions, as well as the same forward and reverse rate.

For the assumed conditions the operation will perform the following steps:
A. Set switch 160 to "OFF."
B. Set switch 162 to "ON."
C. Press switch 184 to reset the microcomputer.
D. Load "reverse" instructions for voltage (speed) using the following sub-steps:
  (1) Set switch 178 to "Reverse."
  (2) Set switch 166 to "V LOAD."
  (3) Set switch 170 to "5."
  (4) Set switch 168 to "0."
  (5) Set switch 172 to "RF=RR."
  (6) Press switch 182 to load information set under D(1)-D(5) into the computer.
E. Load "Forward" instructions for voltage (speed) as follows:
  (1) Set switch 178 to "Forward."
  (2)-(6) Repeat steps D(2)-(6).
F. Load "Reverse" instructions for current (torque) using the following sub-steps:
  (1) Set switch 178 to "Reverse."
  (2) Set switch 166 to "I LOAD."
  (3) Set switch 170 to "3."
  (4) Set switch 168 to "5."
  (5) Set switch 172 to "RF=RR."
  (6) Press switch 182 to load information set under F(1)-F(5).
G. Load "Forward" instructions for current (torque) as follows:
  (1) Set switch 178 to "Forward."
  (2)-(6) Repeat steps F(2)-F(6).
H. Set Potentiometer switch 174 to desired rate. (Vary setting of switch 174 as desired during operation.)
J. Set switch 180 to "÷1."
K. Set switch 162 to "OFF."
L. Set switch 160 to "ON."

Spin Cycle

Let it be assumed that the maximum ramp speed is to correspond to a maximum voltage of 120 V. The maximum torque is to correspond to a current limit of 10 amps. The ramp rate is to be 1/10 of normal.

For the assumed conditions, the operation will perform the following steps:
A. Set switch 160 to "OFF."
B. Set switch 162 to "ON."
C. Press switch 184 to reset microcomputer.
D. Load "Forward" instructions for voltage (speed) as follows:
  (1) Set switch 178 to "Forward."
  (2) Set switch 166 to "V LOAD."
  (3) Set switch 170 to "7."
  (4) Set switch 168 to "7."
  (5) Set switch 172 to "RF=RR."
  (6) Press switch 182 to load D(1)-(5).
E. Load "Forward" instructions for current (torque):
  (1) Set switch 178 to "Forward."
  (2) Set switch 166 to "I LOAD."
  (3) Set switch 170 to "7."
  (4) Set switch 168 to "6."
  (5) Set switch 172 to "RF=RR."
  (6) Press switch 182 to load E(1)-E(5).
F. Set potentiometer switch 174 to desired rate.
G. Set switch 180 to "÷10."
H. Set switch 178 to "Forward."
J. Set switch 162 to "OFF."
K. Set switch 160 to "ON."
L. To brake the spin, set switch 162 to "OFF."

As previously explained, in a washing machine of the type employed for home use, certain parameters of the foregoing operating parameters will not be individually selected, but rather automatically, e.g. in accordance with the type of fabric to be washed, the size of the wash load, or the like all as selected by the user. Thus, for a particular type of fabric, a certain agitator speed may be appropriate, possibly one which is different for the forward and reverse directions. In any event, a pre-selected voltage profile will be stored in memory for such a fabric. Likewise, for the same fabric a certain torque profile may be desired. Here again, a particular pre-selected current profile will be stored in memory. The user of the machine however, will select primarily by fabric and wash load, although he may have the option of overriding the preselected profile in order to tailor machine performance more closely to actual needs.

Figure 40A:
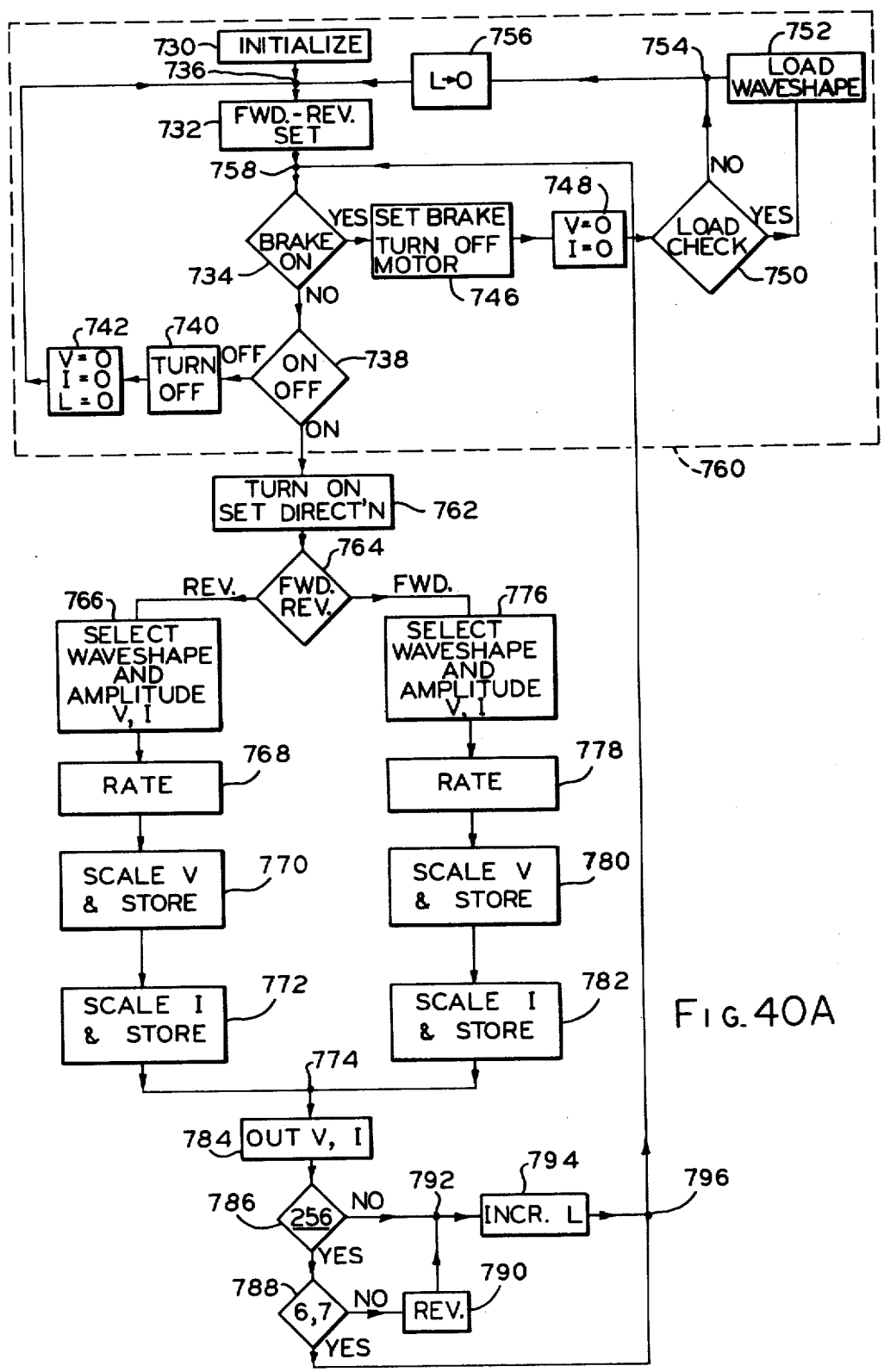
FIG. 40A illustrates in flow chart form a preferred mode of operation of a microcomputer that may be used in the present invention.

The operation of the programmed microcomputer, which is used in the preferred embodiment of the invention in lieu of a timer and function generator, is illustrated by the flow chart of FIG. 40A. Appendix D reproduces the applicable computer program in machine language.

With reference to FIG. 40A, it will be understood that the various steps shown there and discussed below, result from the action taken by the operator of the laundry machine, as described above in conjunction with FIGS. 21 and 22. Accordingly, reference is made below to the pertinent drawing Figures. It will be further understood that the particular microcomputer used with the preferred embodiment of the invention will have various registers, as well as memory capacity, for the temporary and permanent storage of data, all as shown in Appendix B. For example, the various waveshapes shown in FIG. 22A may be permanently stored in memory, as shown in Appendix C in hexadecimal form. Among other functions performed is the task of keeping track of the number of points, (out of a total of 256), that have been sampled on the selected waveform. See FIG. 22B. A storage register of the microcomputer, hereinafter referred to as the L register, is used for this operation.

In initializing the microcomputer, all registers and memories, except those that contain data in permanent storage, are reset to 0. This command may be issued by the microcomputer in response to the actuation of reset switch 184, or it may occur in response to other events beyond the scope of this discussion. The initializing command is represented by block 730, which is seen to be connected to block 732 by way of a nodal point 736. If switch 178 was set to a particular position, i.e. Reverse of Forward, a bit is set in the microcomputer upon initialization, as shown by block 732. The bit so set is representative of the selected direction of rotation.

Once the aforesaid bit is set, a check is made by the microcomputer to determine whether or not the brake switch 162 was set to "ON." This action is illustrated by decision block 734. If switch 162 was set, the microcomputer provides instructions for setting the brake and for turning off the motor, all as indicated by block 746. As further shown by block 748, the computer then instructs the regulator to regulate to 0 voltage and 0 current, indicative of a stand still condition. A load check is made, as shown by decision block 750, to determine whether or not load button 182 was pressed. If not, the aforesaid L register is reset to 0 by the microcomputer, as indicated by the path from block 750 to block 756, via nodal point 754. Block 756 is connected back to nodal point 736, indicative of the fact that the routing can now be repeated. If the load button was in fact pressed, block 752 indicates that the computer instructs the circuit to load the waveshape which was previously selected by means of switches 170 and 168, into the computer memory. Here too the L register must be reset to 0, as indicated by the path from block 752, via block 756, to nodal point 736.

Before the operation can begin, a further check must be made concerning the status of switch 160. Specifically, if the brake was found to be off, decision block 738 determines the status of switch 160. If the switch was turned to the "OFF" position, the microcomputer issues instructions to turn the motor off, as indicated by block 740. Further, the regulator is instructed by the microcompressor to regulate to 0 voltage and 0 current and the L register is reset to 0, all as shown by block 742. Block 742 is seen to be connected to nodal point 736, indicative of the fact that the routine can now be repeated.

It will be understood that the check concerning the status of switches 162 and 160 may be interchanged in time. However, the arrangement shown in FIG. 39A was selected as being the more convenient one to implement.

If during the next iteration of the routing switch 160 was turned on, as indicated by the appropriate output of decision block 738, the microcomputer issues instructions for the motor to be turned on and for setting its direction of rotation. The latter actions are indicated by block 762. At this point, decision block 764 checks to determine the direction that was set for the rotor. This decision is made on the basis of the bit previously set, as explained in connection with block 732. Assuming the reverse direction of rotor rotation was set, block 766 indicates the presence of a microprocessor instruction to implement the selection of the waveshape for either voltage or current, (depending on the setting of switch 166), in accordance with the previous operator setting of thumb wheel switch 168. Specifically, the appropriate information is now called up from the stored look-up table shown in Appendix C. Simultaneously, the microcomputer issues instructions concerning the maximum amplitudes of the motor voltage and current selected by means of switch 170.

The reverse rate set by potentiometer switch 176 is now called up under microcomputer instruction, together with the scale determined by the setting of switch 180, with respect to the motor voltage and motor current respectively. These actions are indicated by blocks 768, 770 and 772. The values so called up are temporarioy stored. Similarly, if the forward direction was selected, the waveshape determined by the setting of switch 168 is called up from computer storage, together with the selected maximum amplitudes set by switch 170, the forward rate set by potentiometer switch 174 and the scale applied for both the voltage and the current by switch 180. These actions are indicted by blocks 776, 778, 780 and 782 respectively. Again, the data regarding scaling is temporarily stored.

Nodal point 774 indicates that the procedure is henceforth the same, regardless of the selected direction of rotaion. Block 784 shows that the stored, scaled voltage and current quantities are now sent out to the D/A converters, as explained previously in this specification. Thereafter a check is made in accordance with block 786, to determine whether or not the final sampling point on the selected waveshape has been reached. In the preferred embodiment herein, this is the 256th point. If the answer is "no" the L register is incremented by One, as indicated by block 794. As shown, block 794 is positioned between a pair of nodal points 792, 796. A return path extends from the latter point back to point 758. This return path indicates an iterative routine. Specifically, each time the L register is incremented a check is made of the microcomputer response to the status of brake switch 162 and of ON/OFF switch 160, to determine whether or not such status remains the same.

The process continues until the last point on the selected waveform has been sampled. At that time, as shown by decision block 788, the microcomputer determines whether or not the waveshape is one indicated by waveshape codes 6 or 7, or both of which call for a non-reversing action of the agitator. See FIG. 22A. If the latter waveshapes were not selected, a microprocessor instruction is issued to apply a "Reverse" signal to the motor, as shown by block 790. The latter block is seen to be connected to nodal point 792 and thus to block 794. This path position indicates that the final point on the selected waveform was reached and the selected waveform was not one indicated by codes 6 or 7. Thus, the waveform calls for agitator oscillation and the direction of the motor is reversed. Incrementing of the L register at this time causes it to overflow and reset automatically to zero. A check is again made regarding the status of switches 160 and 162.

If the 256th point on the waveform was reached and code 6 or 7 was selected, the L register is not incremented. Since codes 6 and 7 apply only to the spin cycle, the action continues in accordance with the spin duration interval, which is set by a separate timing mechanism. However, as shown by schematic connection of decision block 788 to nodal point 796 and thence to nodal point 758, a check of the status of the brake switch and of the ON/OFF switch is made at this time.

As will be apparent to those skilled in the art, the method of operating the microcomputer is not limited to that shown by the flow chart illustrated in FIG. 40A and that it may be performed and implemented in a number of different ways consistent with the principles of the present invention. Any such variations will of course be reflected in corresponding changes of the machine language program of Appendix D.

As previously explained, for ordinary household use laundering apparatus built in accordance with the present invention may contain fabric and wash load panel selection switches in place of the switches shown in FIG. 21. For each fabric/wash load combination, there will exist a pre-programmed wash cycle and a pre-programmed spin cycle, possibly with the option to override and set independently. Thus, the operation indicated in block 760, outlined in broken lines in FIG. 40A, may be replaced by that contained in the like-numbered block of FIG. 40B.

As indicated by block 800, initially a selection is made of the fabric to be washed and of the wash load. The microcomputer responds to the selection by an inquiry regarding the status of switches 162 and 160, as indicated by blocks 734 and 738 in FIG. 40B. This is similar to the action shown in FIG. 40A. If the brake was off and the ON/OFF switch is turned on, a particular wash and spin routine is selected from microcomputer storage. This is shown by block 804. If the brake was on and/or the switch was on, other action beyond the scope of the discussion herein may be taken by the laundry machine, e.g. a suitable display may be provided on a display panel.

From the foregoing, it is apparent that a novel system for controlling the energization of an electronically commutated motor has been provided meeting the objects and advantageous features discussed hereinabove, as well as others, and that changes as to the precise configurations, details and connections of components utilized in such system may be made by those having ordinary skill in the art without departing from the spirit of the invention or the scope thereof as set out in the claims which follow.

APPENDIX A

Terminal Connections Applicable to Figs. 26-39

Figs. 26, 27

| | | |
|---|---|---|
| 1 | A | |
| 2 | B | |
| 3 | C | |
| 4 | D | |
| 5 | E | |
| 6 | F | |
| 7 | H | To computer (rate 1) |
| 8 | J | To B5-R |
| 9 | K | To ÷10 switch |
| 10 | L | 115V AC hi to 8K to 9F,4 to 9V |
| 11 | M | |
| 12 | N | 115V AC low to 8M to 9J K |
| 13 | P | |
| 14 | R | -5V To 6ll to 9Z |
| 15 | S | +5V To 4B to 6F to 7S to 9X |
| 16 | T | |
| 17 | U | |
| 18 | V | |
| 19 | W | |
| 20 | X | |
| 21 | Y | |
| 22 | Z | |

Figs. 28, 29

| | |
|---|---|
| A | |
| B | to B3-S to 6F to 7S to 9Y |
| C | |
| D | To B -U to 5D to 6D to 7D to 8U |
| E | To B8-E to 9T to 7P |
| F | To 5E to 6E to 7E to 8T to 9C,D to 9M |
| H | to H.S.-24 to 5X |
| J | |
| K | |
| L | |
| M | |
| N | To computer (V) |
| P | |
| R | |

S

T
U
V
W
X

Y
Z

} To computer (T)

Figs. 28, 29

| | |
|---|---|
| 1 | 1 |
| 2 | 2 |
| 3 | 3 |
| 4 | 4 |
| 5 | 5 |
| 6 | 6 |
| 7 | 7 |
| 8  To 5K to 5000 mfd. cap. | 7 |
| 9  To B9-U to motor common to B6-J t | 9 |
| 10 | 10 |
| | 11    −5V |
| 11 To B5−  to V out | 12 |
| 12 To B5-J | 13 |
| 13 To B5-W | 14    To B5 |
| 14 | |
| 15 | |
| 16 | |
| 17 | |
| 18 | |
| 19 | |
| 20 | |
| 21 | |
| 22 | |

| | |
|---|---|
| 11 | −5V |
| 12 | |
| 13 | |
| 14 | To B7-10 |
| 15 | |
| 16 | |
| 17 | |
| 18 | |
| 19 | |
| 20 | |
| 21 | |
| 22 | |
| | |
| A | |
| B | |
| C | To H.S.-7 |
| D | To B8-U 6D, 7P separate lead |
| E | To B8-T 4E, 7E, 6E, 9GB, 9M, H.S.-24, 5X |
| F | To 8-P |
| H | To B8 R&V |
| J | To B4-12 |
| K | To relay H.S.-17 to B6-J to B4-9 to motor com to 5000 mfd to B9-U |
| L | To H.S.-16 |
| M | +5V |
| N | |
| P | |
| R | To B3-J |
| S | To 500K pot. |
| T | To 500K pot. |
| U | |
| V | To B7-N |
| W | To B4-13 |
| X | To H.S.-24, 9U, 9C-B, 4E, 5E, 6E, 7E |
| Y | To H.S.-12 |
| Z | |

Fig. 33

| | |
|---|---|
| A | |
| B | |
| C | |
| D | To B8-U to B5-D to B4-D, 7D, 9T, 7P |
| E | To B8-T to 7E, 5E, 4E, 9B-C9, H.S.-24, 5M |

| | |
|---|---|
| F | To B3-5 to +5V to B4-B, 7Y |
| H | To B3-R to -5V 9Z |
| J | To H.S.-17 to 5000 mfd cap to motor com to B4-9 to B5-K to B9-U |
| K | speed output |
| L | |
| M | To motor winding A to B9-L to relay |
| N | |
| P | To motor winding B to B9-N to relay |
| R | To B7-K |
| S | To B7-J |
| T | To motor winding B to B9-R to relay |
| U | To B7-A |
| V | To B7-F |
| W | To B7-B |
| X | |
| Y | To B7-H |
| Z | |

Figs. 34, 35

| | |
|---|---|
| A | B6-U |
| B | B6-W |
| C | To computer (F-R) |
| D | To B8-U, 6D, 5D4, 4D5, 9T, 7P |
| E | To B8-T, B6E, 5E, 4E, 9B-C, 9M, H.S.-24, 5X |
| F | To B6-V |
| H | To B6-Y |
| J | To B6-S |
| K | To B6-R |
| L | To B6-Z |
| M | To computer (on-off) |
| N | To B5-V |
| P | To B8-U separate lead 9T, 4D, 5D, 6D, 7D, 8U |
| R | To H.S.-23 |
| S | 9Y, 3S, 4B, 6F |
| T | |
| U | To H.S.-22 |
| V | |
| W | |
| X | To H.S.-21 |
| Y | |
| Z | |

```
 1
 2
 3
 4
 5

6
 7
 8
 9
10        To B5-14

11
12
13
14
15

16
17
18
19
20

21
22
```

Fig. 36

```
A
B
C
D
E

F
H
J
K        115V AC hi 9FH, 9V, 3L
L

M        115V AC lo 9J-K, 3N
N
P        To B5-F
R        To B5-H
S

T        -10V to Boards 9B-C, 9M,7E, 6E, 5E, 4E, H.S.-24, 5X
U        +10V to Boards 9T, 7D, 6D, 5D, 4D, 7D separate lead
V
W
X

Y
Z
```

Figs. 37, 39

| | |
|---|---|
| A | To H.S.-24 to B8-T to BX-E, 4E, 5E, 6E, 7E-9M, 5X |
| B | |
| C | |
| D | To H.S.-13 |
| E | |
| | |
| F | 115V AC hi to B9-V, 3L |
| H | |
| J | 115V AC low 3N, 8M |
| K | |
| L | To motor winding A to B6-M to relay |
| | |
| M | To B8-T via 9B,C |
| N | To winding B To B6-P to relay |
| P | To computer (rate) |
| R | To motor winding to B6-T to relay |
| S | To H.S.-19 |
| | |
| T | To B8-U 4D, 5D, 6D, 7D, 7P |
| U | To H.S.-17 to B6-J to B4-9 to B5-K to motor com to relay |
| V | To B9-F, H, 8K, 3L |
| W | To relay coil |
| X | computer (brake) |
| | |
| Y | +5V to B3-5 4B, 6F +5V |
| Z | -5V to B3-R |
| | |
| 1 | |
| 2 | |
| 3 | |
| 4 | |
| 5 | |
| | |
| 6 | |
| 7 | |
| 8 | |
| 9 | |
| 10 | |
| | |
| 11 | |
| 12 | |
| 13 | |
| 14 | |
| 15 | |
| | |
| 16 | |
| 17 | |
| 18 | To 500K pot |
| 19 | to 500K pot |
| 20 | |
| | |
| 21 | |
| 22 | |

Fig. 38

```
 1
 2
 3
 4
 5

6
 7    To B5-C
 8
 9    To relay c
10    To relay b

11    To relay a
12    To B5-Y
13    To B9-D,E
14
15

16    To B5-L
17    To motor com to 5000 mfd cap to B6-J to B4-9 to B5-K to B9-U
18
19
20

21    To B7-X
22    To B7-U
23    To B7-V
24    To B5-X, 4E, 6E, 7E, 8T, 9B-C, 9M
```

APPENDIX B

8085 EDGE CARD SYSTEMS
PLS-858 ONE CARD SYSTEM

The PLS-858 is a complete 8085 microprocessor system on one 4½" x 6½" circuit card. The system provides a 56-pin card edge connector that is similar to the existing Pro-Log PLS-881 microprocessors. The PLS-858 incorporates all the elements of the highly popular PLS-881 and PLS-888 and expands on them. The PLS-858 offers the capability of expanding program memory to 8192 bytes using 2048 byte D2002 PROM (2716 or equivalent). The PLS-858 also comes with 1024 bytes of read/write memory and can be expanded to 2048 bytes simply by plugging in two additional D1004 RAMs (2114 or equivalent). Like the companion PLS cards, the more powerful PLS-858 includes three output ports and two input ports at the card edge; however, I/O can be expanded to eight input and eight output ports with a simple ribbon cable expansion system that accesses the data bus and I/O decoder strobe. The PLS-858 offers 5 external interrupts, a serial input line and a serial output line, 320 nanosecond time states, and single +5V supply operation. To utilize the full power of the 8085 and add versatility to the PLS-858, an interrupt expansion connector is provided.

FEATURES

- 8085 Processor
- 2K Byte RAM capacity with 1K Included
- Sockets for 8K Bytes 2716 EPROM
- Crystal Clock
- 320 Nanosecond State Time
- Power-on and External Reset
- Three 8-Bit Output Ports
- Two 8-Bit Input Ports
- External Port Expansion to 16 ports
- Five Interrupts
- 1 Each Serial Input and Output Lines
- Program Compatible with 8080 Systems
- Single +5V Supply

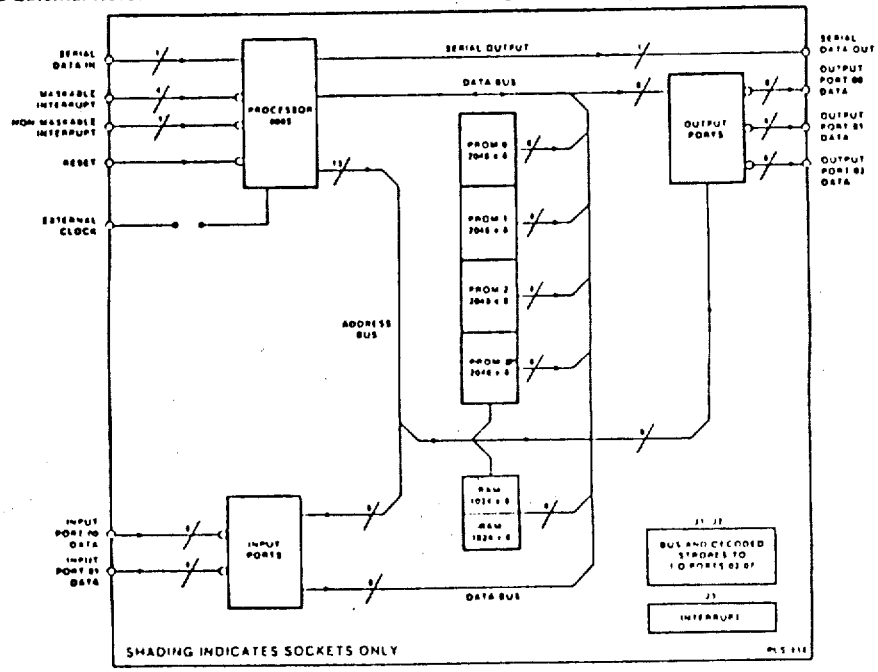

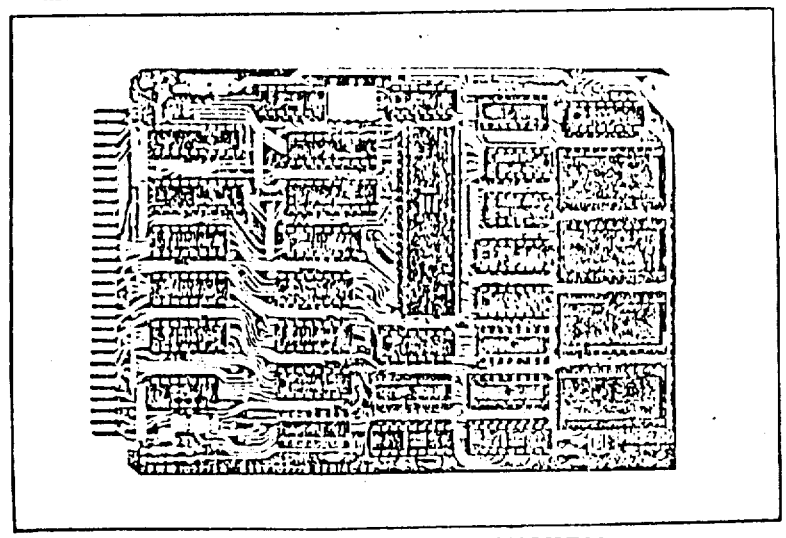

PLS-858 ONE CARD SYSTEM

APPENDIX

C

```
00 01 02 02 03 04 05 05 06 07 0F 09 09 0A 0B 0C
0C 0D 0E 0F 0F 10 11 12 12 13 14 15 15 16 17 17
18 19 1A 1A 1B 1C 1C 1D 1E 1E 1F 20 21 21 22 22
23 24 24 25 26 26 27 28 28 29 29 2A 2A 2B 2C 2C
2D 2D 2E 2E 2F 2F 30 30 31 31 32 32 33 33 34 34
35 35 35 36 36 37 37 37 38 38 38 39 39 39 3A 3A
3A 3B 3B 3B 3B 3C 3C 3C 3C 3D 3D 3D 3D 3D 3E 3E
3E 3E 3E 3E 3E 3E 3F 3F 3F 3F 3F 3F 3F 3F 3F 3F
3F 3F 3F 3F 3F 3F 3F 3F 3F 3F 3E 3E 3E 3E 3E 3E
3E 3E 3D 3D 3D 3D 3D 3C 3C 3C 3C 3B 3B 3B 3B 3A
3A 3A 39 39 39 38 38 38 37 37 37 36 36 35 35 35
34 34 33 33 32 32 31 31 30 30 2F 2F 2E 2E 2D 2D
2C 2C 2B 2A 2A 29 29 28 28 27 26 26 25 24 24 23
22 22 21 21 20 1F 1E 1E 1D 1C 1C 1B 1A 1A 19 18
17 17 16 15 15 14 13 12 12 11 10 0F 0F 0E 0D 0C
0C 0B 0A 09 09 08 07 06 05 05 04 03 02 02 01 00
00 00 01 01 02 02 03 03 04 04 05 05 06 06 07 07
08 08 09 09 0A 0A 0B 0B 0C 0C 0D 0D 0E 0E 0F 0F
10 10 11 11 12 12 13 13 14 14 15 15 16 16 17 17
18 18 19 19 1A 1A 1B 1B 1C 1C 1D 1D 1E 1E 1F 1F
20 20 21 21 22 22 23 23 24 24 25 25 26 26 27 27
28 28 29 29 2A 2A 2B 2B 2C 2C 2D 2D 2E 2E 2F 2F
30 30 31 31 32 32 33 33 34 34 35 35 36 36 37 37
38 38 39 39 3A 3A 3B 3B 3C 3C 3D 3D 3E 3E 3F 3F
3F 3F 3E 3E 3D 3D 3C 3C 3B 3B 3A 3A 39 39 38 38
37 37 36 36 35 35 34 34 33 33 32 32 31 31 30 30
2F 2F 2E 2E 2D 2D 2C 2C 2B 2B 2A 2A 29 29 28 28
27 27 26 26 25 25 24 24 23 23 22 22 21 21 20 20
1F 1F 1E 1E 1D 1D 1C 1C 1B 1B 1A 1A 19 19 18 18
17 17 16 16 15 15 14 14 13 13 12 12 11 11 10 10
0F 0F 0E 0E 0D 0D 0C 0C 0B 0B 0A 0A 09 09 08 08
07 07 06 06 05 05 04 04 03 03 02 02 01 01 00 00
00 01 01 02 03 03 04 05 05 06 07 07 08 09 09 0A
0B 0B 0C 0D 0D 0E 0F 0F 10 11 11 12 13 13 14 15
15 16 17 17 18 19 19 1A 1B 1B 1C 1D 1D 1E 1F 1F
20 21 21 22 23 23 24 25 25 26 27 27 28 29 29 2A
2B 2B 2C 2D 2D 2E 2F 2F 30 31 31 32 33 33 34 35
35 36 37 37 38 39 39 3A 3B 3B 3C 3D 3D 3E 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3E 3D 3D 3C 3B 3B 3A 39 39 38 37 37 36 35
35 34 33 33 32 31 31 30 2F 2F 2E 2D 2D 2C 2B 2B
2A 29 29 28 27 27 26 25 25 24 23 23 22 21 21 20
1F 1F 1E 1D 1D 1C 1B 1B 1A 19 19 18 17 17 16 15
15 14 13 13 12 11 11 10 0F 0F 0E 0D 0D 0C 0B 0B
0A 09 09 08 07 07 06 05 05 04 03 03 02 01 01 00
00 01 02 03 04 05 06 07 08 09 0A 0B 0C 0D 0E 0F
10 11 12 13 14 15 16 17 18 19 1A 1B 1C 1D 1E 1F
20 21 22 23 24 25 26 27 28 29 2A 2B 2C 2D 2E 2F
30 31 32 33 34 35 36 37 38 39 3A 3B 3C 3D 3E 3F
3F 3F 3F 3F 3F 3F 3F 3F 3F 3F 3F 3F 3F 3F 3F 3F
```

```
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3E 3D 3C 3B 3A 39 38 37 36 35 34 33 32 31 30
2F 2E 2D 2C 2B 2A 29 28 27 26 25 24 23 22 21 20
1F 1E 1D 1C 1B 1A 19 18 17 16 15 14 13 12 11 10
0F 0E 0D 0C 0B 0A 09 08 07 06 05 04 03 02 01 00
00 02 04 06 08 0A 0C 0E 10 12 14 16 18 1A 1C 1E
20 22 24 26 28 2A 2C 2E 30 32 34 36 38 3A 3C 3E
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3E 3C 3A 38 36 34 32 30 2E 2C 2A 28 26 24 22 20
1E 1C 1A 18 16 14 12 10 0E 0C 0A 08 06 04 02 00
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
```

```
3F 3F 3F 3F 3F 3F 3F 3F 3F 3F 3F 3F 3F 3F 3F
3F 3F 3F 3F 3F 3F 3F 3F 3F 3F 3F 3F 3F 3F 3F 3F
00 02 02 02 04 04 04 06 06 06 07 07 07 08 08 08
09 09 09 0A 0A 0A 0B 0B 0B 0B 0C 0C 0C 0C 0D 0D
0D 0D 0E 0E 0E 0E 0F 0F 0F 0F 10 10 10 10 10
11 11 11 11 12 12 12 12 12 13 13 13 13 14 14 14
14 14 15 15 15 15 16 16 16 16 17 17 17 17 18 18
18 18 18 19 19 19 19 1A 1A 1A 1A 1A 1B 1B 1B 1B
1C 1C 1C 1C 1C 1D 1D 1D 1D 1E 1E 1E 1E 1E 1F 1F
1F 1F 20 20 20 20 20 21 21 21 21 22 22 22 22 22
23 23 23 23 24 24 24 24 24 25 25 25 25 26 26 26
26 26 27 27 27 27 28 28 28 28 28 29 29 29 29 2A
2A 2A 2A 2A 2B 2B 2B 2B 2C 2C 2C 2C 2D 2D 2D
2D 2E 2E 2E 2E 2F 2F 2F 2F 30 30 30 30 30 31
31 31 31 32 32 32 32 32 33 33 33 33 34 34 34 34
34 35 35 35 35 35 36 36 36 36 37 37 37 37 38 38
38 38 38 39 39 39 39 3A 3A 3A 3A 3A 3B 3B 3B 3B
3C 3C 3C 3C 3C 3D 3D 3D 3D 3E 3E 3E 3E 3E 3F 3F
```

APPENDIX

D

```
DPX
ADR 0000 042F
PUNCH?
*
00 C3 40 00 00 00 00 00 00 00 00 00 00 00 00 00
00 00 00 00 00 00 00 00 00 00 00 00 00 00 00 00
00 00 00 00 00 00 00 00 00 00 00 00 00 00 00 00
00 00 00 00 00 00 00 00 00 00 00 00 00 00 00 00
31 DF 23 3E 01 D3 00 CD 03 01 FE AA C2 47 00 CD
5B 00 CD 72 00 C3 F5 02 CD 73 01 1E 03 21 E7 23
2C CD A7 01 D2 58 00 72 1D C2 60 00 5E 2D 56 2D
4E C9 06 06 21 00 02 7E 2C B9 C2 99 00 7E 2C BA
C2 9A 00 7E 2C BB C2 9B 00 46 2C 7E 21 FB 23 77
2D 70 2D 36 C3 CD F9 23 C9 2C 2C 2C 2C 05 C8 C3
77 00 CD CB 00 CD B4 00 2E FD CD B6 00 C3 73 01
00 00 00 00 2E FF 26 23 CD F1 00 CD F1 00 C3 7D
01 00 00 00 00 00 00 00 00 00 CD 73 01 2E FD
1E 03 26 03 56 CD 7F 01 2C 1D C2 D4 00 C3 7D 01
00 00 CD C3 01 07 07 07 07 77 CD C3 01 B6 77 2D
C9 CD CD 01 07 07 07 07 77 CD CD 01 B6 77 2D C9
CD 58 01 DB 00 0F DA 03 01 00 00 CD 9E 01 3E 00
D3 00 16 80 CD 9B 01 DB 00 E6 01 D3 00 1F 7A 1F
57 D2 14 01 C3 43 01 CD 58 01 DB 00 0F DA 2A 01
00 00 CD 9E 01 16 80 CD 9B 01 DB 00 1F 7A 1F 57
D2 37 01 CD 9B 01 3E 01 D3 00 CD 98 01 3E 80 B2
57 FE FF C8 FE 9B C0 C7 3E 03 D3 00 DB 00 0F DA
5C 01 3E 01 D3 00 C9 1E AA CD 2A 01 BB C2 69 01
C3 7F 01 16 8D CD 7F 01 16 8A C3 7F 01 16 A0 3E
00 D3 00 0E 08 CD 9B 01 3E 01 A2 D3 00 1F 7A 1F
57 0D C2 85 01 C3 43 01 CD 9B 01 CD 9E 01 06 A4
C3 D0 03 00 00 00 00 CD 03 01 3E C0 BA 7A D0 FE
BB C9 00 7E 0F 0F 0F 0F CD BC 01 7E CD F3 01 57
C3 7F 01 CD 27 01 CD DA 01 DA C3 01 C9 CD 2A 01
CD DA 01 DA CD 01 CD 7F 01 7A FE B0 D8 FE BA DA
F0 01 FE C1 D8 47 3E C6 B8 78 D8 E6 0F C6 09 C9
E6 0F C9 E6 0F FE 0A DA FD 01 C6 B7 C9 F6 B0 C9
CC C4 D8 4E 02 C4 D0 D8 78 02 C4 C1 C4 60 02 CD
CF D6 56 03 D4 D2 CE 74 03 C5 C4 D4 00 03 C3 D2
C2 F2 E2 DA FA CA EA CD D4 C4 F4 E4 DC FC CC EC
32 3A 22 2A 01 11 21 31 3E 06 0E 16 1E 26 2E 36
C6 CE D6 DE E6 EE F6 FE DB D3 00 00 00 00 CD A2
```

```
CD 21 F8 23 CD E2 00 CD 96 02 CD EF 02 C3 51 02
CD A2 00 CD E3 03 CD 9D 02 CD B3 02 CD BF 02 CD
EF 02 CA 66 02 C3 69 02 CD A2 00 CD E3 03 CD 73
01 1E 10 CD BF 02 CD EF 02 1D C2 83 02 C3 7E 02
21 F8 23 CD F1 00 2C 5E 2A FE 23 73 C9 CD 73 01
CD 78 01 2E F9 1E 04 CD D2 00 21 FF 23 CD B3 01
C3 73 01 CD 73 01 21 FE 23 CD B3 01 C3 7D 01 2A
FE 23 C3 B9 02 2E FE 26 23 46 04 70 C0 2C 46 04
70 AF C9 2E FE 26 23 46 05 70 2C 04 C0 46 05 70
AF C9 21 FF 23 7E 2D 46 2D BE C0 78 2D BE C9 CD
B2 02 C2 C5 02 CD 73 01 2E F6 CD D0 00 C3 4F 00
CD 9D 02 CD B3 02 CD 0F 03 CA 00 03 C3 03 03 CD
CB 01 FE D2 CA 4F 00 FE AA CA 51 03 FE C0 CA 3D
CB FE DE CA D3 02 FE A0 CA 43 03 21 F8 23 CD DA
01 DA 3A 03 CD F4 00 CD 96 02 C3 C5 02 21 FE 23
C3 89 00 CD BF 02 CD 03 01 FE DF CC 90 02 C3 C5
02 CD B4 00 AF C9 CD A2 00 CD CB 00 2E FB CD B6
00 2A FE 23 5E 2A FA 23 73 CD EF 02 2E FA CD C7
02 C3 61 03 CD A2 00 2E FB CD F1 00 16 DF CD 7F
01 CD F1 00 2A FE 23 5E 06 1A 21 1E 02 7B BE CA
FE 03 2C 05 C2 8E 03 06 12 21 38 02 BE CA A8 03
2C 05 C2 9C 03 C3 C5 03 CD EF 02 C3 C5 03 CD EF
02 CD EF 02 2A FE 23 7E 21 FB 23 BE C2 C5 03 2D
5E 2A FE 23 73 CD EF 02 C3 84 03 00 00 00 00 00
7F 7F E3 E3 E3 E3 05 C2 D0 03 C9 00 00 00 00 00
CD 00 00 2E F0 1E 06 CD D2 00 CD 73 01 C3 67 01
DD D5 CE C3 C8 BF C5 CE C4 D0 C1 C7 C5 C1 C4 D2
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
END
```

I claim:

1. A system for controlling the energization of an electronically commutated motor having a stationary assembly with a plurality of winding stages and also having a rotatable assembly associated in magnetic coupling relation with the stationary assembly upon the energization of the motor, the system comprising:
   means responsive to the angular position of the rotatable assembly for providing commutation signals;
   a plurality of commutation switching means for connection with the winding stages, respectively;
   means for applying the commutation signals in sequence to said commutation switching means to control the conductivity thereof;
   circuit means for dissipating energy generated by the commutation of the winding stages and including a first common point connected to one terminal of each of the winding stages, and first diode means for separate connection between the other terminal of each of the winding stages and a second common point;
   said commutation switching means being connected between a third common point and the other terminal of each of the winding stages;
   an energy return circuit including capacitor means for connection between said first and second common points;
   first impedance means, first transistor means and second diode means for connection in series combination between said first and second common points;
   voltage divider means and second transistor means for connection in series combination substantially between said second and third common points, said voltage divider means including second and third impedance means for connection at a fourth common point;
   means responsive to the voltage at said fourth common point for controlling the conductivity of said first transistor means;
   means for deriving a control signal representative of the actual angular velocity of the rotatable assembly; and
   means for applying the control signal to said second transistor means to decrease the conductivity thereof whenever the actual angular velocity of the rotatable assembly exceeds an externally determined variable limit with the decreased conductivity of said secnd transistor means being effective to increase the conductivity of said first transistor means and whereby energy generated upon the commutation of the winding stages is stored in said capacitor means for subsequent dissipation and a negtive torque is variably applied to the rotatable assembly in proportion to the amount by which the actual velocity exceeds the variable limit.

2. A system as set forth in claim 1 further including a fourth impedance means for connection in series combination with said voltage divider means and said second transistor means between said second and third common points.

3. A system as set forth in claim 1 wherein the first transistor means includes a first control terminal, said first control terminal being connected to said fourth common point, whereby the voltage on said first control terminal is governed by the conductivity of said second transistor means.

4. A system as set forth in claim 3 wherein the second transistor means includes a second control terminal, the voltage on said second control terminal controlling the conductivity of said second transistor means and thereby controlling the voltage at said fourth common point, said means for applying the angular velocity control signal being connected to said second transistor means to apply the control signal to said second control terminal.

5. A system for controlling the energization of an electronically commutated motor having a stationary assembly with a plurality of winding stages and also having a rotatable assembly associated in magnetic coupling relation with the stationary assembly upon the energization of the motor, the system comprising:
 means responsive to the angular position of the rotatable assembly for providing commutation signals;
 a plurality of commutation switching means for connection with the winding stages, respectively;
 means for applying the commutation signals in sequence to said commutation switching means to control the conductivity thereof;
 circuit means for dissipating energy generated by the commutation of the winding stages, said circuit means being connected to one terminal of each of the winding stages and including a first energy dissipating branch with a first control terminal, the signal on said first control terminal governing the amount of energy dissipated in said first energy dissipating branch, the energy dissipation in said first energy dissipating branch exceeding the energy to be dissipated due to commutation for some range of magnitudes of signals on said first control terminal, whereby when the energy dissipation in said first energy dissipating branch exceeds that dissipation required due to commutation a negative torque is variably applied to the rotatable assembly corresponding to the magnitude of the control signal, and a second energy dissipating branch with a second control terminal, the signal on said second control terminal governing the magnitude of the signal on said first control terminal;
 means for deriving a control signal representative of the actual angular velocity of the rotatable assembly; and
 means for applying the control signal to said second control terminal to govern the signal on said first control terminal to increase the energy dissipated in said first energy dissipating branch above that required due to commutation whenever the actual angular velocity of the rotatable assembly exceeds a predetermined limit, whereby a negative torque is variably applied to the rotatable assembly in proportion to the amount by which the actual angular velocity exceeds the predetermined limit.

6. A system as set forth in claim 5 wherein said first energy dissipating branch is connected in parallel with the winding stages and includes first transistor means connected in series combination with a first impedance means.

7. A system as set forth in claim 6 wherein said first transistor means includes a base terminal which comprises said first control terminal, the magnitude of the signal on said base terminal determining the amount of energy dissipated in said first impedance means.

8. A system as set forth in claim 6 wherein said second energy dissipating branch includes voltage divider means and a second transistor means, said voltage divider means having second and third impedance means for connection at the first control terminal, and wherein a decrease in the conductivity of said second transistor means is effective to increase the conductivity of said first transistor means so as to increase the energy dissipated in said first impedance means.

9. A system for controlling the energization of an electronically commutated motor having a stationary assembly with a plurality of winding stages and also having a rotatable assembly associated in magnetic coupling relation with the stationary assembly upon the energization of the motor, the system comprising:
 means responsive to the angular position of the rotatable assembly for providing commutation signals;
 a plurality of commutation switching means for connection with the winding stages, respectively;
 means for applying the commutation signals in sequence to said commutation switching means to control the conductivity thereof;
 circuit means for dissipating energy generated by the commutation of the winding stges, said circuit means being connected to one terminal of each of the winding stages and including first impedance means and first transistor means for connection in series combination substantially in parallel with the winding stages, said first transistor means having a first control terminal, the magnitude of the signal on said first control terminal determining the amount of energy dissipated in said first impedance means, the energy dissipation in said first impedance means exceeding the energy to be dissipated due to commutation for some range of magnitudes of signal on said first control terminal, whereby when said energy dissipation in said first impedance means exceeds that dissipation required due to commutation a negative torque is variably applied to the rotatable assembly corresponding to the magnitude of the control signal, voltage divider means, and second transistor means, said voltage divider means having second and third impedance means for connection at said first control terminal, a decrease in the conductivity of said second transistor means being effective to increase the conductivity of said first transistor means;
 means for deriving a control signal representative of the actual angular velocity of the rotatable assembly; and
 means for applying the control signal to said second transistor means to increase the energy dissipated in said first impedance means above that required due to commutation whenever the actual angular velocity of the rotatable assembly exceeds a predetermined limit, whereby a negative torque is variably applied to the rotatable assembly in proportion to the amount by which the actual angular velocity exceeds the predetermined limit.

10. A system for controlling the energization of an electronically commutated motor having a stationary assembly with a plurality of winding stages and also having a rotatable assembly associated in magnetic coupling relation with the stationary assembly upon the energization of the motor, the system comprising:
 means responsive to the angular position of the rotatable assembly for providing commutation signals;
 a plurality of commutation switching means for connection with the winding stages, respectively;
 means for applying the commutation signals in sequence to said commutation switching means to control the conductivity thereof;
 circuit means for dissipating energy generated by the commutation of the winding stages, said circuit means being connected to one terminal of each of the winding stages at a first common point, said circuit means including first diode means for separate connection between the other terminal of each of the winding stages and a second common point;

said commutation switching means being connected between a third common point and the other terminal of each of the winding stages;

said circuit means further including an energy return circuit including capacitor means for connection between said first and second common points;

said circuit means including first impedance means and first transistor means for connection in series combination between said first and second common points, said first transistor means having a first control terminal, the voltage on said first control terminal determining the amount of energy dissipated in said first impedance means, the energy dissipation in said first impedance means exceeding the energy to be dissipated due to commutation for some range of voltages on said first control terminal, whereby when the energy dissipation in said first impedance means exceeds that dissipation required due to commutation a negative torque is variably applied to the rotatable assembly corresponding to the voltage of the control signal;

said circuit means also including voltage divider means and second transistor means, said voltage divider means including second and third impedance means for connection at said first control terminal, a decrease in the conductivity of said second transistor means being effective to increase the conductivity of said first transistor means;

means for deriving a control signal representative of the actual angular velocity of the rotatable assembly; and means for applying the control signal to said second transistor means to decrease the conductivity thereof whenever the actual angular velocity of the rotatable assembly exceeds an externally determined variable limit thereby to increase the conductivity of said first transistor means, whereby energy generated upon commutation of the winding stages is stored in said capacitor means for subsequent dissipation and a negative torque is variably applied to the rotatable assembly in proportion to the amount by which the actual anglular velocity exceeds the variable limit.

* * * * *